(12) United States Patent
Nakamura et al.

(10) Patent No.: US 7,953,962 B2
(45) Date of Patent: May 31, 2011

(54) MULTIPROCESSOR SYSTEM AND CONTROL METHOD THEREOF

(75) Inventors: Yasuki Nakamura, Kawasaki (JP);
Takahisa Suzuki, Kawasaki (JP);
Makiko Ito, Kawasaki (JP); Hideo Miyake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/585,620

(22) Filed: Sep. 18, 2009

(65) Prior Publication Data
US 2010/0070739 A1    Mar. 18, 2010

Related U.S. Application Data

(63) Continuation of application No. PCT/JP2007/055743, filed on Mar. 20, 2007.

(51) Int. Cl.
*G06F 9/54* (2006.01)
(52) U.S. Cl. ......................................... 712/220; 712/225
(58) Field of Classification Search .................. None
See application file for complete search history.

(56) References Cited

U.S. PATENT DOCUMENTS

| | | | |
|---|---|---|---|
| 6,202,089 B1* | 3/2001 | Juster | 709/219 |
| 6,950,925 B1 | 9/2005 | Sander et al. | |
| 7,548,946 B1* | 6/2009 | Saulpaugh et al. | 709/203 |
| 7,669,209 B2* | 2/2010 | Inohara et al. | 719/330 |
| 2003/0177288 A1 | 9/2003 | Kunimatsu et al. | |
| 2006/0031641 A1 | 2/2006 | Hataida et al. | |

FOREIGN PATENT DOCUMENTS

| | | |
|---|---|---|
| EP | 1 365 321 | 11/2003 |
| JP | 3035108 | 2/2000 |
| JP | 2000-181711 | 6/2000 |
| JP | 2003-263331 | 9/2003 |
| JP | 2005-537567 | 12/2005 |
| JP | 2006-48406 | 2/2006 |

OTHER PUBLICATIONS

International Search Report for PCT/JP2007/055743, mailed Jun. 19, 2007.

* cited by examiner

*Primary Examiner* — Eric Coleman
(74) *Attorney, Agent, or Firm* — Fujitsu Patent Center

(57) ABSTRACT

A multiprocessor system according to an embodiment comprises a plurality of processors, an execution control unit to control processing by the plurality of processors and data transfer between the plurality of processors; and an internal data storage unit to store data dependence information indicating status of the data transfer. If control flow of processing by a processor is fixed after a preceding data transfer is registered for execution and another data transfer to a similar destination as the preceding data transfer is necessary, the execution control unit cancels the preceding data transfer based on the data dependence information.

20 Claims, 42 Drawing Sheets

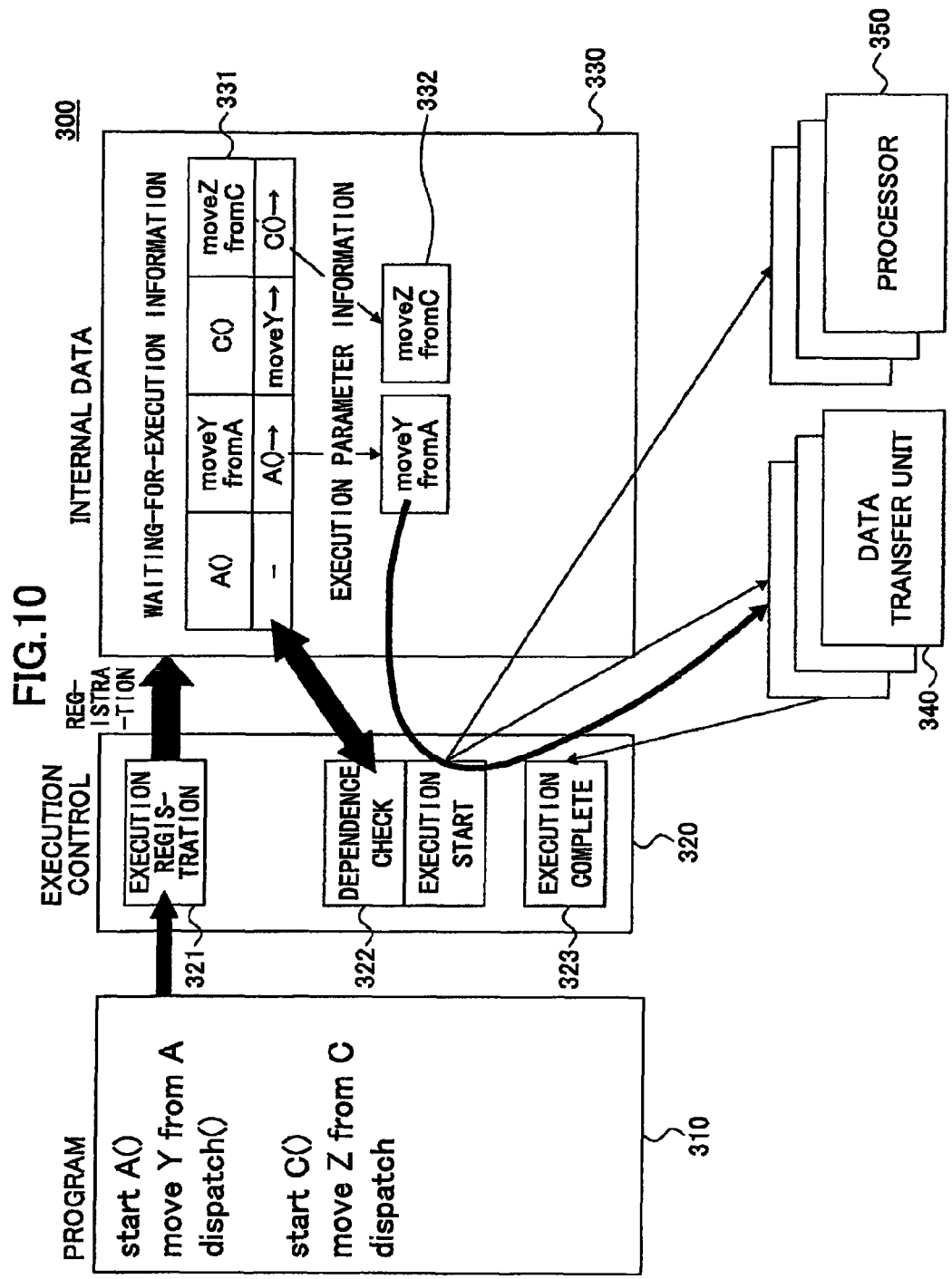

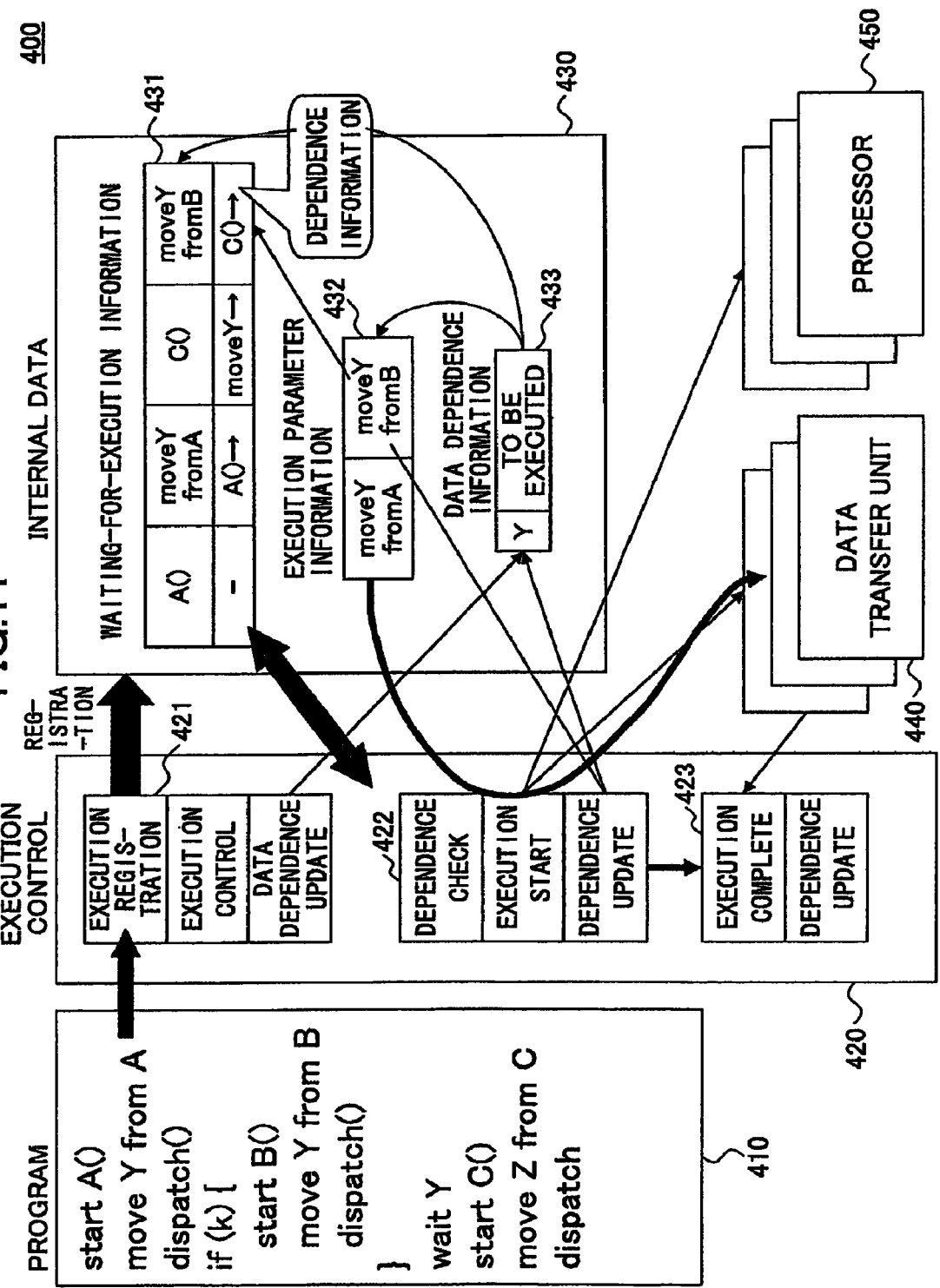

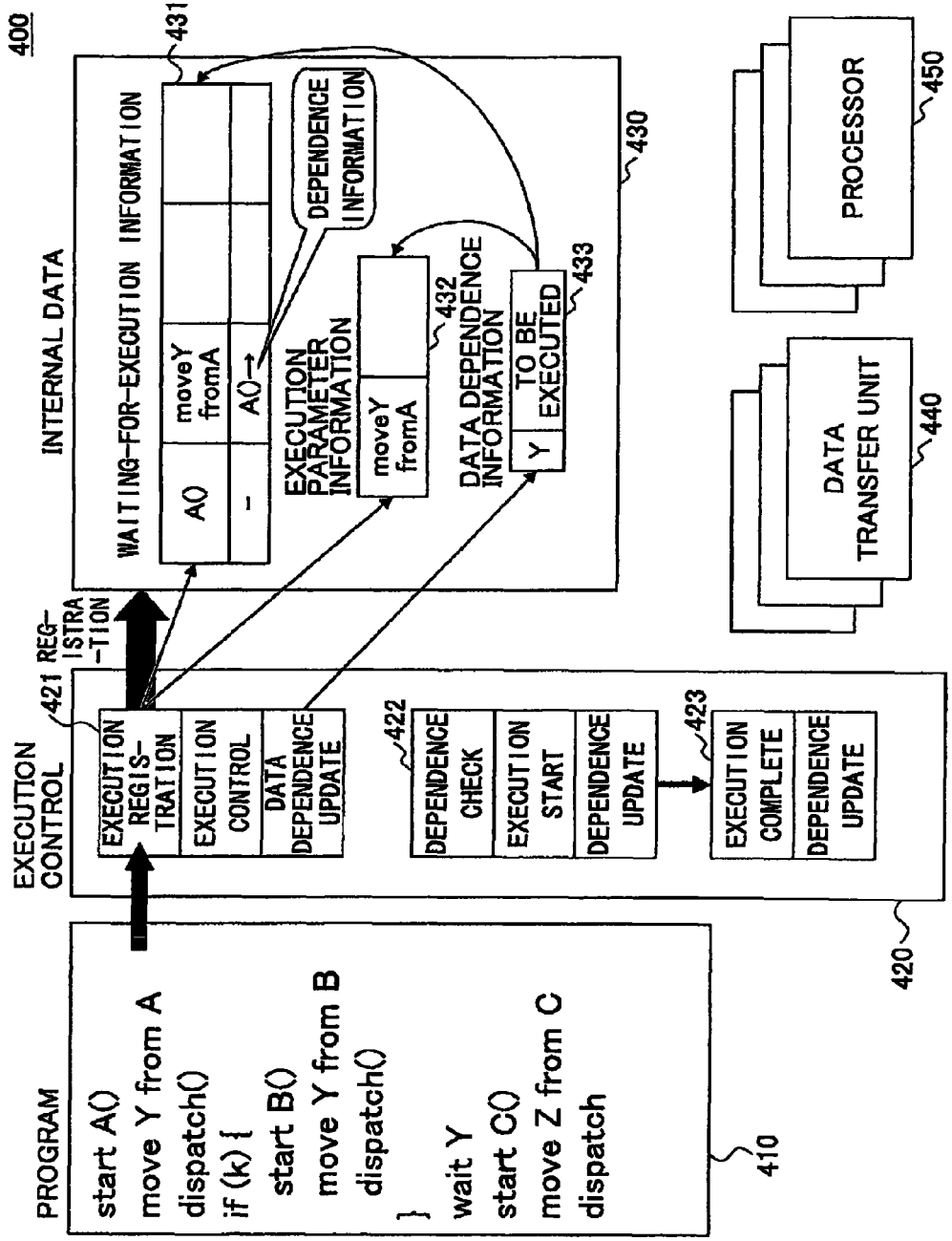

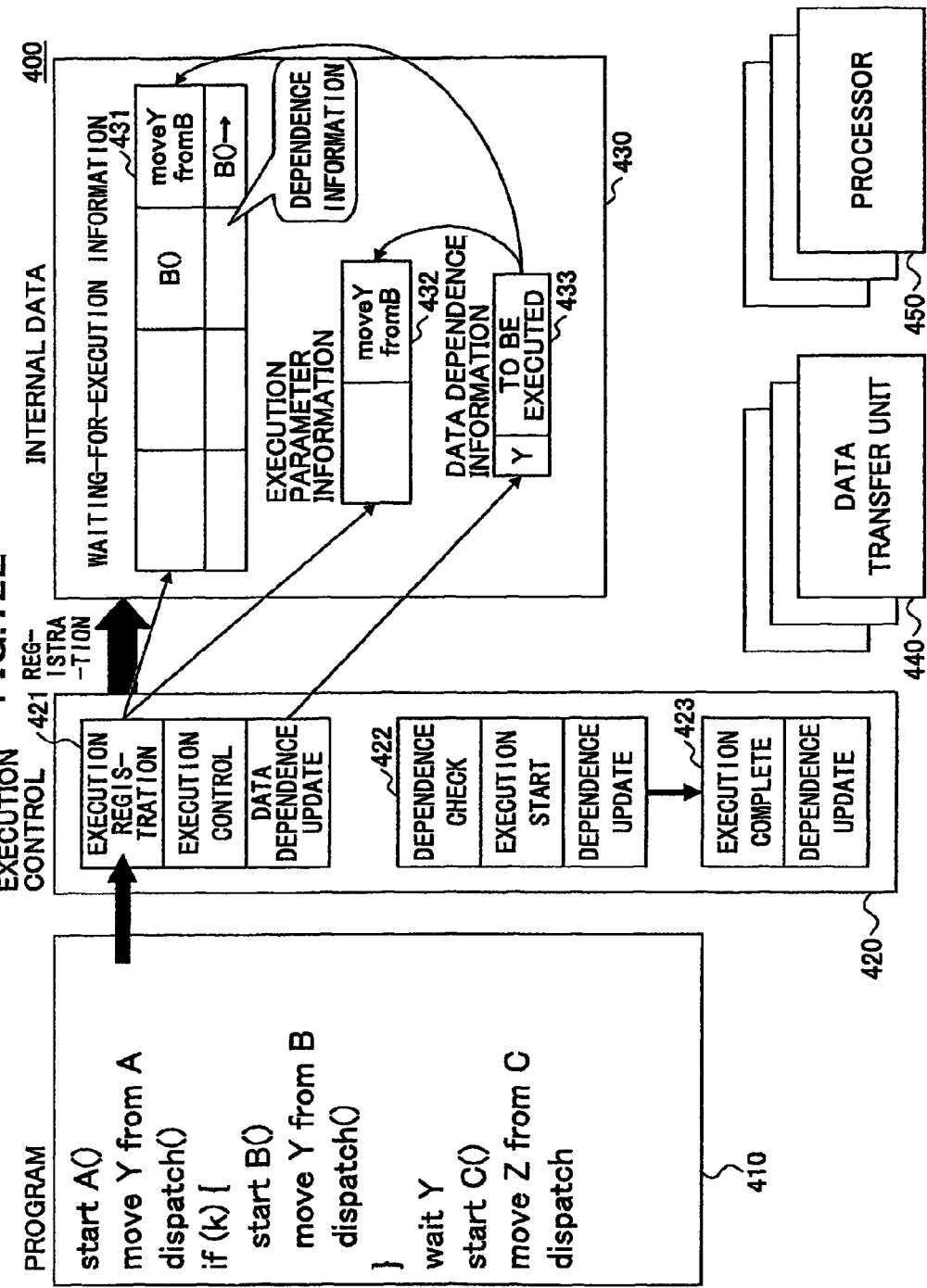

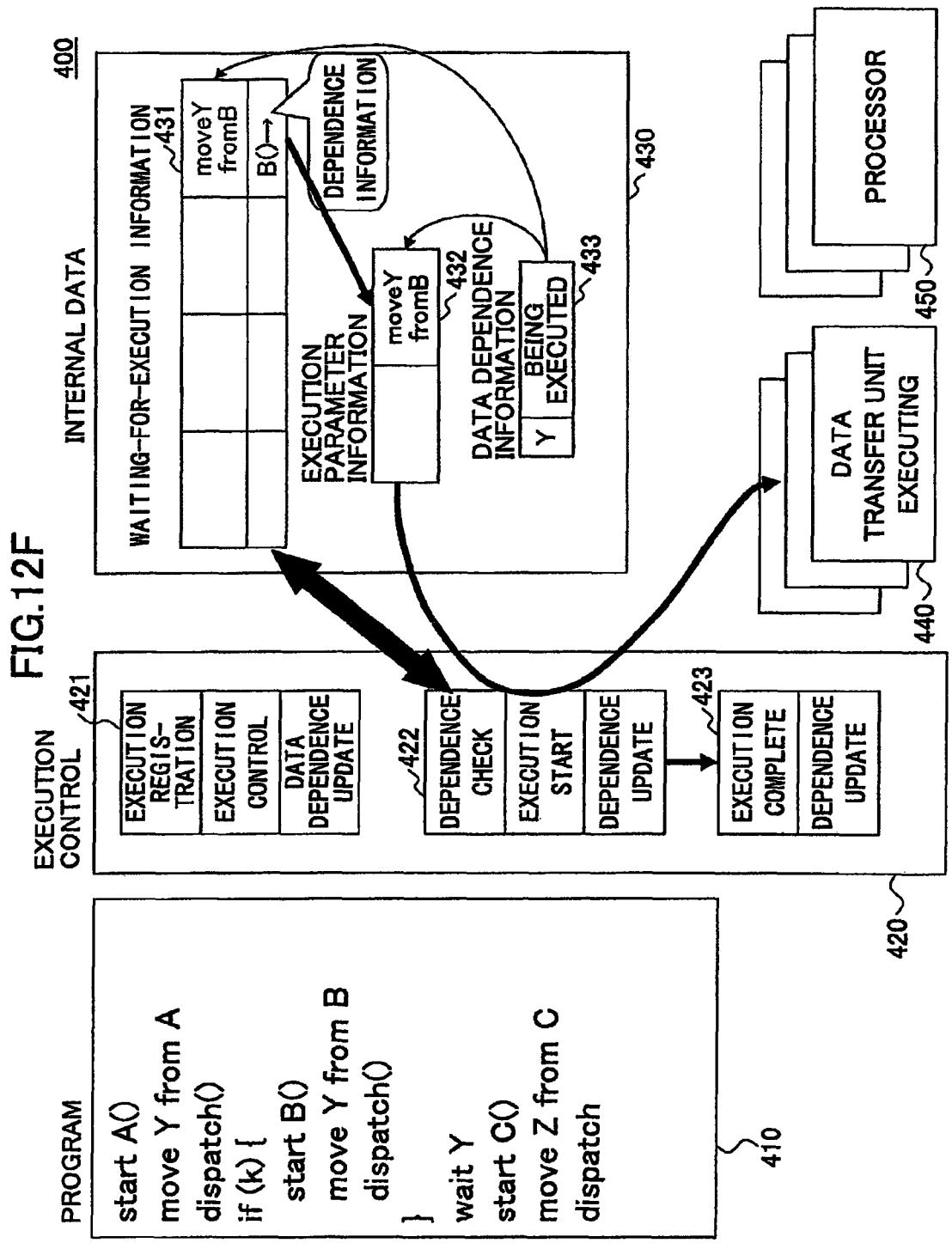

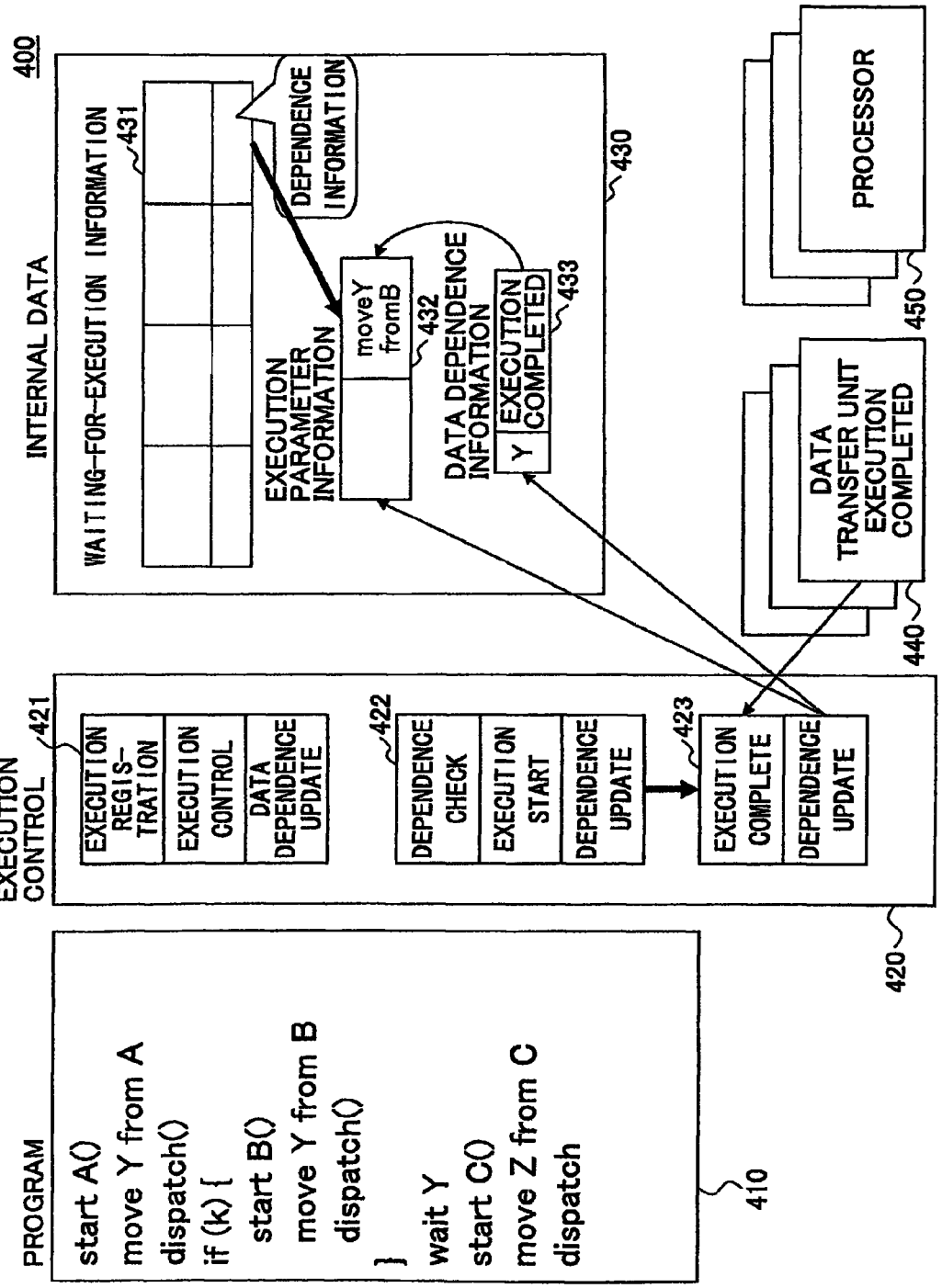

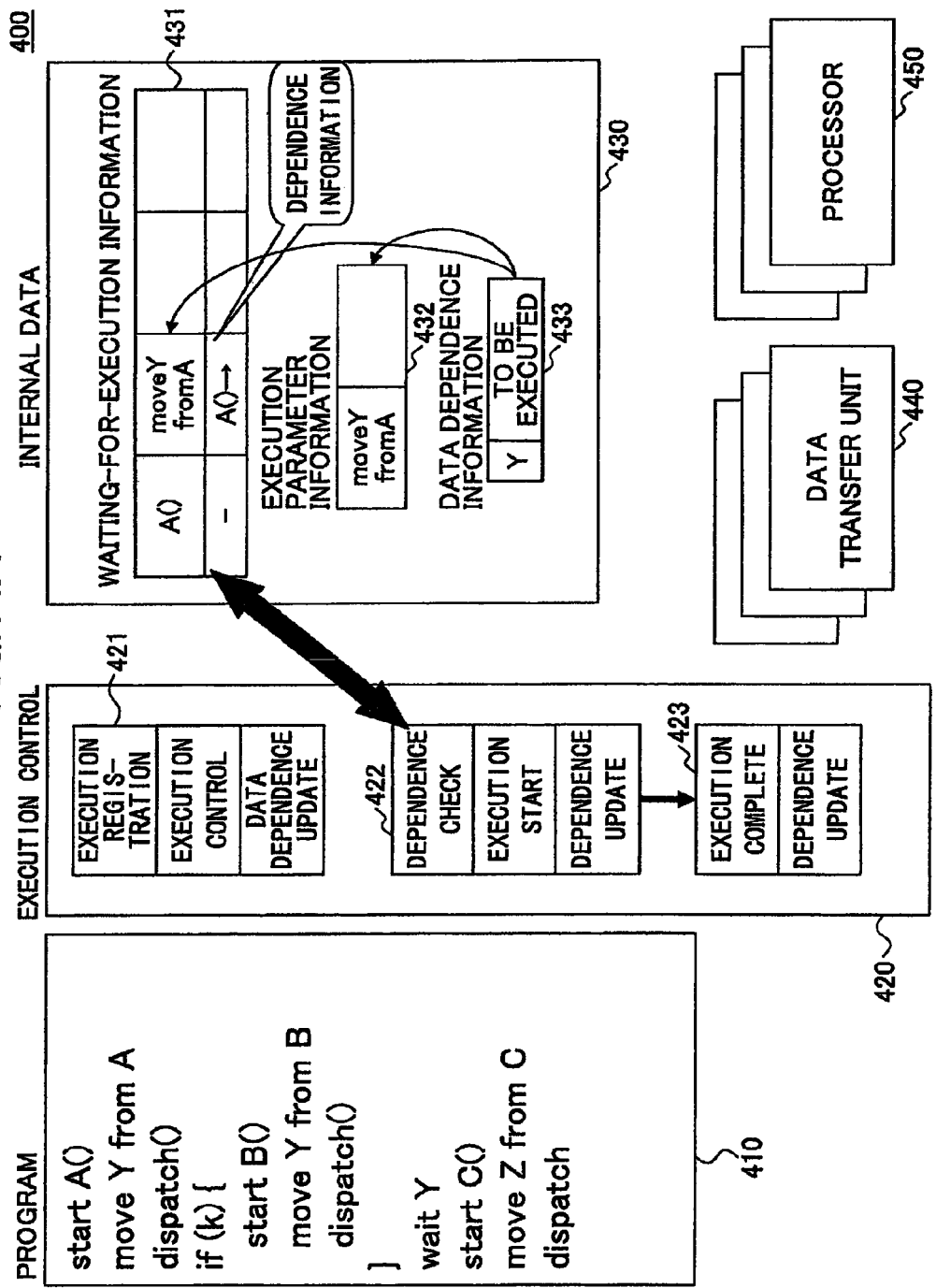

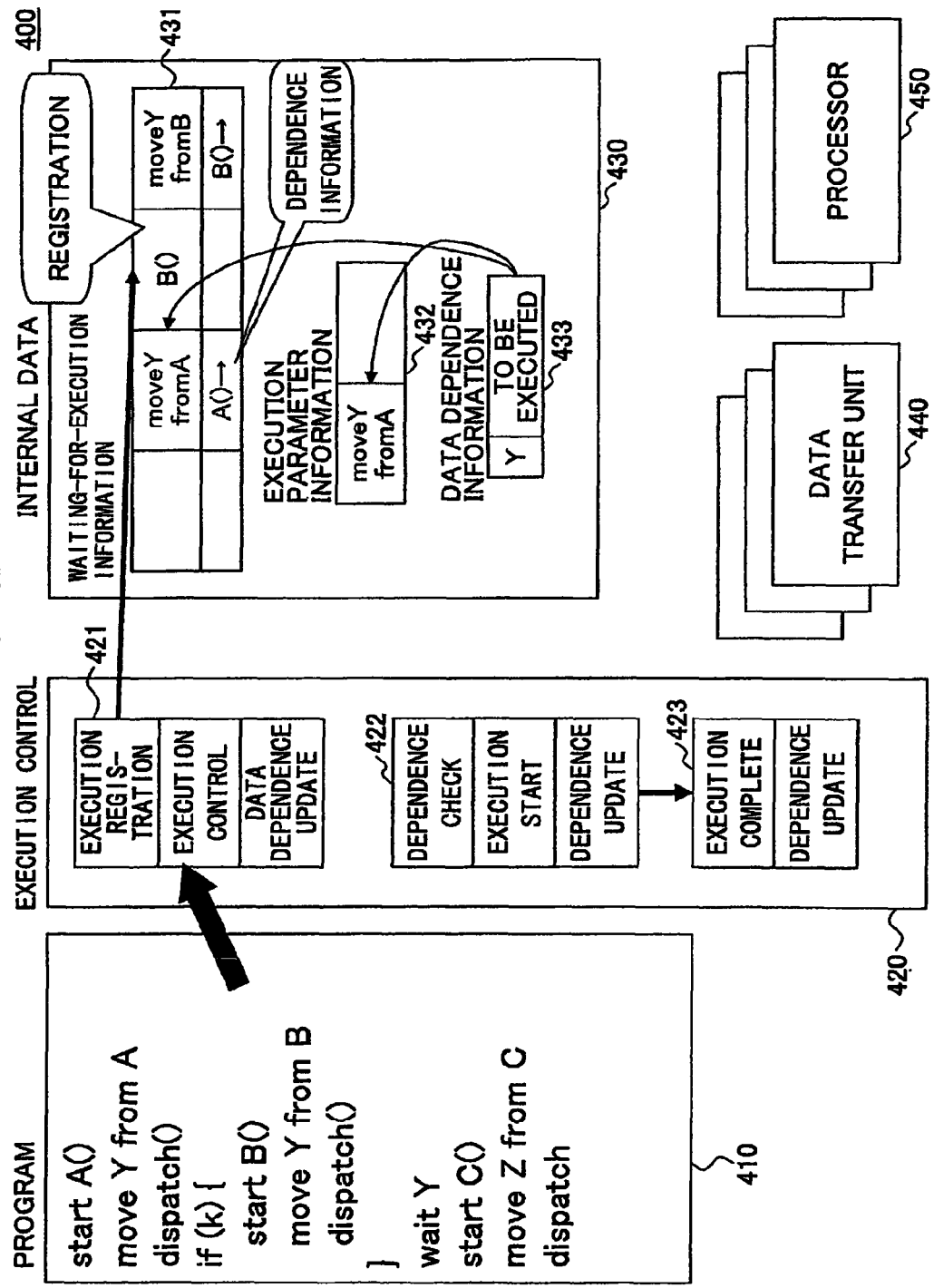

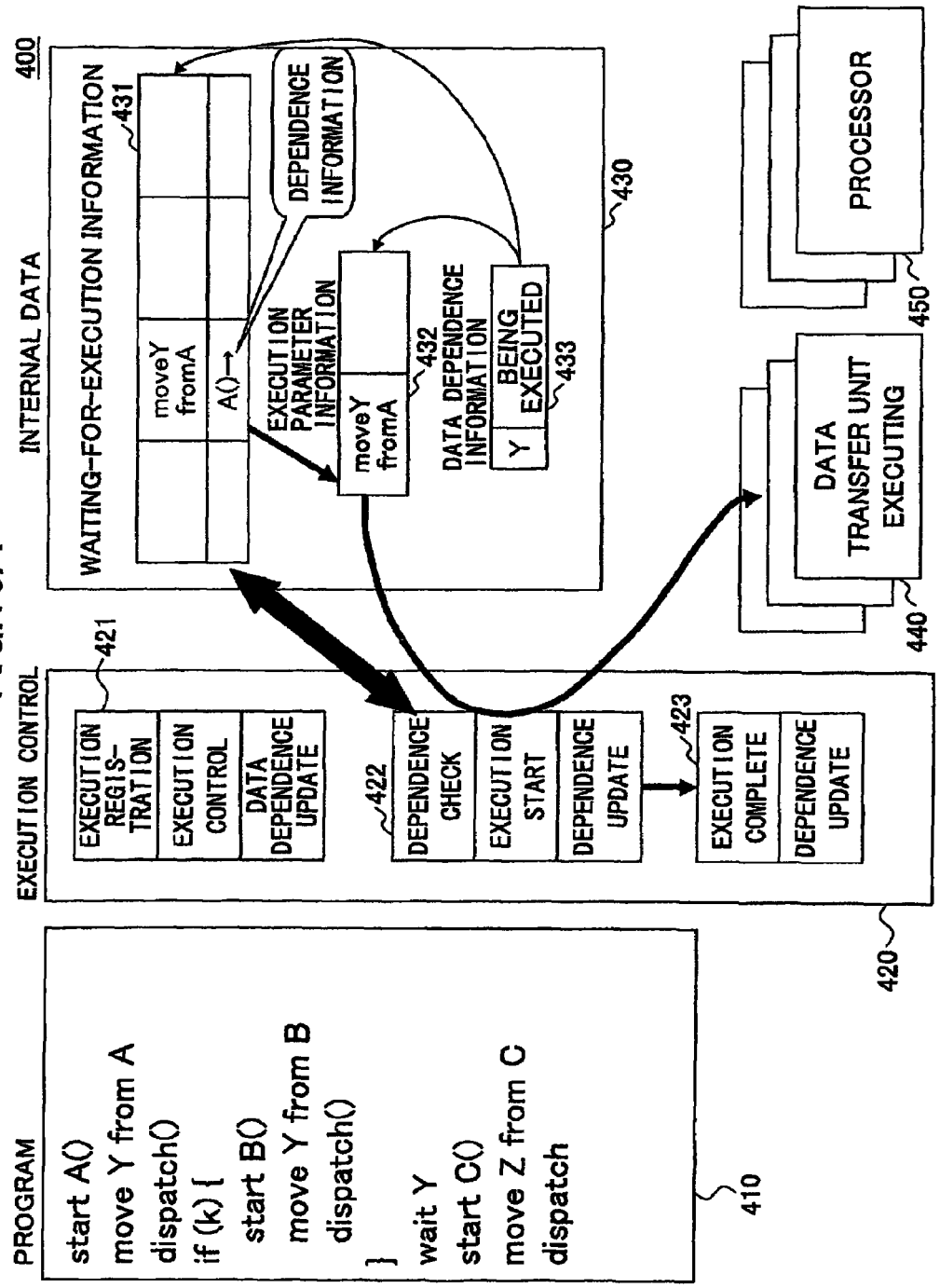

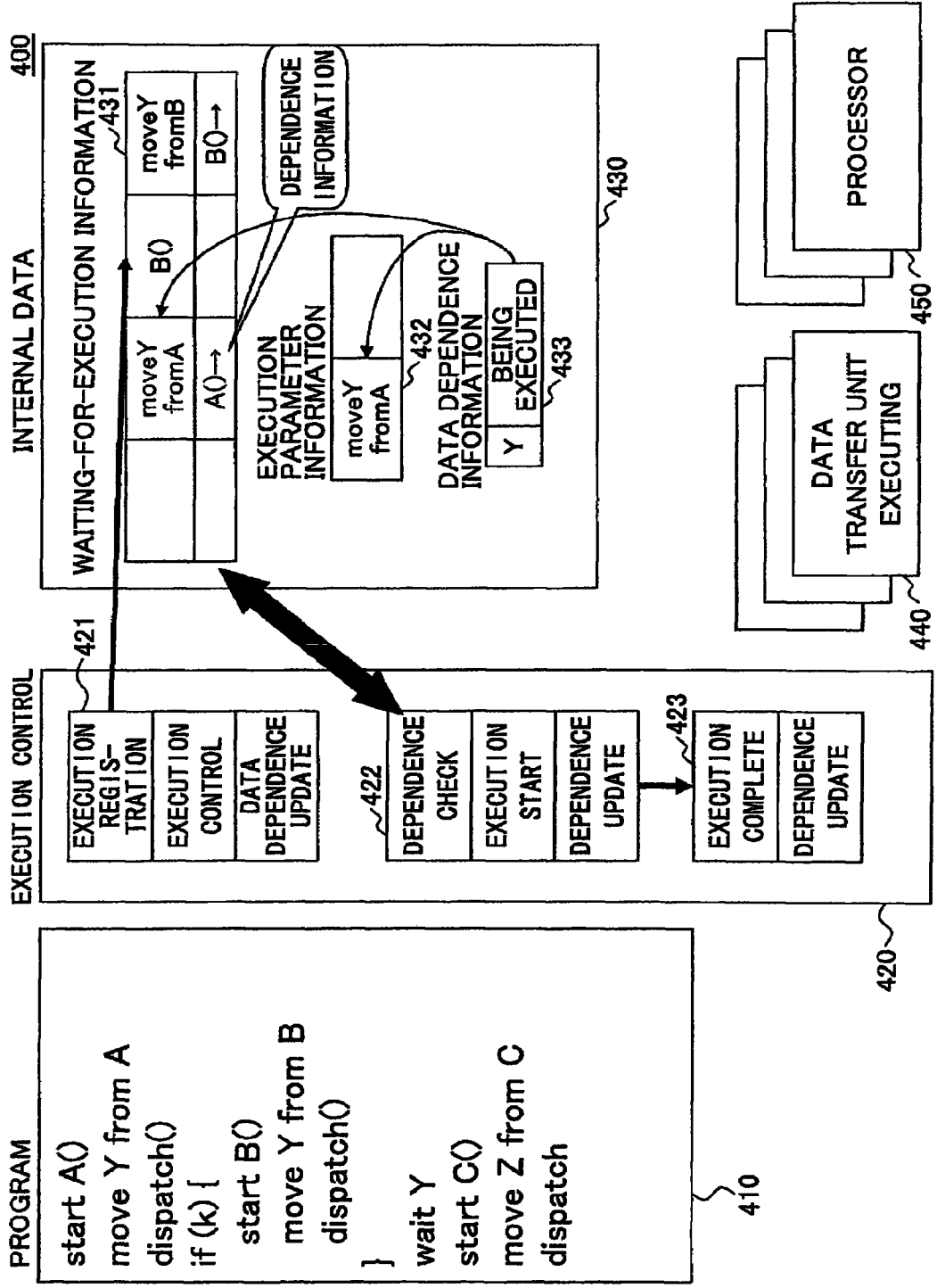

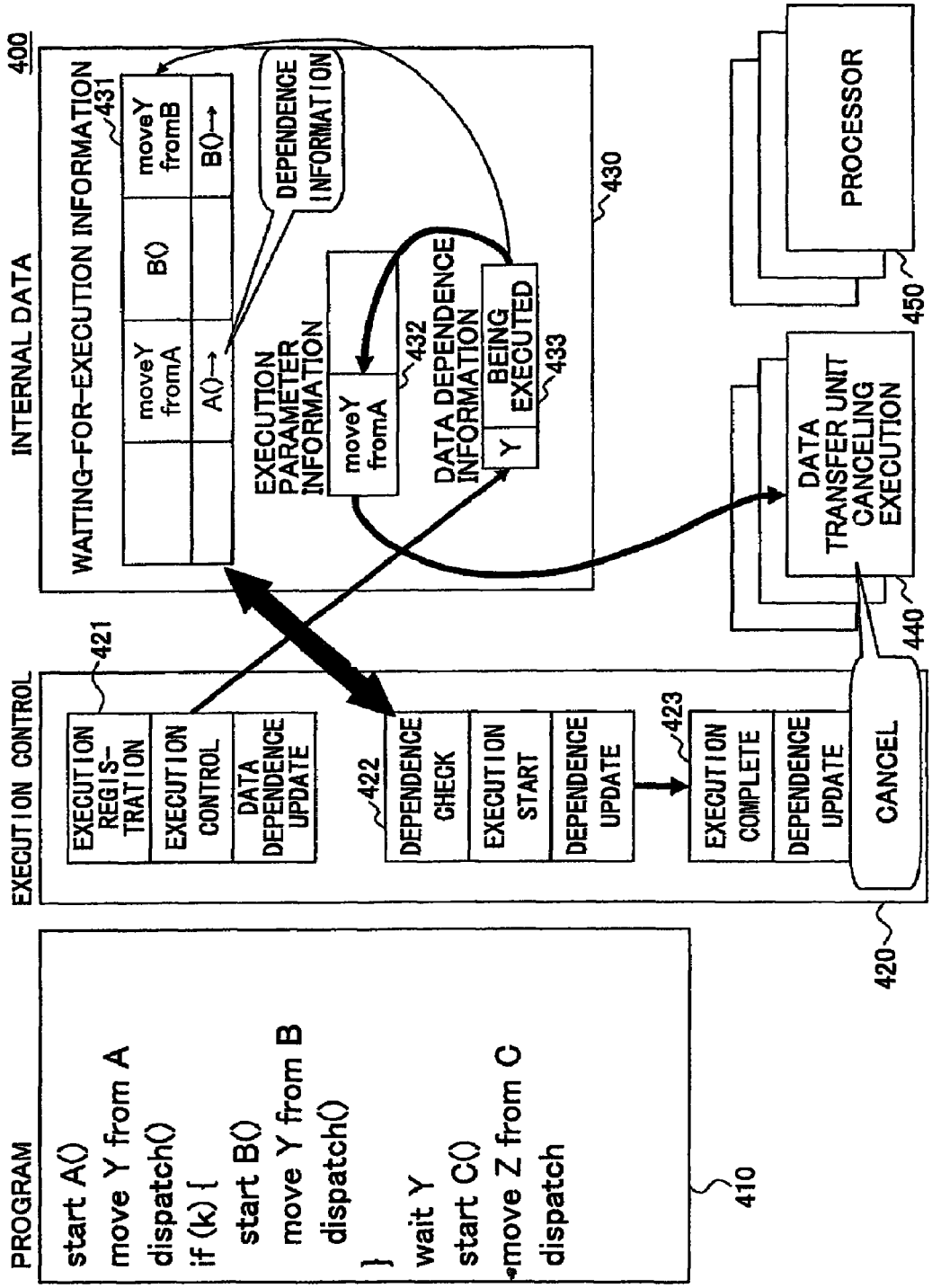

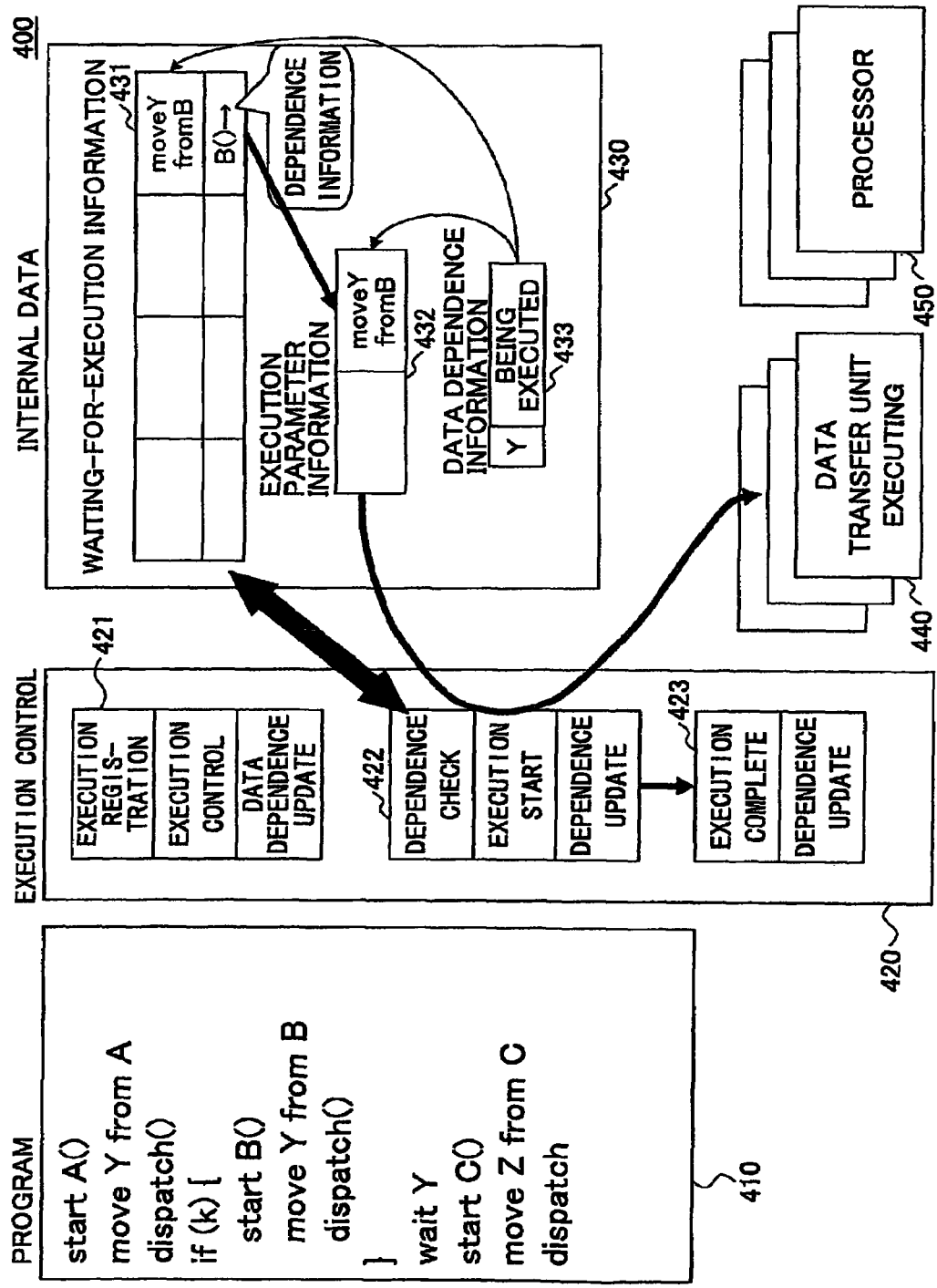

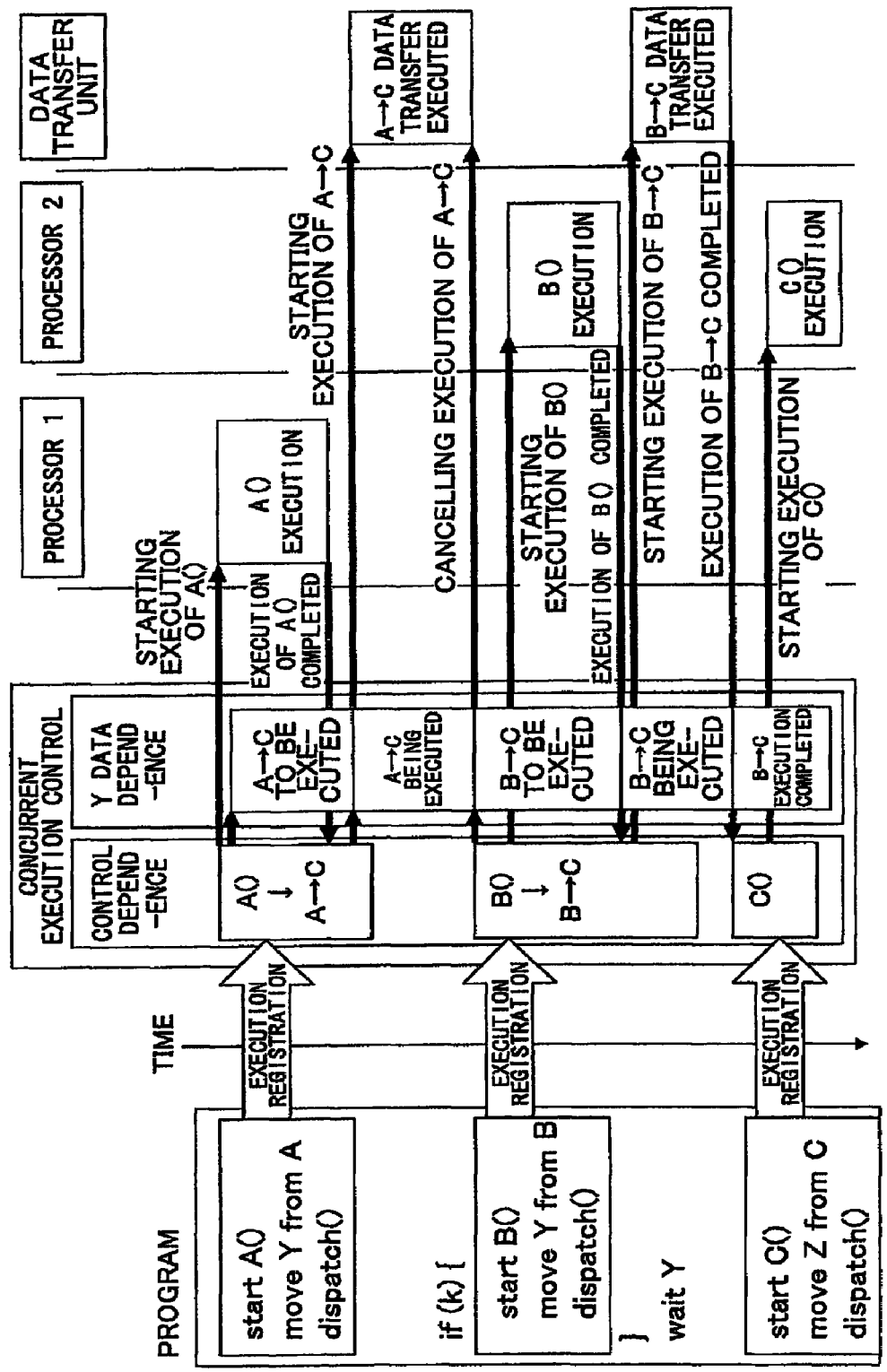

MULTIPROCESSOR SYSTEM AND CONTROL METHOD THEREOF

CROSS-REFERENCE TO RELATED APPLICATIONS

This application is a U.S. continuation application filed under 35 USC 111(a) claiming benefit under 35 USC 120 and 365(c) of PCT application JP2007/055743, filed Mar. 20, 2007. The foregoing application is hereby incorporated herein by reference.

FIELD

The embodiment discussed herein relates to a multiprocessor system such as a multi-core microprocessor, a method of controlling a multiprocessor system, and a computer program that causes a multiprocessor system to perform the method.

BACKGROUND

Multiprocessor systems such as microprocessors with multiple CPU cores embedded are prevailing. The multiple CPU cores concurrently run respective computer programs to spectacularly improve the processing performance of the system.

The efficient performance of computer programs by such a multiprocessor system may be achieved by means of a remote procedure call, with which a client in a server-client computer system may request a server for processing in a form of a procedure (function) call. For a remote procedure call, the client requests the server for processing and then needs to wait for the completion of processing by the server. An asynchronous remote procedure call may be applied to avoid the client's waiting. That is, as illustrated in FIG. 1, the concurrent execution of computer programs may be achieved by one processor issuing asynchronous remote procedure calls to other multiple processors.

FIG. 1 illustrates the concurrent execution of computer programs using the asynchronous remote procedure call. A pseudo instruction "start" is used for a procedure requesting processor to request a procedure executing processor to execute a specified procedure (function). Another pseudo instruction "wait" is used for the procedure requesting processor to wait for the completion of the specified procedure. FIG. 1 illustrates the case in which the procedure requesting processor uses asynchronous remote procedure calls to request the execution of procedure (function) A to the procedure executing processor 1, the execution of procedure B to the procedure executing processor 2, and the execution of procedure C to the procedure executing processor 3. The procedure requesting processor executes procedure D by itself. This allows a multiprocessor system illustrated in FIG. 1 to concurrently execute four (4) procedures.

The order of waiting matters in the concurrent execution using the asynchronous remote procedure call. FIG. 2 illustrates the order of waiting that matters in the concurrent execution using the asynchronous remote procedure call. As illustrated, the procedure requesting processor requests the procedure executing processor 1 to execute procedures (functions) A and C and the procedure executing processor 2 to execute procedures B and D. The procedure requesting processor is programmed to request the processors 1 and 2 to start procedures A and B, respectively. Under an assumption that the processor 1 completes the execution of procedure A sooner than the processor 2 completes the execution of procedure B, the procedure requesting processor is programmed to wait for the completion of the procedure A by the processor 1 and to request the processor 1 to start procedure C. Then, the procedure requesting processor is programmed to wait for the completion of the procedure B by the processor 2 and to request the processor 2 to start procedure D.

However, the processor 2 may complete the execution of procedure B sooner than the processor 1 completes the execution of procedure A. In such a case, even though the processor 2 has completed the execution of procedure B, the processor 2 may not start the execution of the procedure D until the processor 1 completes the execution of the procedure A. The processor 2 needs to wait in vain.

Such a problem may be solved by queuing the execution of procedures at a procedure executing processor as illustrated in FIG. 3. For example, the procedure requesting processor may queue the execution of procedure C in the procedure executing processor 1 by requesting in advance the executing of the procedure C subject to the completion of the procedure A. The procedure executing processor has a computer program (procedure call program) for executing one or more procedures specified by the procedure requesting processor. The procedure call program may queue the one or more procedures. The procedure requesting processor may request the procedure executing processor 1 for the execution of procedure C without waiting for the completion of procedure A, for example. The queuing allows the order-of-waiting problem to be solved, resulting in the reduction of time waiting in vain.

A microprocessor is proposed and known in the art that includes multiple execution units and a scheduler for scheduling processing by the multiple execution units, where the scheduler attaches, to each operand, information for determining whether the operand is speculative. See patent document 1, for example.

A multiprocessor system is proposed and known in the art that includes cache memories for respective processors, which further includes a memory system controller to reduce transactions with a main memory.

[Patent Document 1] Japanese Laid-open Patent Application No. 2005-537567

[Patent Document 2] Japanese Laid-open Patent Application No. 2006-48406

SUMMARY

According to an aspect of the embodiment, a multiprocessor system includes a plurality of processors, an execution control unit to control processing by the plurality of processors and data transfer between the plurality of processors, and an internal data storage unit to store data dependence information indicating status of the data transfer, wherein if control flow of processing by a processor is fixed after a preceding data transfer is registered for execution and another data transfer to a same destination as the preceding data transfer is necessary, the execution control unit cancels the preceding data transfer based on the data dependence information.

The object and advantages of the disclosure will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 illustrates the configuration of a conventional multiprocessor system;

FIG. 11 illustrates the configuration of a multiprocessor system according to a first embodiment;

FIGS. 12A-G illustrate an exemplary operation 1 of the multiprocessor system according to a first embodiment;

FIGS. 14A-D illustrate an exemplary operation 2 of the multiprocessor system according to the first embodiment;

FIGS. 16A-E illustrate an exemplary operation 3 of the multiprocessor system according to the first embodiment;

FIG. 17 illustrates the temporal sequence of the exemplary operation 3 of the multiprocessor system according to the first embodiment;

DESCRIPTION OF EMBODIMENTS

Figure 4:
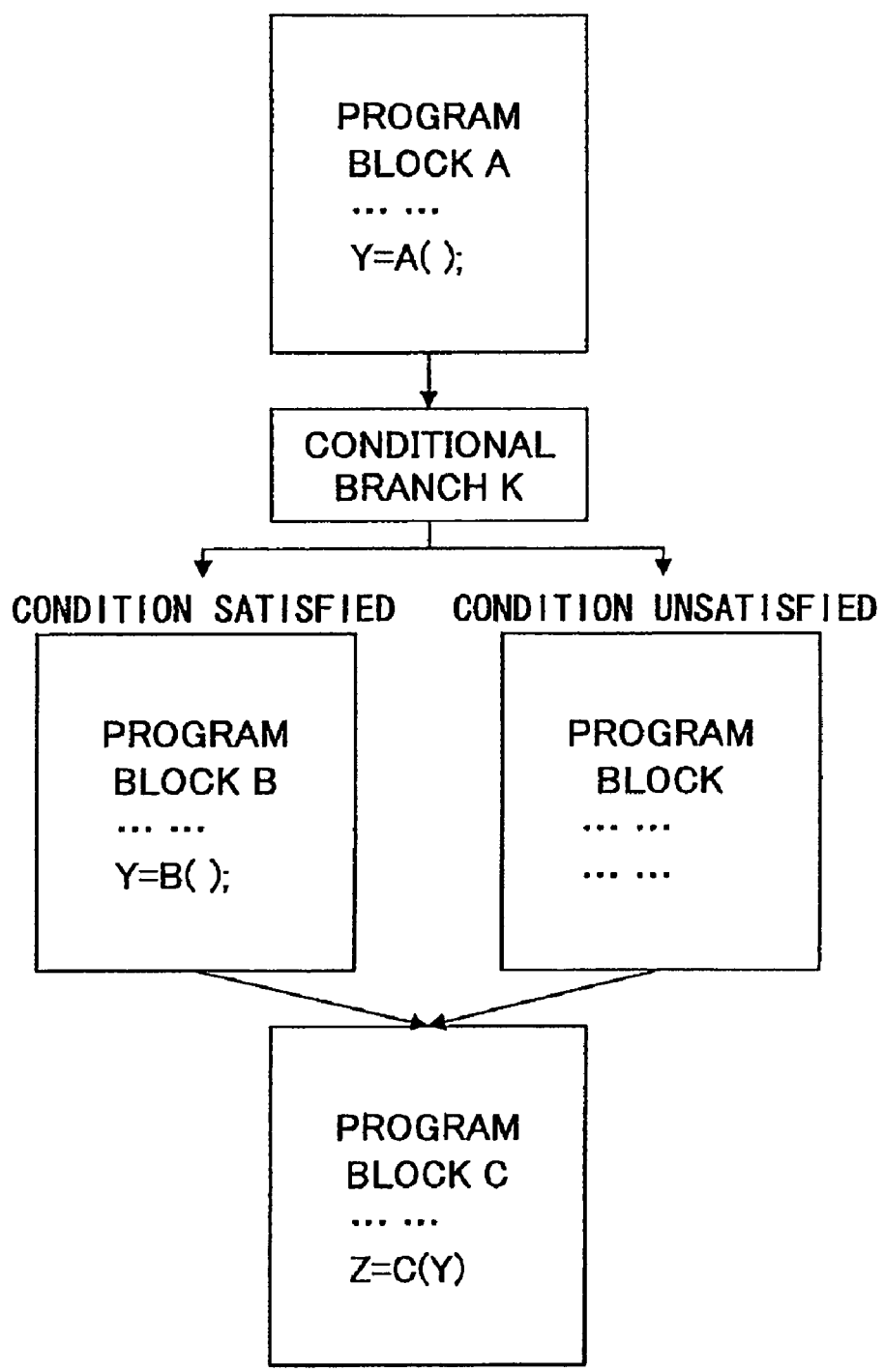
FIG. 4 illustrates an exemplary computer program assumed to be executed by a multiprocessor system.

An assumption is made that a computer program structured as illustrated in FIG. 4 is to be executed using an asynchronous remote procedure call by a multiprocessor system. Such a structure corresponds to the following computer program:

```
Y=A( );
If (k) {
  Y=B( )
}
Z=C(Y)
```

If the condition "k" is satisfied, the result B( ) of the program block B is used in the program block C. Otherwise, if the condition "k" is not satisfied, the result A( ) of the program block A is used in the program block C instead. Then, the flow of processing is fixed.

In the computer program discussed above, the program block A writes value A( ) in a variable Y. Then, at a conditional branch "k", if the condition "k" is satisfied, the program block B overwrites the variable Y with another value B( ). If the condition "k" is not satisfied, the variable Y maintains the value written in the program block A. The value Y is used in the program block C.

In a multiprocessor system, multiple program blocks of a computer program may be executed by respective processors in a distributed manner. A further assumption is made that the program blocks A, B and C are executed by different processors. The exemplary computer program requires that, when the execution of a program block is completed, the processing result of the program block is transferred to another program block that will use the processing result. For example, if the program blocks A and B have no dependence, the order of their execution is not restricted, thus which program block, A or B, is to be executed first is unknown. Therefore, if the transfer of processing result is performed without any restriction as soon as the execution of a program block is completed, the following problem would arise: if the condition "k" is satisfied and the program block C is to use the result of program block B, and if the program block A is completed after the program block B, the program block C erroneously uses the result of program block A, instead of the result of program block B.

Figure 5:
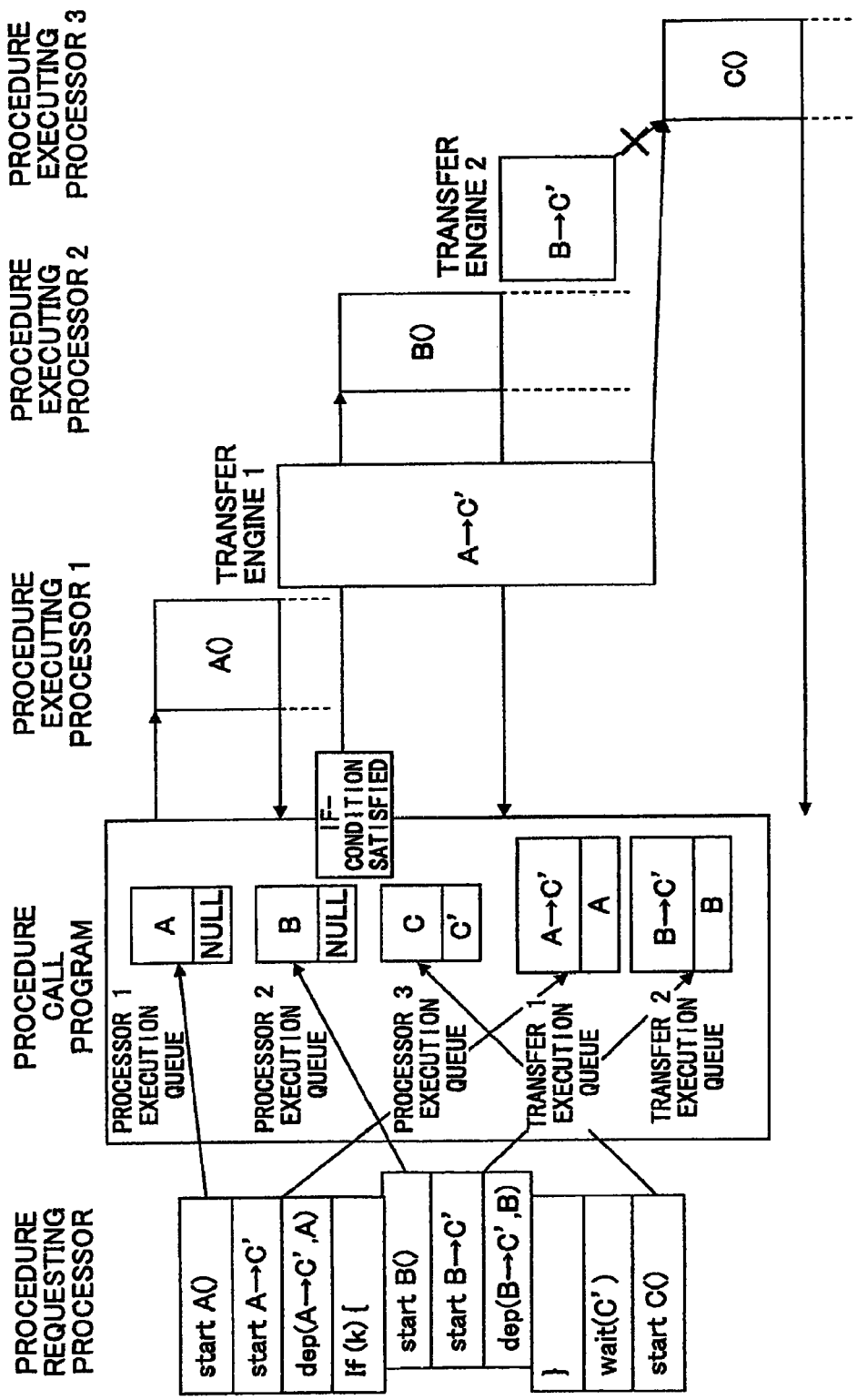
FIG. 5 illustrates a problem associated with a conditional branching.

The problem arising in such a case is described in detail with respect to FIG. 5. FIG. 5 illustrates a problem arising in the case of data transfer. FIG. 5 illustrates the case in which a procedure executing processor 1 executes a function (program block) A, a procedure executing processor 2 executes a function B, and a procedure executing processor 2 executes a function C.

A procedure requesting processor requests the (procedure execution) processors 1, 2 and 3 for the execution of respective functions (program blocks) in accordance with a computer program illustrated at the left side in FIG. 5. For ease of description, the following pseudo instructions are used in the computer program. For example, "start A( )" is a pseudo instruction indicating the registration of execution of the function A to be executed by the processor 1. "start A→C'" is a pseudo instruction indicating the registration of execution to data transfer the processing result of the function A to the function C. "dep (A→C', A)" is a pseudo instruction indicating dependence of the data transfer of processing result from the function A to the function C, on the completion of execution of the function A. "wait (C')" is a pseudo instruction requesting to wait for the completion of the data transfer to the program block C.

Figure 1:
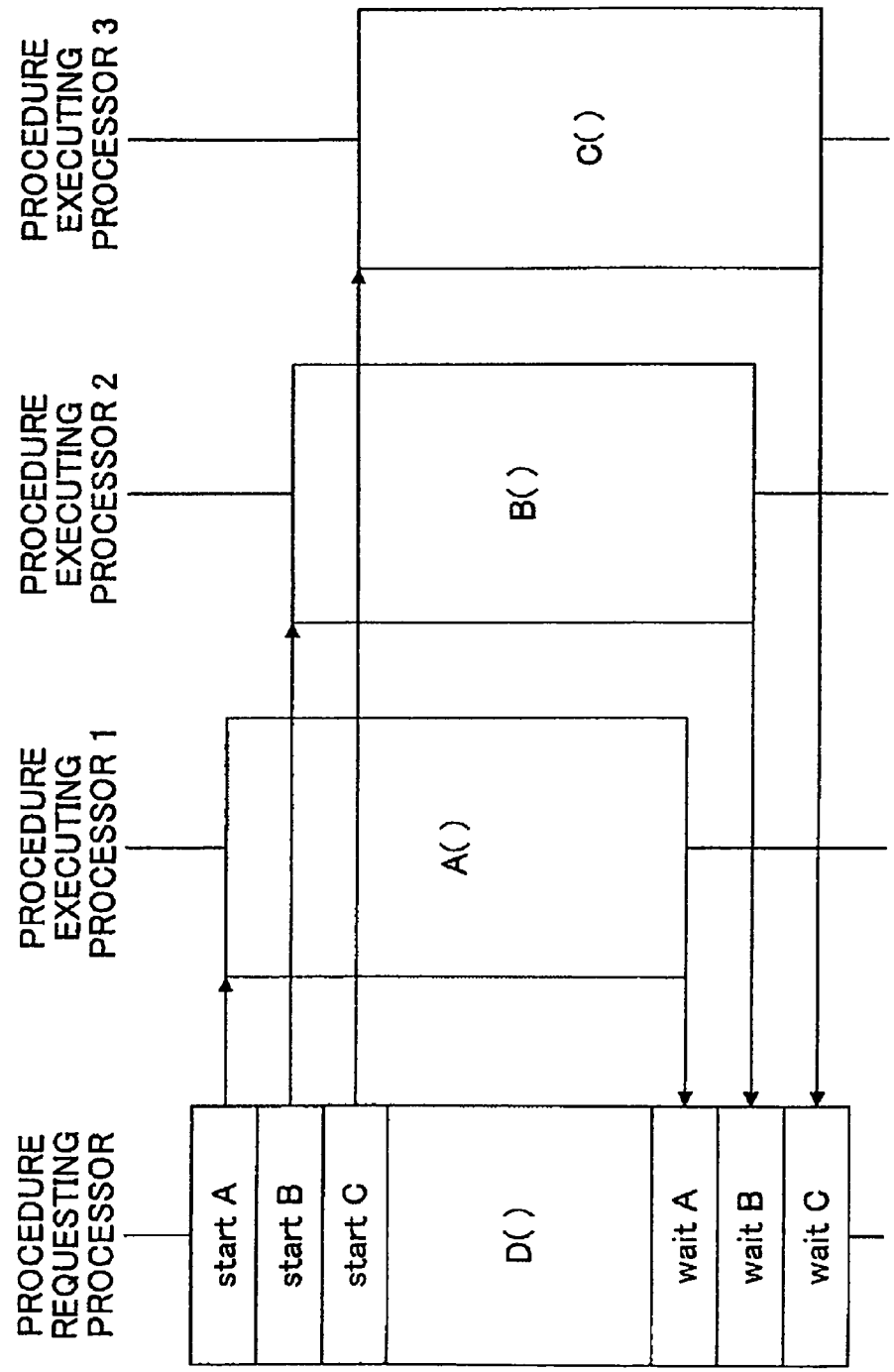
FIG. 1 illustrates concurrent processing using an asynchronous remote procedure call.
Figure 2:
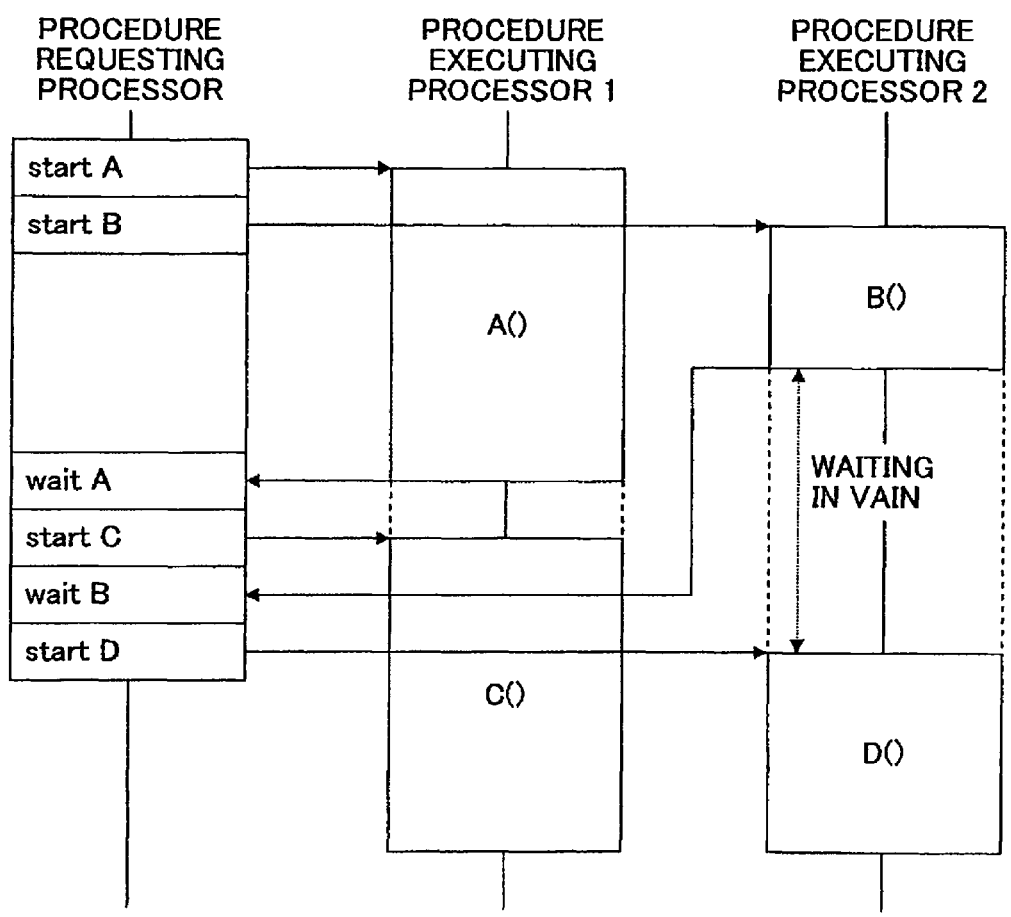
FIG. 2 illustrates waiting order problem.
Figure 3:
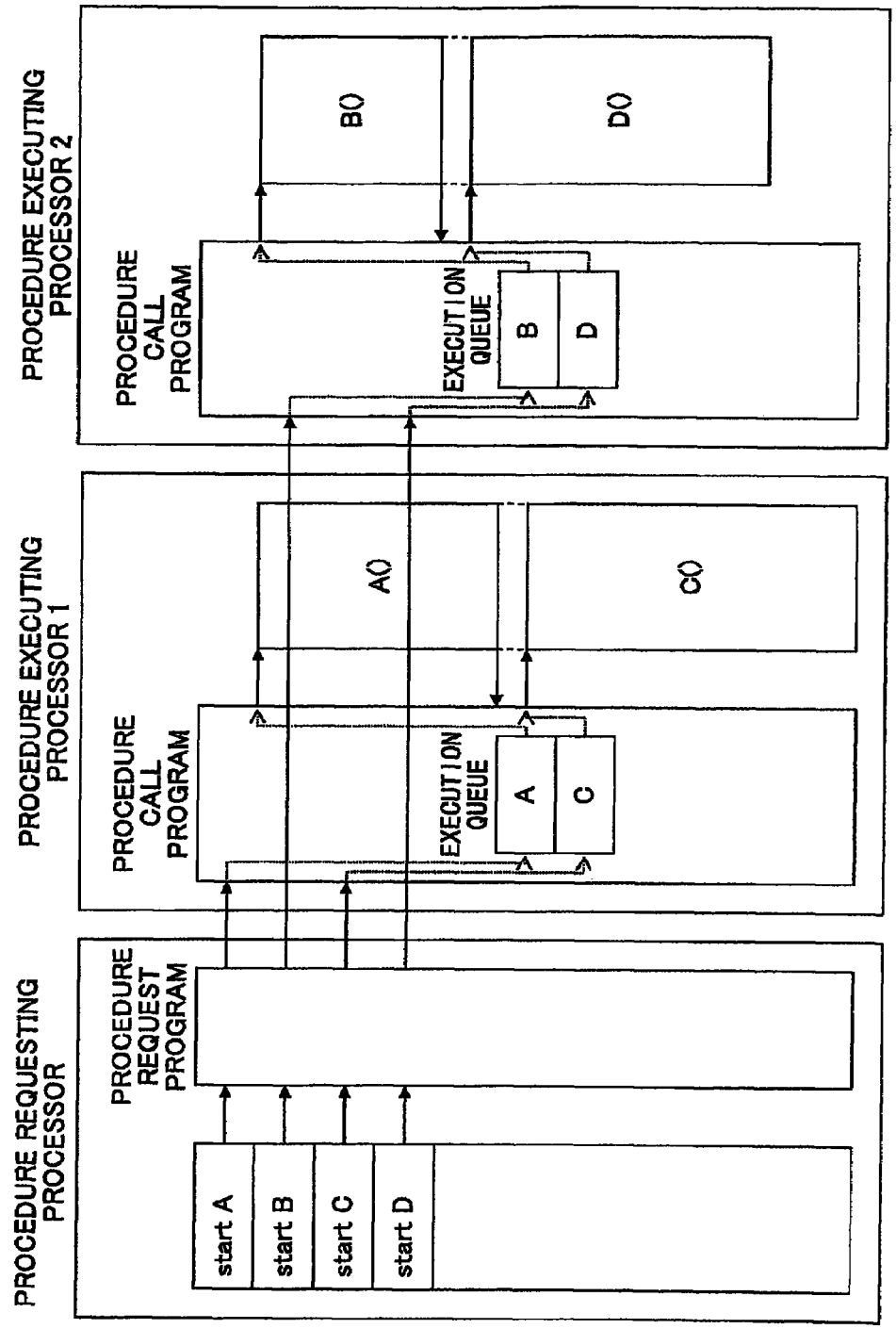
FIG. 3 illustrates the solution of waiting order problem using queuing.

The procedure call program of the (procedure execution) processors 1, 2 and 3 registers execution queue according to the computer program of the procedure requesting processor as illustrated in FIG. 5. The step "start A( )" of the procedure requesting processor generates the execution queue (A;

NULL) for the processor 1. In FIG. 5, for example, the execution queue (A; NULL) is depicted as a 2-layered box indicating the function A to be executed in its upper layer and the dependence of execution (processing NULL to be completed in advance) in its lower layer. "NULL" indicates that there is no particular dependence. Similarly, "start B( )" generates an execution queue (B; NULL) for the processor 2. "wait (C')" and "start C( )" generate an execution queue (C; C') for the processor 3. "C'" in the lower layer of the execution queue for the processor 3 indicates dependence in which the data transfer to the program block C is to be completed in advance. Similarly, "start A→C'" and "dep (A→C', A)" generate an execution queue (A→C'; A) for a transfer engine 1. "start B→C'" and "dep (B→C', B)" generate an execution queue (B→C'; B) for a transfer engine 2. It is noted that a procedure call program is provided to each procedure executing processor in FIG. 3, but all procedure call programs of the procedure executing processors are combined into one program for ease of illustration in FIG. 5.

The operation of the procedure executing processors is now described. The procedure executing processor 1 executes the function A in accordance with the processor 1 execution queue of the procedure call program. Upon the completion of the execution of the function A by the procedure executing processor 1, a transfer engine 1 transfers the processing result of the function A from the function A to the function C in accordance with the transfer 1 execution queue of the procedure call program. If the branching condition "k" is met, the procedure executing processor 2 executes the function B in accordance with the processor 2 execution queue of the procedure call program. Upon the completion of the execution of the function B by the procedure executing processor 2, a transfer engine 2 transfers the processing result of the function B from the function B to the function C in accordance with the transfer 2 execution queue of the procedure call program.

In the case in which the transfer of the processing result of the function B to the function C is completed before the transfer of the processing result of the function A to the function C, the function C erroneously uses the processing result of the function A even if the branching condition "k" is met. The erroneous use is indicated by "X" on an arrow from the transfer engine 2 to the procedure executing processor 3.

Figure 6:
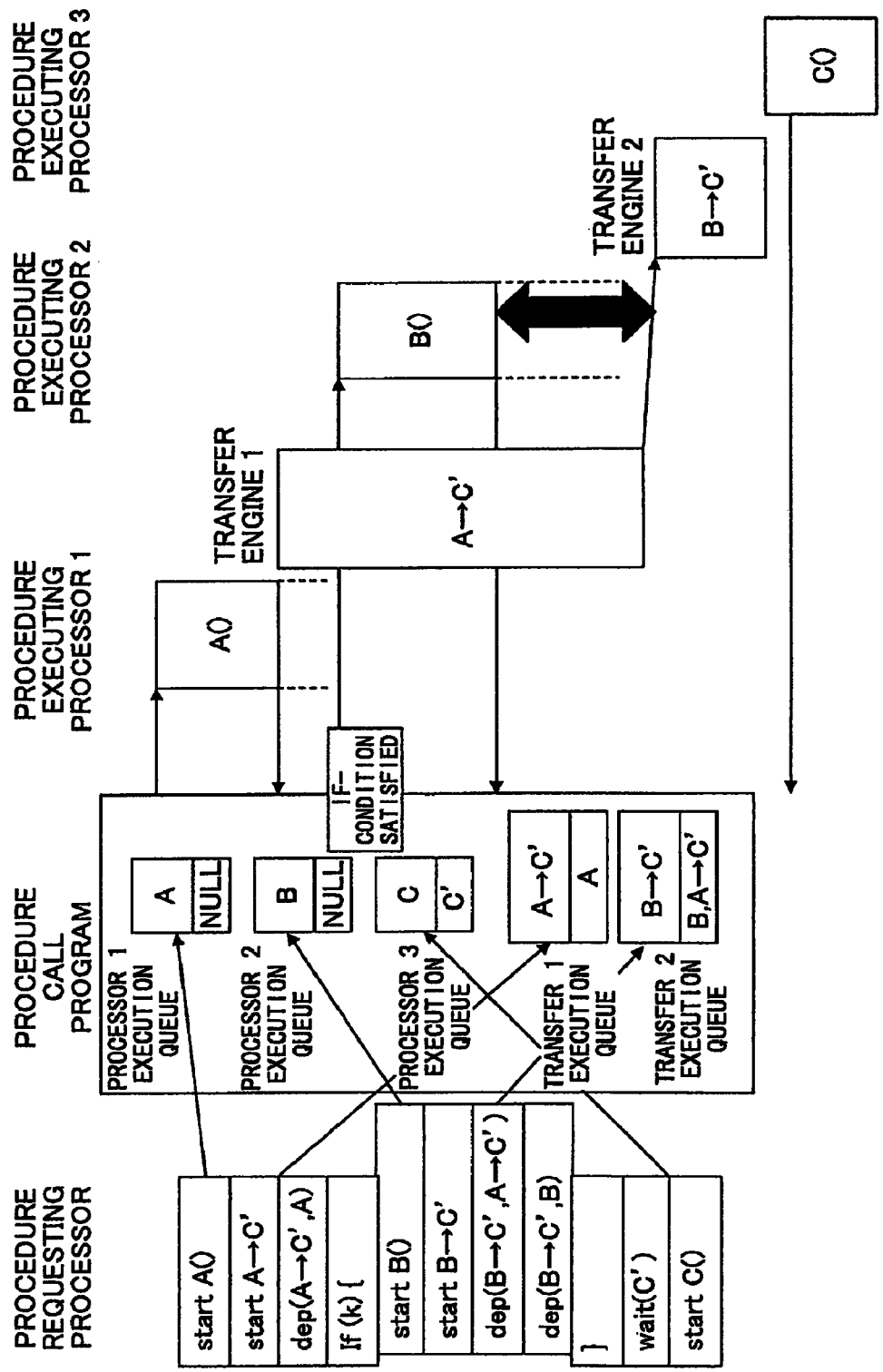
FIG. 6 illustrates a problem associated with a conventional solution.

In order to solve this problem, the preceding data transfer (A→C' in this case) is completed first, then the following data transfer (B→C' in this case) is started, which ensures that the function C uses the processing result of the function A, as illustrated in FIG. 6. This may be achieved by adding dependence "dep (B→C', A→C')" to "start B→C'" in the procedure call program of the procedure requesting processor in addition to "dep (B→C', B)."

In this case, when the execution of the function A is completed, the processing result of the function A is transferred to the function C. When a determination is made of whether the branching condition "k" is met, the processing result to be used, that is, the processing result of the function A or that of the function B, will be fixed. If the branching condition "k" is not met, the processing result of the function A is used. The data transfer from the function A to the function C is continued and upon the completion of the data transfer, the function C is executed. If the branching condition "k" is met, the processing result of the function B, instead of A, will be used. When the execution of the function B is completed, if the data transfer from the function A to the function C has not been completed yet, the data transfer is continued until its completion, and then the data transfer from the function B to the function C is started. Upon the completion of the data transfer from the function B to the function C, the execution of the function C is started.

However, in the case in which the branching condition "k" is met and the processing result of the function B is to be used, if the data transfer from the function A to the function C has not been completed yet, the data transfer from the function B to the function C may not be started even if the execution of the function B has been completed, which result in undesirable delay of the function C.

Another way to solve the problem described with respect to FIG. 5 is to start the data transfer A→C' or B→C' after the determination is made of which processing result, A or B, is to be used. This may be achieved by executing "start A→C'; dep (A-C', A)" after the branching condition "k" is met in the procedure call program of the procedure requesting processor.

In this case, even if the execution of the function A is completed, the data transfer from the function A to the function C will not be started soon. The data transfer is held off until the determination is made of whether the branching condition "k" is met and of which processing result, A or B, is to be used. If the branching condition "k" is not met, the determination is made that the processing result of the function A is to be used, and thus the data transfer from A to C is started. On the other hand, if the branching condition "k" is met, the determination is made that the processing result of the function B is to be used, and thus the data transfer from B to C is started.

However, in the case in which the branching condition "k" is not met and the processing result of the function B is to be used, even if the execution of the function A is completed, the processing result of the function A is not transferred soon from the function A to the function C to wait for the determination of whether the branching condition "k" is met, which results in the delay in the execution of the function C.

Figure 8:
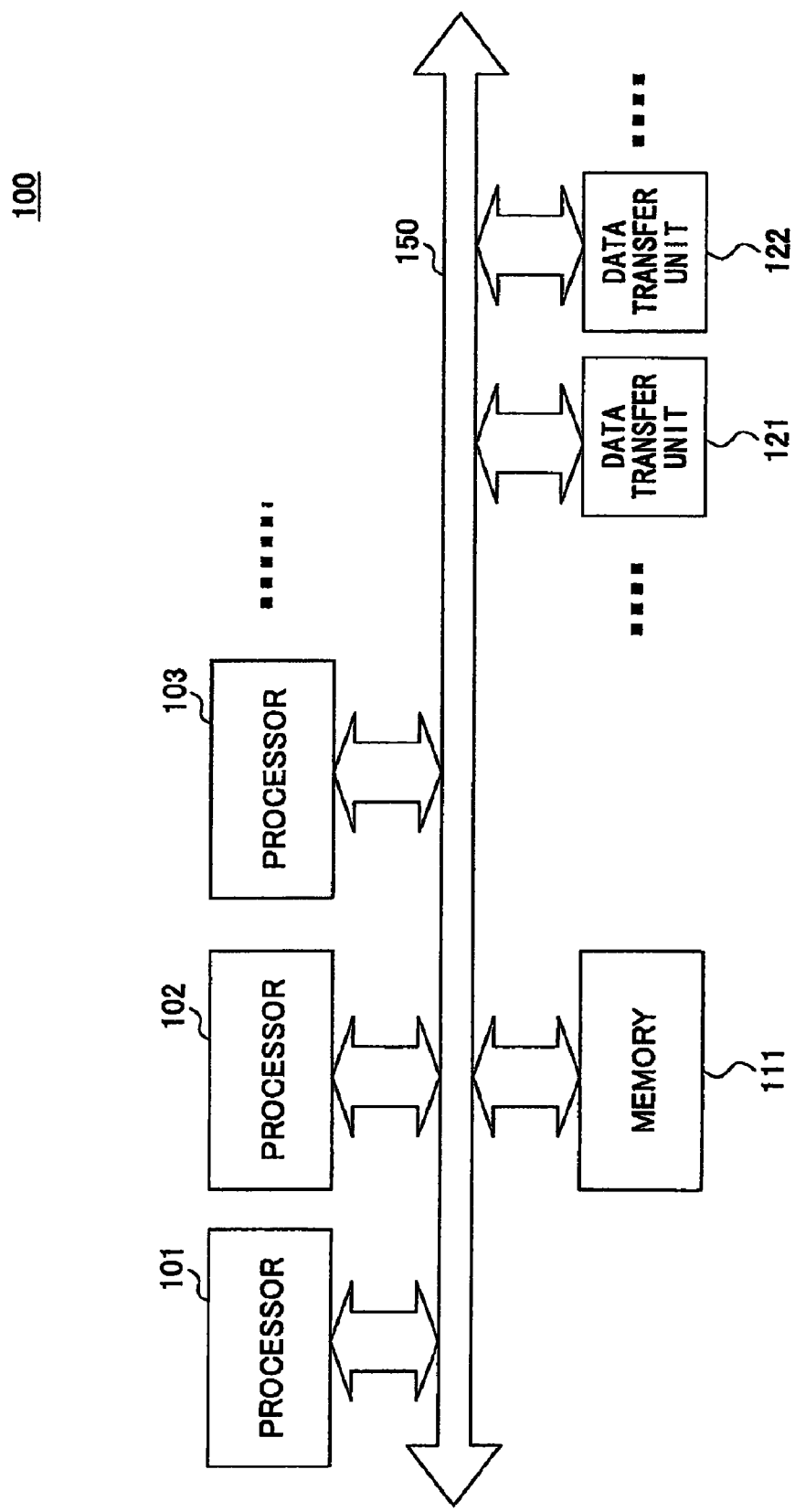
FIG. 8 illustrates an exemplary centralized multiprocessor system according to an embodiment.

The hardware aspect of a multiprocessor system according to the embodiment is described first. FIG. 8 is a block diagram illustrating a centralized multiprocessor system which is the hardware of a concurrent program execution apparatus according to an embodiment. The centralized multiprocessor system 100 illustrated in FIG. 8 includes multiple processors 101, 102, 103, . . . , memory 111, and data transfer units 121, 122. These components are arranged to exchange instructions, address information, and data via a common system bus 150. Each processor 101, 102 and 103 may run a given computer program to process data retrieved from the memory 111 to transfer the processed data to another processor 101, 102 and 103 and/or to write the processed data to the memory 111. The memory 111 may store computer programs to be executed by the processors 101, 102 and 103, data to be processed by the processor 101, 102 and 103, and the resulting processed data. The data transfer unit 121, 122, . . . may control the data transfer between the processors 101, 102, 103, . . . , or between memory regions in the memory 111 which is managed by the processors 101, 102, 103, . . . in the centralized multiprocessor system 100. The data transfer unit may be a direct memory access (DMA) controller.

Figure 9:
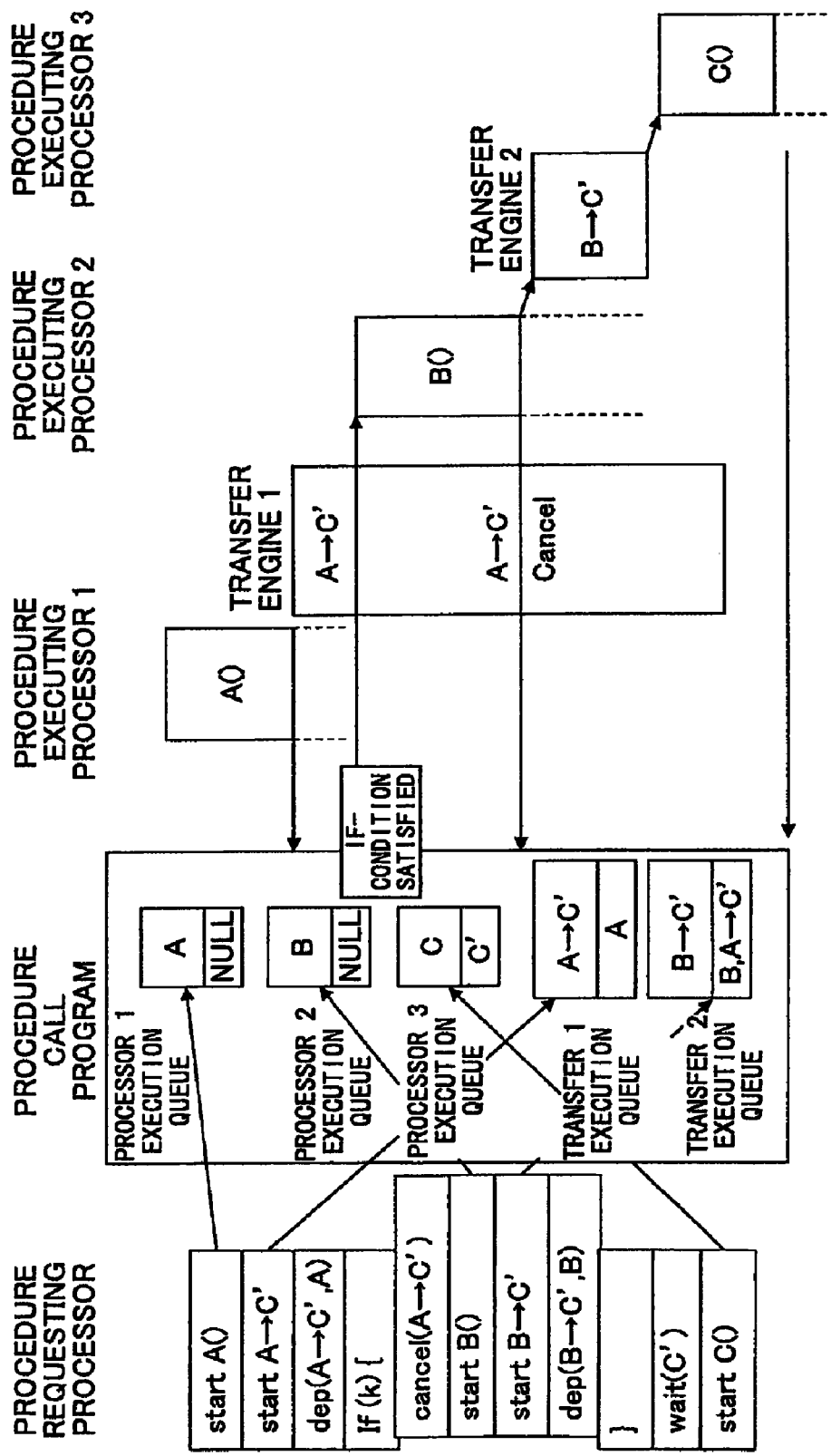
FIG. 9 illustrates the cancellation of a preceding data transfer according to the embodiment.

A multiprocessor system according to the embodiment is described now. FIG. 9 illustrates the control operation of the multiprocessor system according to an embodiment. FIG. 9 depicts, from left to right, (a procedure request program for) a procedure requesting processor, a procedure call program (corresponding to the procedure request program), and the operation of each of procedure executing processor 1, 2 and 3 corresponding to the procedure call program. FIG. 9 further depicts the data transfer by a transfer engine 1 between the operation of the procedure executing processor 1 and 2, and the data transfer by a transfer engine 2 between the operation of the procedure executing processor 2 and 3. For example, the procedure executing processor 1, 2 and 3 correspond to the processors 101, 102 and 103, respectively, illustrated in FIG. 8. For example, the transfer engines 1 and 2 correspond to the data transfer unit 121 and 122, respectively, illustrated in FIG. 8. The operation of the procedure executing processors 1, 2 and 3 and the transfer engine 1 and 2 is illustrated as time flows downwardly. The procedure requesting processor may be any one of the procedure executing processors 101, 102 and 103, or another processor (not illustrated in FIG. 8) provided in the multiprocessor system 100.

A processor 1 execution queue (A; NULL) is generated in the procedure call program according to a program step "start A( )" in the procedure requesting processor. The term "NULL" indicates that there is no dependence associated with the execution of the procedure (function) A. The procedure executing processor 1 executes the function A( ) in accordance with the processor 1 execution queue. In FIG. 9, the processor 1 execution queue (A; NULL) is illustrated as a two-layered block, in which processing to be executed (the program block A in this case) is indicated in the upper layer and a dependence (NULL in this case) associated with the processing is indicated in the lower layer. The other execution queues are illustrated in the similar manner.

Then, a transfer 1 execution queue (A→C'; A) is generated in the procedure call program according to a program step "start A→C" of the procedure requesting processor. This indicates that, after completing the execution of the function A, a data transfer A→C is to be performed to transfer the resulting data of the function A( ) from the processor 1 that executed the function A( ) to the processor 3 that is to execute the function C( ) using the resulting data. After the procedure executing processor 1 completes the execution of the function A( ), the transfer engine 1 data-transfers the processing result of A( ) by the processor 1 to the processor 3 that is to execute the function C( ) according to the transfer 1 execution queue. The data transfer may be performed between the cache memories in the case in which the processors 1 and 3 are provided with cache memories, for example, or may be performed between memory regions in the memory 111 (illustrated in FIG. 8). The data transfer may be performed between a cache memory and a memory region in the memory 111. The data transfer between the processor 1 that has executed the function A( ) and the processor 3 that is to execute the function C( ) using the processing result of the function A( ) may be referred to as a data transfer between the functions A( ) and C( ), which may be indicated as A( )→C( ) or A→C'. In addition, the data transfer to the processor 3 that is to execute the function C( ) may be indicated as C'.

Steps in "If(k)" sentence are described now. If the branching condition "k" is met (satisfied), a program step "cancel (A→C')" cancels the data transfer by the transfer engine 1 of the processing result of the function A( ) to the function C( ).

A processor 2 execution queue (B; NULL) is generated in the procedure call program according to a program step "start B( )" in the procedure requesting processor. If the branching condition "k" is met, this causes the procedure executing processor 2 to execute the function B according to the processor 2 execution queue.

Then, a transfer 2 execution queue (B→C'; B, A→C') is generated in the procedure call program according to a program step "start B→C'" and following dep (B-C'; B). When the procedure executing processor 2 complete the execution of the function B, and the transfer engine 1 completes the data transfer A→C', the transfer engine 2 performs the data transfer B→C'. The dependence "A→C'" is not illustrated in the procedure request program for the procedure requesting processor.

Steps after the "If(k)" sentence are described now. A processor 3 execution queue (C; C') is generated in the procedure call program according to a program step "wait (C')" and following "start C( )" in the procedure requesting processor. The procedure executing processor 3 executes the function C( ) upon the completion of the data transfer C'.

As described above, when a determination is made of whether the branching condition "k" is met (satisfied), the data transfer A→C' may be cancelled. This allows the data transfer A→C' by the transfer engine 1 to be performed without waiting for the determination that the branching condition "k" is met. As a result, the problem described with respect to FIG. 7 that the data transfer A→C' needs to be held off until the fixed determination of whether the branching condition "k" is met may be solved. In addition, if the branching condition "k" is met after the data transfer A→C' is started, the data transfer A→C' may be canceled. This allows the transfer engine 2 to perform the data transfer B→C' as soon as the execution of the function B( ) is completed by the procedure executing processor 2. As a result, the problem described with respect to FIG. 6 that the data transfer A→C' by the transfer engine 1 may be completed may be solved. The cancellation of data transfer includes both the removal of the data transfer which is registered for execution and the interruption of the ongoing data transfer.

Figure 7:
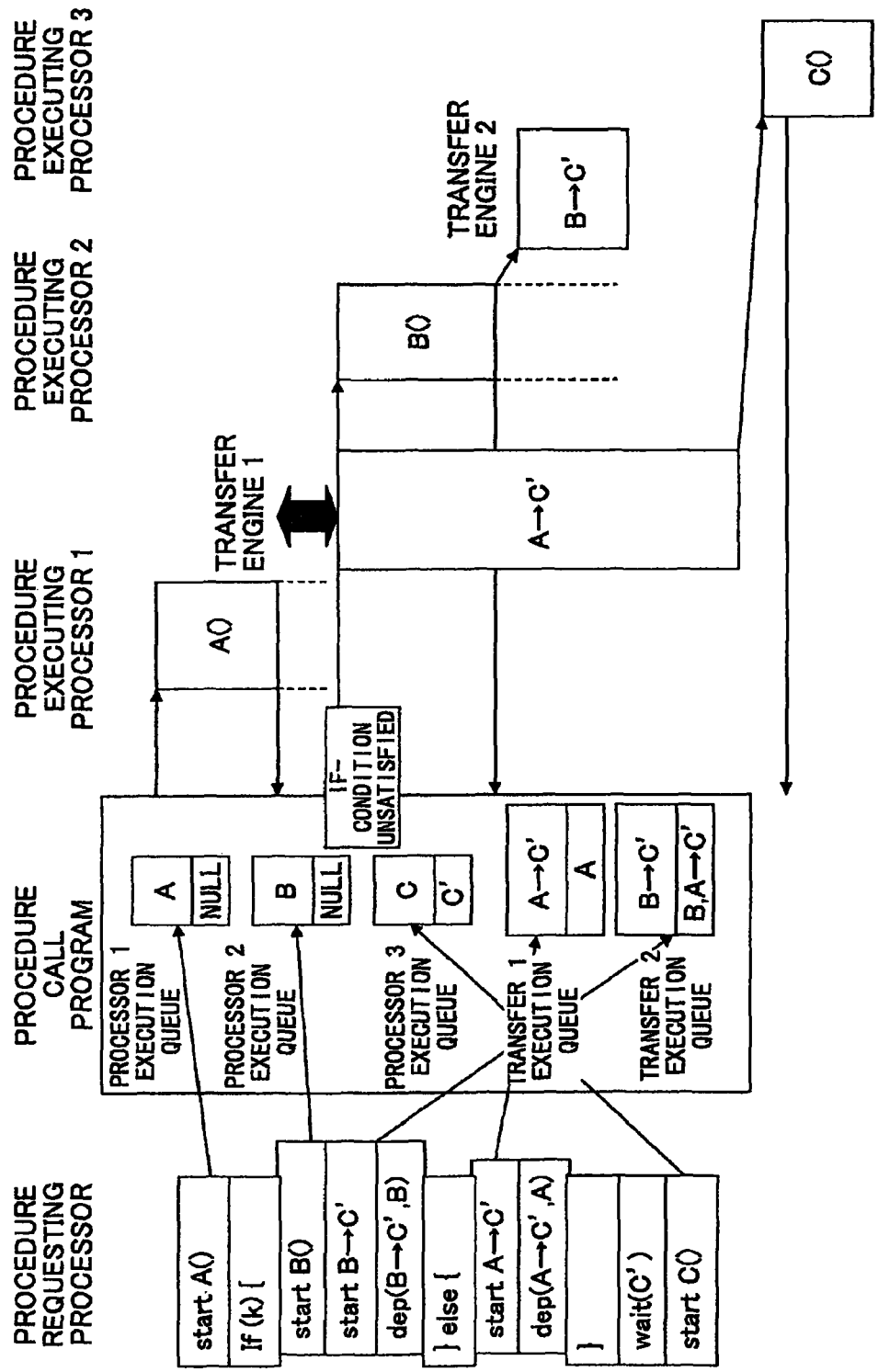
FIG. 7 illustrates another problem associated with a conventional solution.

The configuration of a conventional multiprocessor system described with respect to FIGS. 5, 6 and 7 is described next, followed by the description of the configuration of the multiprocessor system according to the embodiment. FIG. 10 illustrates a conventional multiprocessor system 300. In FIG. 10, a memory to store a computer program 310 (for a procedure requesting processor), an execution control unit 320, internal data 330, data transfer units 340, and processors 350 are depicted. The execution control unit 320 includes an execution registration unit 321, a dependence check/execution start unit 322, and an execution completion unit 323. The internal data 330 includes waiting-for-execution information 331 and execution parameter information 332.

As illustrated in FIG. 10, an assumption is made that the following computer program is executed:

Y=A( );
Z=C(Y);

The computer program 310 is the above-mentioned computer program described as one (hereinafter pseudo code) for the procedure requesting processor. Dependence of procedures is omitted in the program 310.

The execution registration unit 321 of the execution control unit 320 registers the waiting-for-execution information 331 and the execution parameter information 332 in the internal data 330 for execution in accordance with the program 310. In the waiting-for-execution information 331, procedures (function and data transfer, for example) and their dependence information may be registered for each execution unit. In FIG. 10, the procedures are indicated in the upper layer of the waiting-for-execution information 331 and the dependence of the procedures is indicated in the lower layer. The waiting-for-execution information has pointers to the execution parameter information 332 which will be described below (the pointers are depicted as arrows from the waiting-for-execution information 331 to the execution parameter information in FIG. 10). The procedure A( ) is registered with no dependence (NULL). The procedure "move Y from A" (the data transfer of processing result of the function A to a variable Y, that is, A→C') is registered with dependence information A( ). The procedure C( ) is registered with dependence information "move Y from A" (A→C'). The procedure "move Z from C" is registered with dependence information C( ).

Parameters (such as destination and source addresses of data transfer and transfer data size) that may be necessary for the execution of data transfers are stored in the execution parameter information 332 for each request for data transfer. In this case, parameters related to the data transfer "move Y from A" in which the processing result of the function A is to be transferred to the variable Y and parameters related to the data transfer "move Z from C" in which the processing result of the function C is to be transferred to the variable Z are stored in the execution parameter information 332.

The dependence check/execution start unit 322 of the execution control unit 320 checks the dependence in the waiting-for-execution information 331 for each procedure and determines whether the dependence for each procedure is satisfied in accordance with the "dispatch( )" instruction in the program 310. The dependence check/execution start unit 322 further identifies executable procedures and requests the data transfer units 340 or the processors 350 to execute the executable procedures. If the executable procedure is a data transfer, the dependence check/execution start unit 322 retrieves parameter information stored as execution parameter information 332 in the internal data 330 and sets parameters relevant to the data transfer, to the data transfer unit 340. Upon completion of processing, the data transfer unit 340 or the processor 350 which performed the completed processing notifies the execution completion unit 323 of the completion. The execution completion unit 323 updates the waiting-for-execution information 331 and the execution parameter information 332 in response to the notification.

First Embodiment

FIG. 11 illustrates an exemplary multiprocessor system 400 according to a first embodiment. Similar to the conventional multiprocessor system 300 illustrated in FIG. 10, the multiprocessor system 400 has a memory to store a computer program 410, an execution control unit 420, internal data 430, data transfer unit 440, and a processor 450. The execution control unit 420 has an execution registration unit 421, a dependence check/execution start unit 422 and an execution complete unit 423 as the execution control unit illustrated in FIG. 10 does. The execution control unit 421 is different from the execution control unit 321 illustrated in FIG. 10 in execution control and data dependence update. The dependence check/execution start unit 422 is different from the dependence check/execution start unit 322 illustrated in FIG. 10 in the dependence update. The execution complete unit 423 is also different from the execution complete unit 323 illustrated in FIG. 10 in the dependence update.

Similarly to the internal data illustrated in FIG. 10, the internal data 430 includes waiting-for-execution information 431 and execution parameter information 432, the information are basically the similar to that of the waiting-for-execution information 331 and the execution parameter information 332. The multiprocessor system 400 additionally has data dependence information 433. The data dependence information 433 indicates, for each destination of data transfer, status of the data transfer including to-be-registered, to-be-executed, being-executed and execution-completed. The similar information will be referred to for the similar destination of data transfer (data Y in this case). The data dependence information 433 includes pointers to the execution parameter information 432 (as illustrated by arrows from the data dependence information 433 to the execution parameter information 432). The data dependence information 433 further includes a pointer to dependence related to data transfer registered in the waiting-for-execution information 431 (including data transfers to be executed and data transfers that have been completed) (as illustrated by an arrow from the data dependence information 433 to the waiting-for-execution information 431).

The execution registration unit 421 refers to the data dependence information 433 upon the registration of a data transfer to perform the following operation: If the status recorded in the data dependence information 433 is "being executed," the execution registration 421 refers to the execution parameter information to identify a data transfer channel and cancels a data transfer being executed to delete the execution parameter information related to the data transfer. On the other hand, if the status recorded in the data dependence information 433 is "to be executed," the execution registration unit 421 cancels execution registration related to the data transfer and deletes the execution parameter information. Then, in both cases, the execution registration unit 421 sets the execution parameter information and sets status recorded in the data dependence information 433 to "to be executed."

The dependence check/execution start unit 422 deletes an execution registration related to a data transfer upon the start of the data transfer and sets status of the data transfer in the data dependence information 433 to "being executed." Then, the dependence check/execution start unit 422 requests the data transfer unit 440 for the data transfer.

The execution completion unit 424 deletes the execution parameter information upon the completion of the data transfer and sets the status of the data transfer in the data dependence information to "execution completed."

The multiprocessor system 400 according to an embodiment, which has the execution control unit 420 and the internal data 430, may cancel a preceding data transfer. Thus, even if a computer program includes a conditional branch, the multiprocessor system 400 may eliminate or reduce time for which the multiprocessor system 400 needs to wait in connection with a data transfer, to reduce time required for the execution of a computer program, regardless of whether branch condition is met or not.

The operation of the multiprocessor system 400 according to an embodiment is now described in more detail with respect to an exemplary operation.

A first exemplary operation is the case in which the branching condition "k" is met after the completion of a preceding data transfer, and a following data transfer is executed. In this case, because the preceding data transfer is completed when the branching condition is met, the following data transfer may be executed without the need to cancel the preceding data transfer.

A second exemplary operation is the case in which the branching condition "k" is met while a preceding data transfer is registered but has not been executed yet, and a following data transfer is to be executed. In this case, when the branching condition is met, the execution registration of the preceding data transfer is deleted.

Finally, a third exemplary operation is the case in which the branching condition "k" is met while a preceding data transfer is being executed, and a following data transfer is to be executed. In this case, when the branching condition is met, the preceding data transfer needs to be canceled.

[Exemplary Operation 1]

The first exemplary operation is the case in which the execution of a preceding data transfer is completed and then a following data transfer is registered.

Figure 12A:
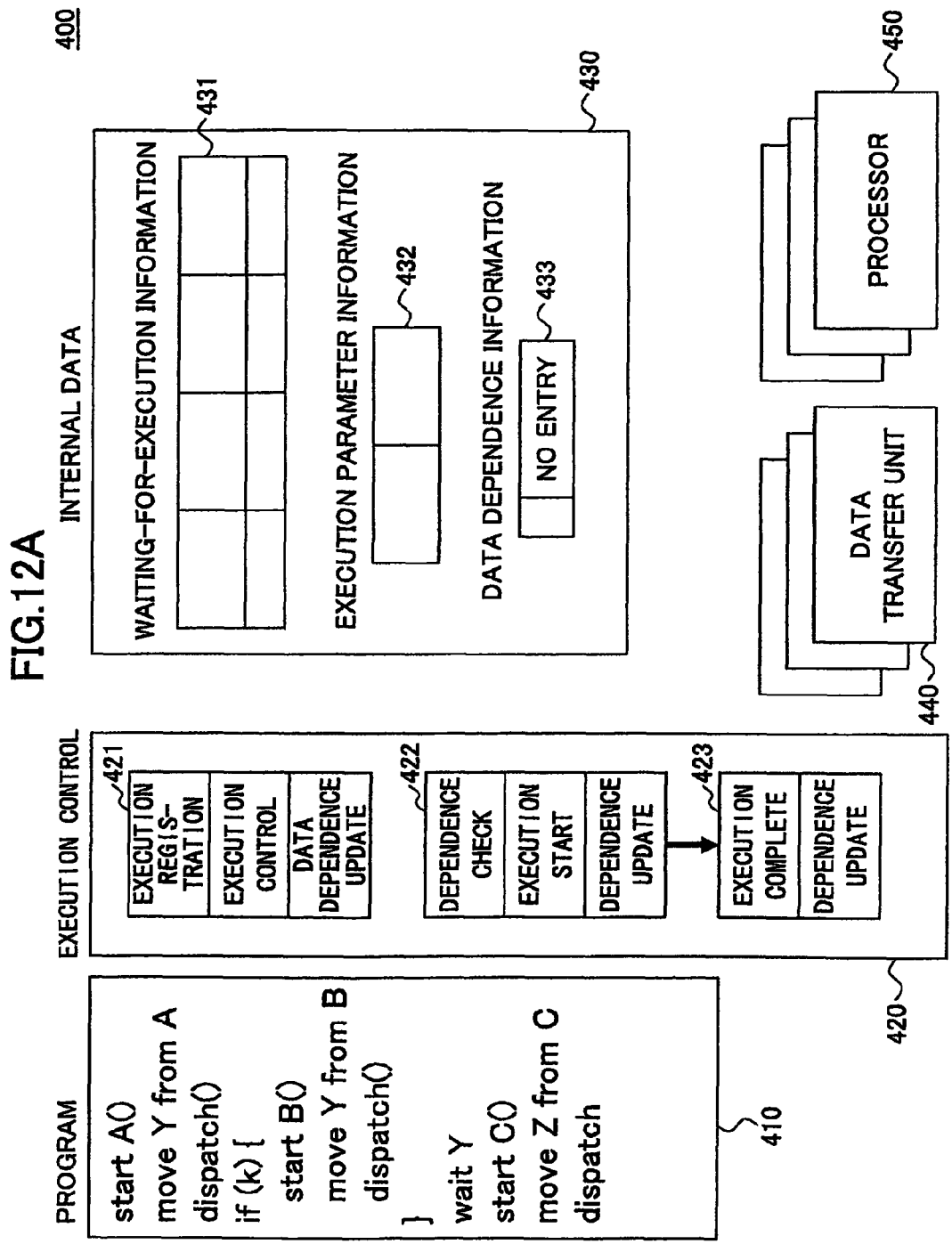

FIG. 12A illustrates a state before the start of the first exemplary operation for describing the operation of the multiprocessor system 400 according to an embodiment. For the first through third exemplary operations, an assumption is made that the following computer program is executed by the multiprocessor system 400.

```
Y=A( );
If (k) {
    Y=B( );
}
Z=C(Y);
```

The computer program may be represented as the program 410. Before starting the execution of the program 410, the waiting-for-execution information 431 and the execution parameter information 432 in the internal data 430 have no entry, and the data dependence information 433 is set to "no entry."

FIG. 12B illustrates a state in which program steps "start A( ); move Y from A;" of the program 410 are registered for execution in the first exemplary operation. The program step "start A( )" is an instruction to register a function A( ) in the waiting-for-execution information 431 for execution. The program step "move Y from A;" is an instruction to register a data transfer of the processing result of the function A( ) as a variable Y in the waiting-for-execution information 431 for execution, and to register the variable Y in the execution parameter information 432 as a parameter. The execution registration unit 421 reads the program steps to register the waiting-for-execution information 431 and the execution parameter information 432. The step "move Y from A" is a request for a data transfer, which has not been executed yet. Consequently, the execution registration unit 421 sets the execution parameter information related to the program step "move Y from A" and sets the state in the data dependence information 433 to "to be executed."

The next program step "dispatch ( )" is an instruction that requests the dependence check/execution start unit 422 to check the dependence of processing registered for execution and executes processing of which dependence has been satisfied.

Figure 12C:
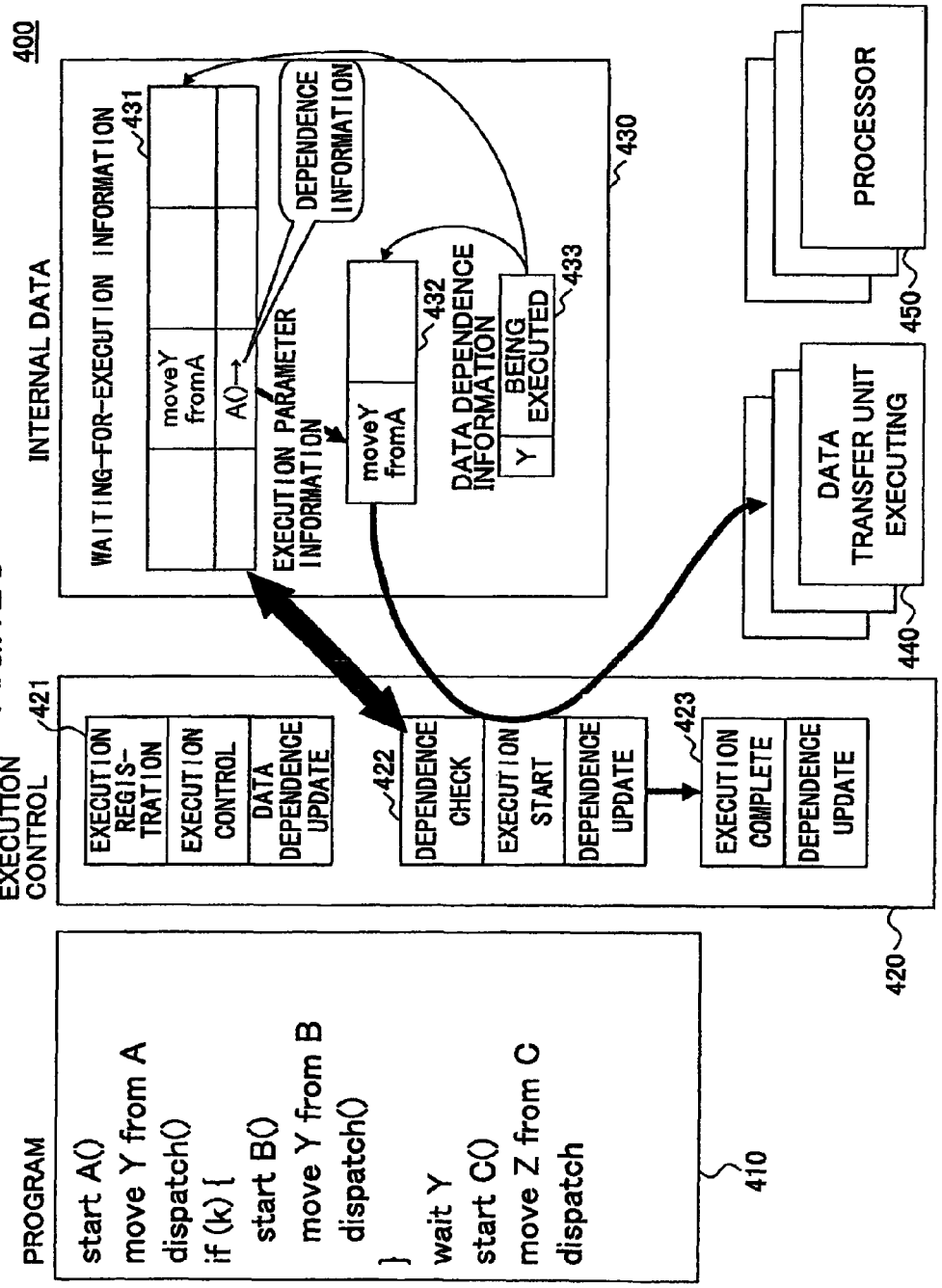

When the function A( ) which has no dependence is executed, the waiting-for-execution information of the function A( ) is removed. When the execution of the function A( ) is completed, the dependence check/execution start unit 422 checks the dependence of the waiting-for-execution information 421 to determine whether the dependence of the procedure "move Y from A" is satisfied. If it is satisfied, the dependence check/execution start unit 422 then executes the data transfer "move Y from A" and removes "move Y from A" from the waiting-for-execution information 431 (see FIG. 12C). At this time, the dependence check/execution start unit 422 removes the waiting-for-execution information 431 and sets the state of data Y in the data dependence information 433 to "being executed." The execution parameter information 432 is maintained until the data transfer "move Y from A" is complete or canceled. Then the dependence check/execution start unit 422 causes the data transfer unit 440 to perform the data transfer.

Figure 12D:
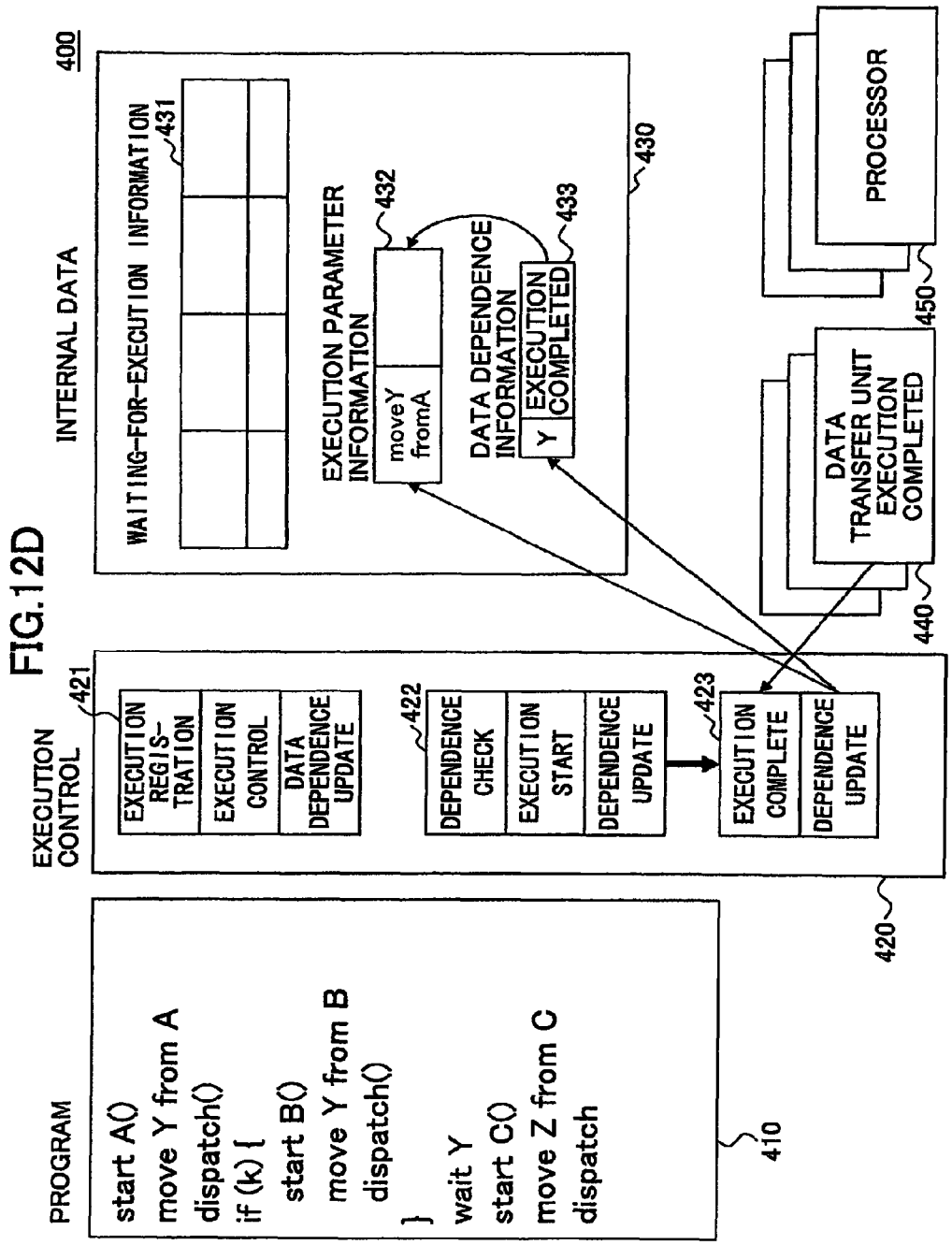

After the data transfer unit 440 completes the data transfer (see FIG. 12D), the execution completion unit 423 is notified by the data transfer unit 440 of the completion of the data transfer and deletes the execution (data transfer) parameter information. The execution completion unit 423 sets the status of the data dependence information 433 to "execution completed."

When the branching condition "k" is met, the program steps "start B( ) move Y from B;" of the program 410 is registered in the waiting-for-execution information 431 (see FIG. 12E). Since the program step "move Y from B" is a request for a data transfer, the execution registration unit 421 refers to the data dependence information 433. Before registration, the state of the data dependence information 433 is set to "execution completed" (see the data dependence information 433 illustrated in FIG. 12D). Hence, the execution registration unit 421 sets the execution parameter information and further sets the status of the data dependence information 433 to "to be executed" (see the data dependence information 433 illustrated in FIG. 12E). The dependence check/execution start unit 422 checks the dependence information of the waiting-for-execution information 431 and executes processing that may be executed (in this case, the function B( ).

Upon the completed execution of the function B( )(see FIG. 12F), the dependence check/execution start unit 422 determines that the dependence of the data transfer "move Y from B." The dependence check/execution start unit 422 deletes the execution registration of the data transfer "move Y from B" based on the determination, and sets the status related to data Y in the data dependence information 433 to "being executed," and causes the data transfer unit 440 to perform the data transfer. The execution parameter information 432 related to the data transfer "move Y from B" is retained.

Upon completion of the data transfer, the data transfer unit 440 notifies the execution completion unit 423 of the completion of the data transfer. The execution completion unit 423 deletes the execution (data transfer) parameter information 432 in response to the notification, and sets the status of the data transfer in the data dependence information 433 to "execution completed."

The data transfer of the execution result of the function B( ) to data Y is completed as a result of the process described above. The other program steps "wait Y; start C( ); move Z from C; dispatch ( )" are similarly executed to complete the execution of the program 410.

Figure 13:
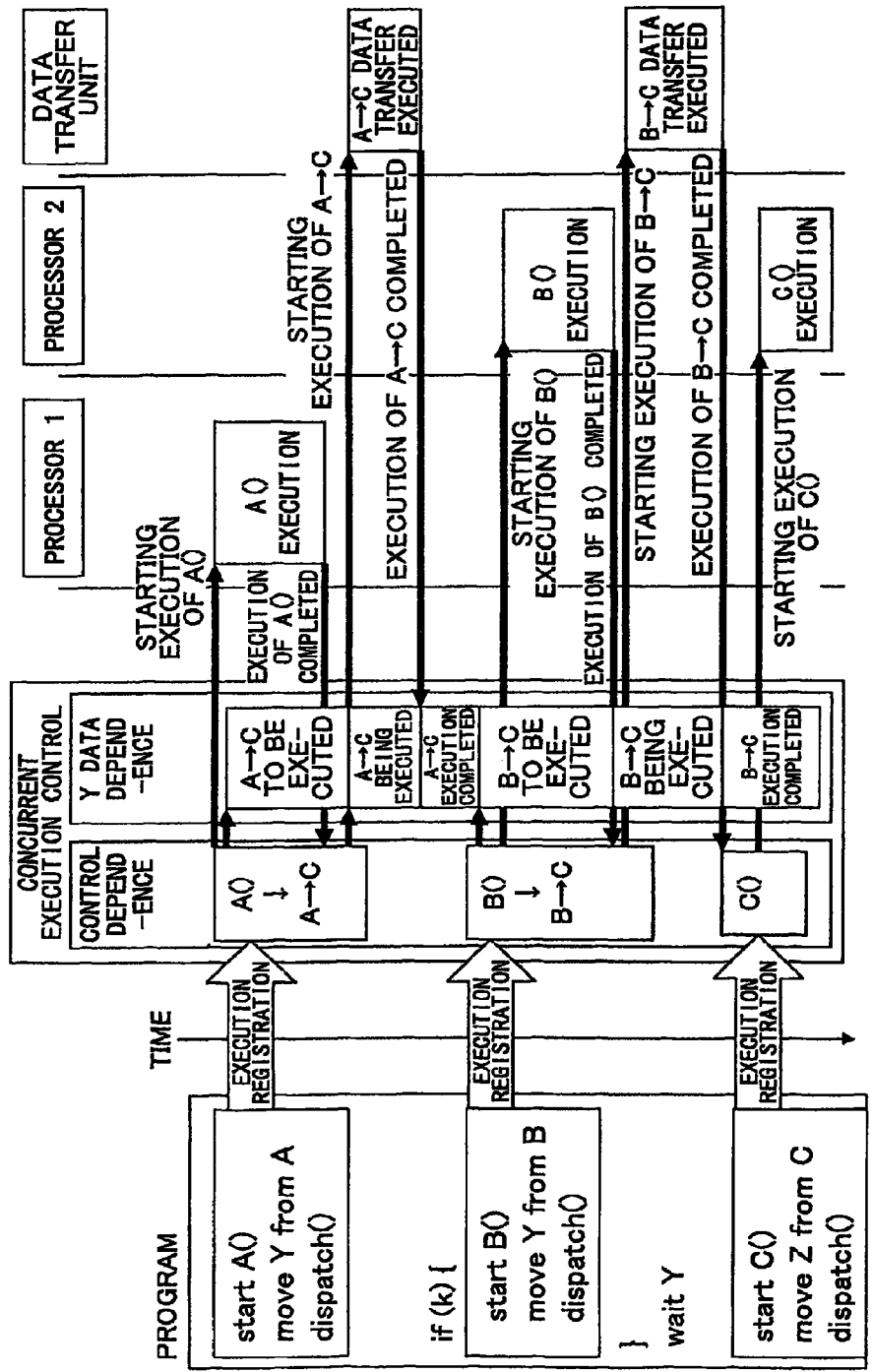
FIG. 13 illustrates the temporal sequence of the exemplary operation 1 of the multiprocessor system according to a first embodiment.

FIG. 13 illustrates the time sequence of control dependence, data dependence (of data Y), and the operation of each processor and data transfer unit in a concurrent execution control unit (the execution control unit 420 and the internal data 430). In FIG. 13, time flows downwardly. When the program steps "start A( ); move Y from A" are registered for execution, the execution of the function A( ) and the subsequent execution of the data transfer A→C are registered as the control dependence (waiting-for-execution information). The instruction "dispatch ( )" allows program steps whose dependence is satisfied to be executed. The processor 1 executes the function A( ) in response to an instruction to start the execution of the function A( ). The Y data dependence indicates that the data transfer A→C is "to be executed." When the processor 1 completes the execution of the function A( ), the control dependence that the data transfer A→C is to be executed after the completed execution of the function A( ) is satisfied. This allows the data transfer unit to start the execution of the data transfer A→C. The Y data dependence indicates that the data transfer A→C is "being executed." When the data transfer unit completes the data transfer A→C, the Y data dependence indicates that the data transfer A→C has been completed.

When the branching condition "k" is satisfied and the program steps "start B( ) move Y from B" are registered for execution, a control dependence that a data transfer B→C is to be executed after the completed execution of the function B( ). The instruction "dispatch ( )" allows program steps whose dependence is satisfied to be executed. The processor 2 executes the function B( ) in response to an instruction to start the execution of the function B( ). The Y data dependence indicates that the data transfer B→C is "to be executed." When the processor 2 completes the execution of the function B( ) the control dependence that the data transfer B→C is to be executed after the completed execution of the function B( ) is satisfied. This allows the data transfer unit to start the execution of the data transfer B→C. The Y data dependence indicates that the data transfer B→C is "being executed." When the data transfer unit completes the data transfer B→C, the Y data dependence indicates that the data transfer B→C has been completed.

Then, the system waits until the data transfer to the data Y in accordance with the program step "wait Y." When the program steps "start C( ); move Z from C;" are registered for execution, the function (procedure) C( ) is registered as control dependence. The instruction "dispatch ( )" allows program steps whose dependence is satisfied to be executed. The processor 2 executes the function C( ) in response to an instruction to start the execution of the function C( ). It is noted that the program step "move Z from C" is related to data Z. Consequently, the Y data dependence is not affected at all and indicates that the data transfer B→C has been completed.

As described above, in the first exemplary operation, after the completed execution of the preceding data transfer (move Y from A), the following data transfer (move Y from B) is registered. Consequently, the preceding data transfer (move Y from A) does not need to be cancelled.

[Exemplary Operation 2]

Figure 14C:
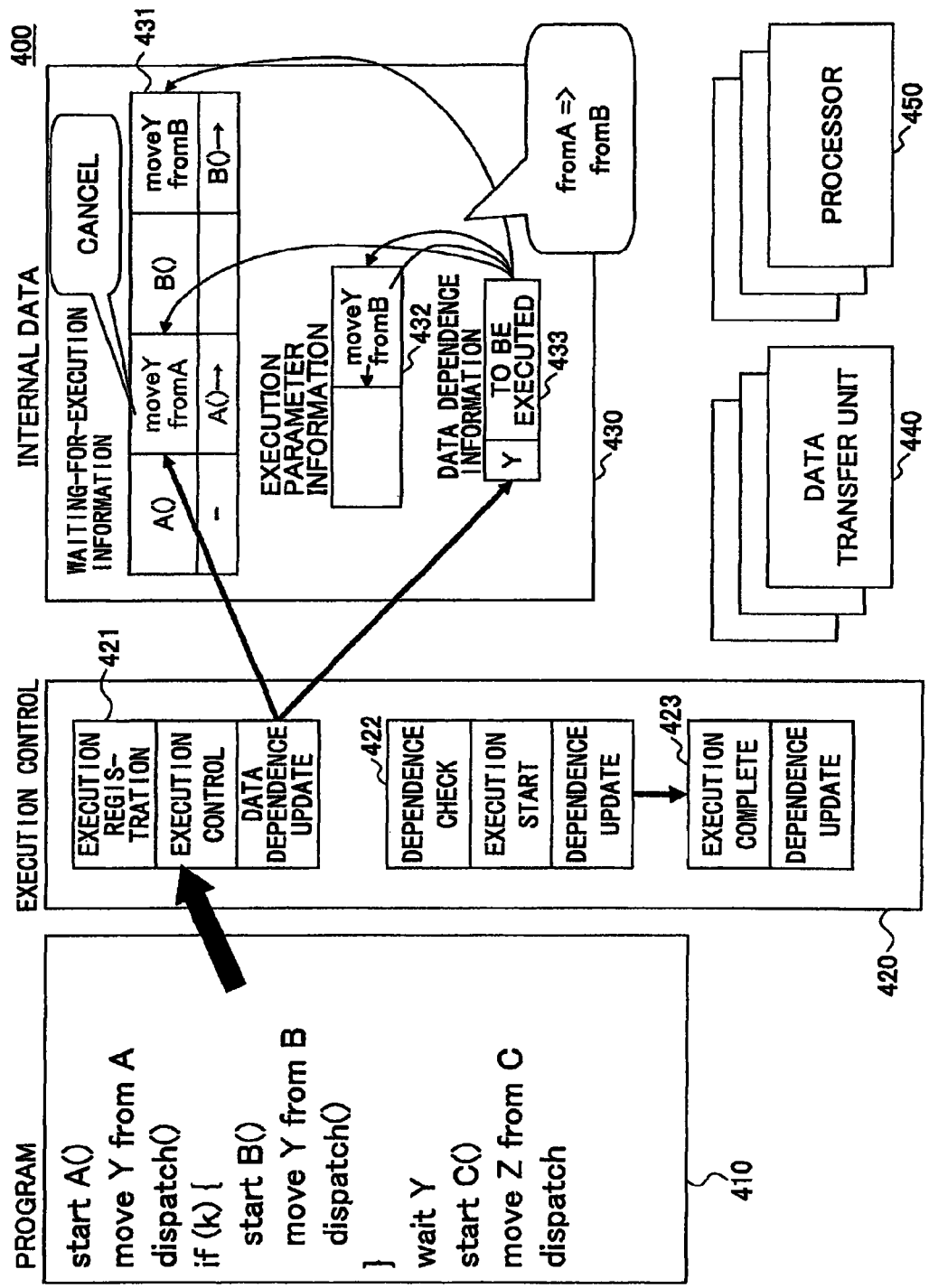

The second exemplary operation is the case in which, before a preceding data transfer has not been executed yet, a following data transfer is registered. The initial state is the similar to that of the first exemplary operation described with respect to FIG. 12A. FIG. 14A illustrates a state in which program steps "start A( ); move Y from A;" of the program 410 are registered for execution in the second exemplary operation. The execution registration unit 421 reads the program steps to register the waiting-for-execution information 431 and the execution parameter information 432. The step "move Y from A" is a request for a data transfer. Since there is no waiting-for-completion information registered prior to the step, for example, the execution registration unit 421 sets the execution parameter information corresponding to the program step "move Y from A" and sets the state in the data dependence information 433 to "to be executed." The instruction "dispatch ( )" allows program steps whose dependence is satisfied to be executed.

The function (procedure) A( ) which has no dependence is executed first. Once the execution of the function A( ) starts, A( ) is deleted from the waiting-for-execution information 431. When the branching condition "k" is met during the execution of A( ), the program steps "start B( ); move Y from B;" which is to be executed upon the satisfaction of the branching condition is registered in the waiting-for-execution information 431 (see FIG. 14B). When the execution registration unit 421 registers the following data transfer "move Y from B", the execution registration unit 421 refers to the data dependence information 433. Since the state related to the preceding data transfer "move Y from A" is "to be executed," the execution registration unit 421 further refers to the waiting-for-execution information to cancel the registration of the preceding data transfer (in this case, "move Y from A") and delete corresponding execution parameter information. Then, the execution registration unit 421 sets the execution parameter information 432 for the following data transfer (in this case, "move Y from B"), and sets the execution parameter information 432 to "to be executed" (see FIG. 14C). The pointer "move Y from A" of the data dependence information 433 to the waiting-for-execution information 431 and the execution parameter information 432 are replaced with "move Y from B." The instruction "dispatch ( )" allows program steps whose dependence is satisfied to be executed.

Figure 14D:
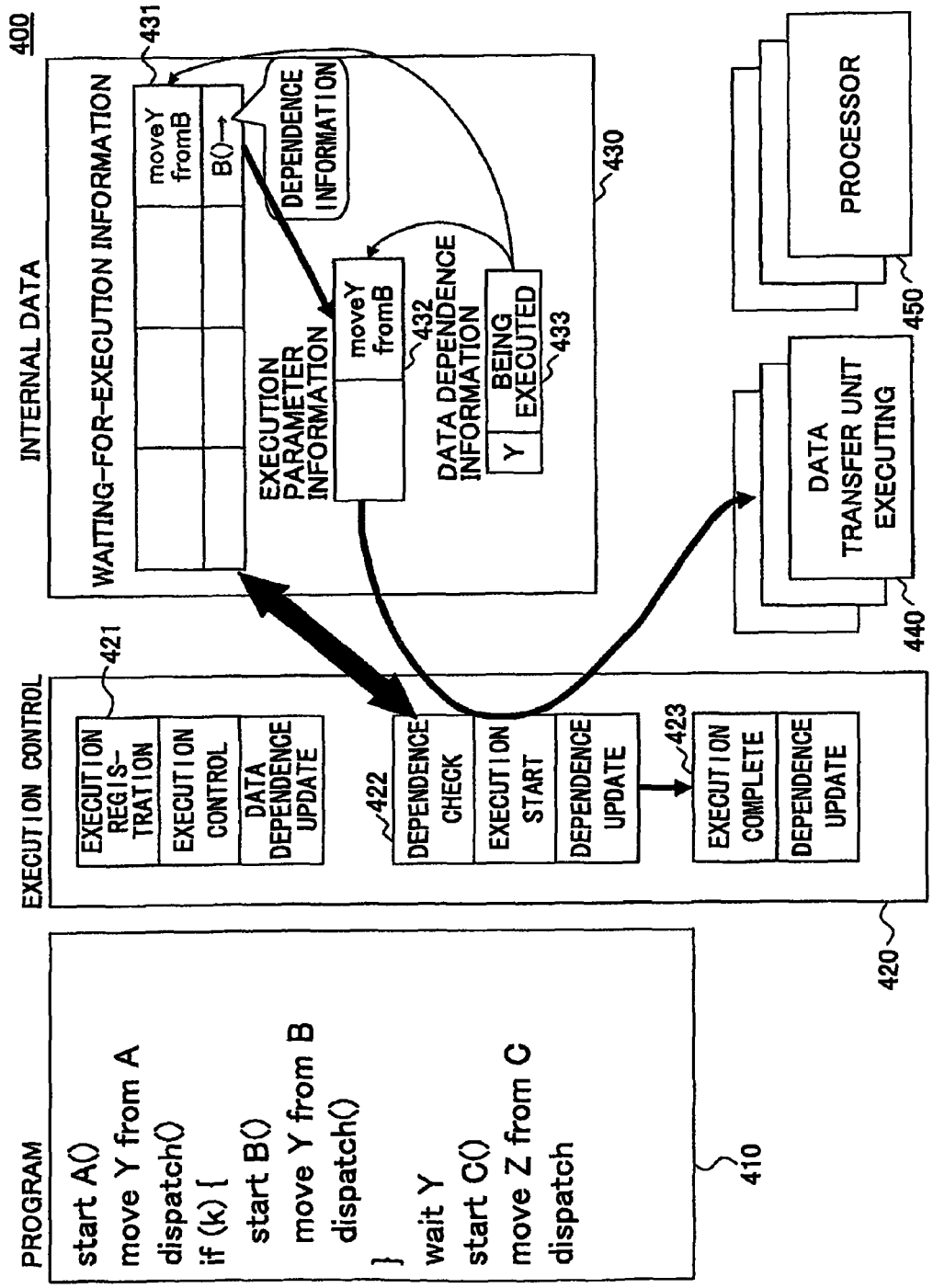

The dependence check/execution start unit 422 determines that the function (procedure) B( ) is executable, and request the processor 450 to execute B( ). The completed execution of the function B( ) satisfies the dependence of the procedure "move Y from B" registered in the waiting-for-execution information 431. The dependence check/execution start unit 422 determines that the procedure "move Y from B" is executable, followed by the deletion of execution registration and the setting of the data dependence information 433 to "to be executed." Then, the dependence check/execution start unit 422 causes the data transfer unit 440 to execute the data transfer "move Y from B" (see FIG. 14D).

When the data transfer unit 440 completes the data transfer "move Y from B," the execution completion unit 423, in response to the notification of the completion of the data transfer, deletes the execution parameter information 432 related to the data transfer "move Y from B" and sets the status of the data dependence information 433 to "execution completed" (not illustrated). Subsequent program steps proceed similarly.

Figure 15:
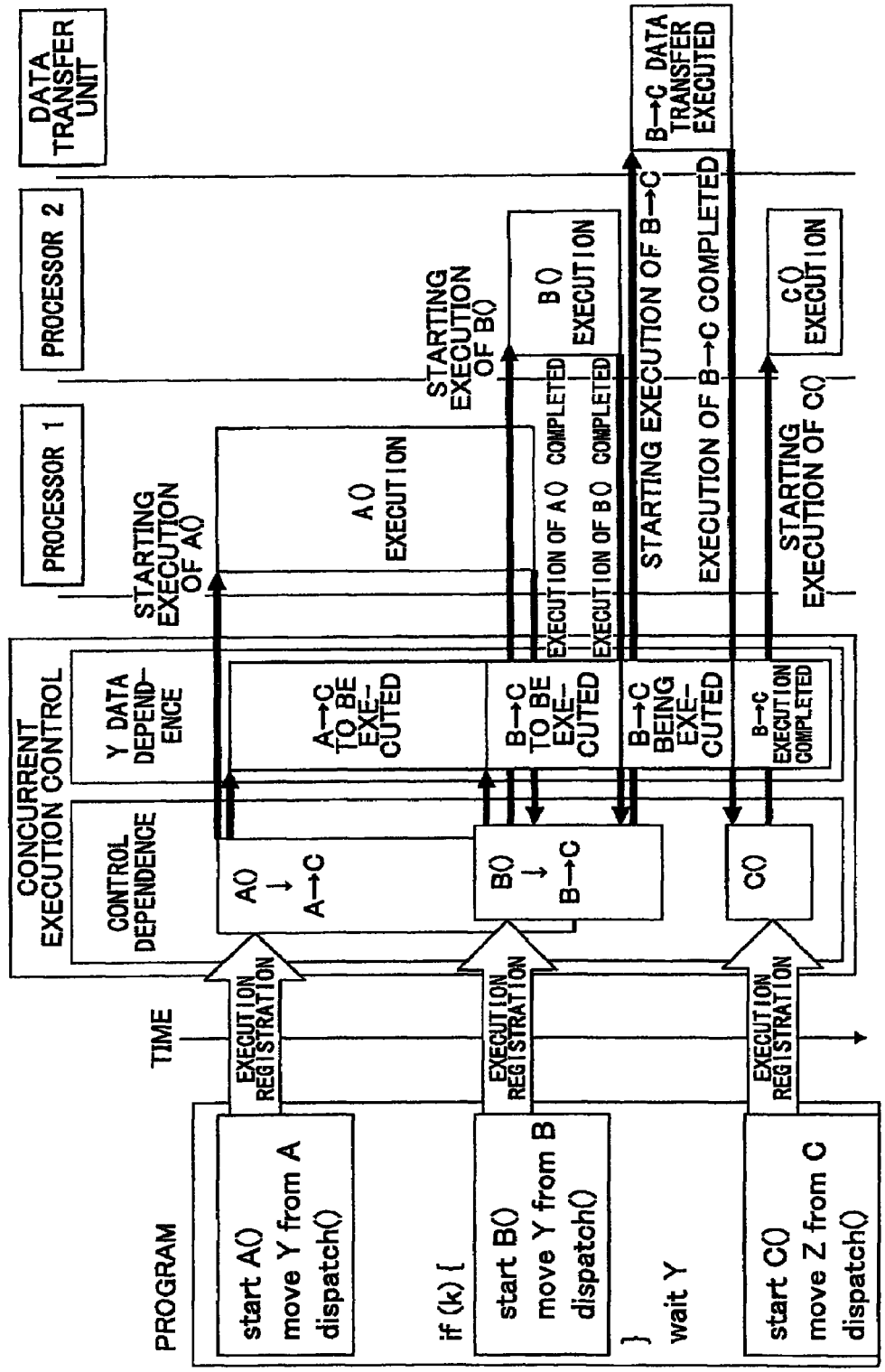
FIG. 15 illustrates the temporal sequence of the exemplary operation 2 of the multiprocessor system according to a first embodiment.

FIG. 15 illustrates the time sequence of control dependence, data dependence (of data Y), and the operation of each processor and data transfer unit in a concurrent execution control unit. In FIG. 15, time flows downwardly. When the program steps "start A( ); move Y from A" are registered for execution, the execution of the function A( ) and the subsequent execution of the data transfer A→C are registered as the control dependence (waiting-for-execution information). The processor 1 executes the function A( ) in response to an instruction to start the execution of the function A( ). The Y data dependence indicates that the data transfer A→C is "to be executed." If the branching condition "k" is satisfied before the processor 1 completes the execution of the procedure (function) A( ), program steps "start B( ) move Y from B" are registered for execution. At this point of time, the data transfer "move Y from A" is deleted from the control dependence. The processor 2 starts the execution of the function B( ). The completion of the function B( ) by the processor 2 satisfies the dependence on "B( )" of the data transfer "move Y from B," which is followed by the data transfer B→C by the data transfer unit. At this point of time, the control dependence is deleted, and the Y data dependence indicates that the data transfer B→C is being executed. After the data transfer unit completes the data transfer B→C, and the data transfer to data Y is completed, program steps "start C( ); move Z from C" are registered for execution in accordance with the program step "wait Y." The procedure (function) C( ) is registered in the control dependence. The processor 2 executes the function C( ) in response to an instruction to start the execution of the function C( ). It is noted that the program step "move Z from C" is related to data Z. Consequently, the Y data dependence is not affected at all and indicates that the data transfer B→C has been completed.

As described above, in the second exemplary operation, before the execution of the preceding data transfer (move Y from A), the following data transfer (move Y from B) is registered. Consequently, the preceding data transfer (move Y from A) is cancelled, which results in the following data transfer prevented from being delayed.

[Exemplary Operation 3]

Figure 16D:
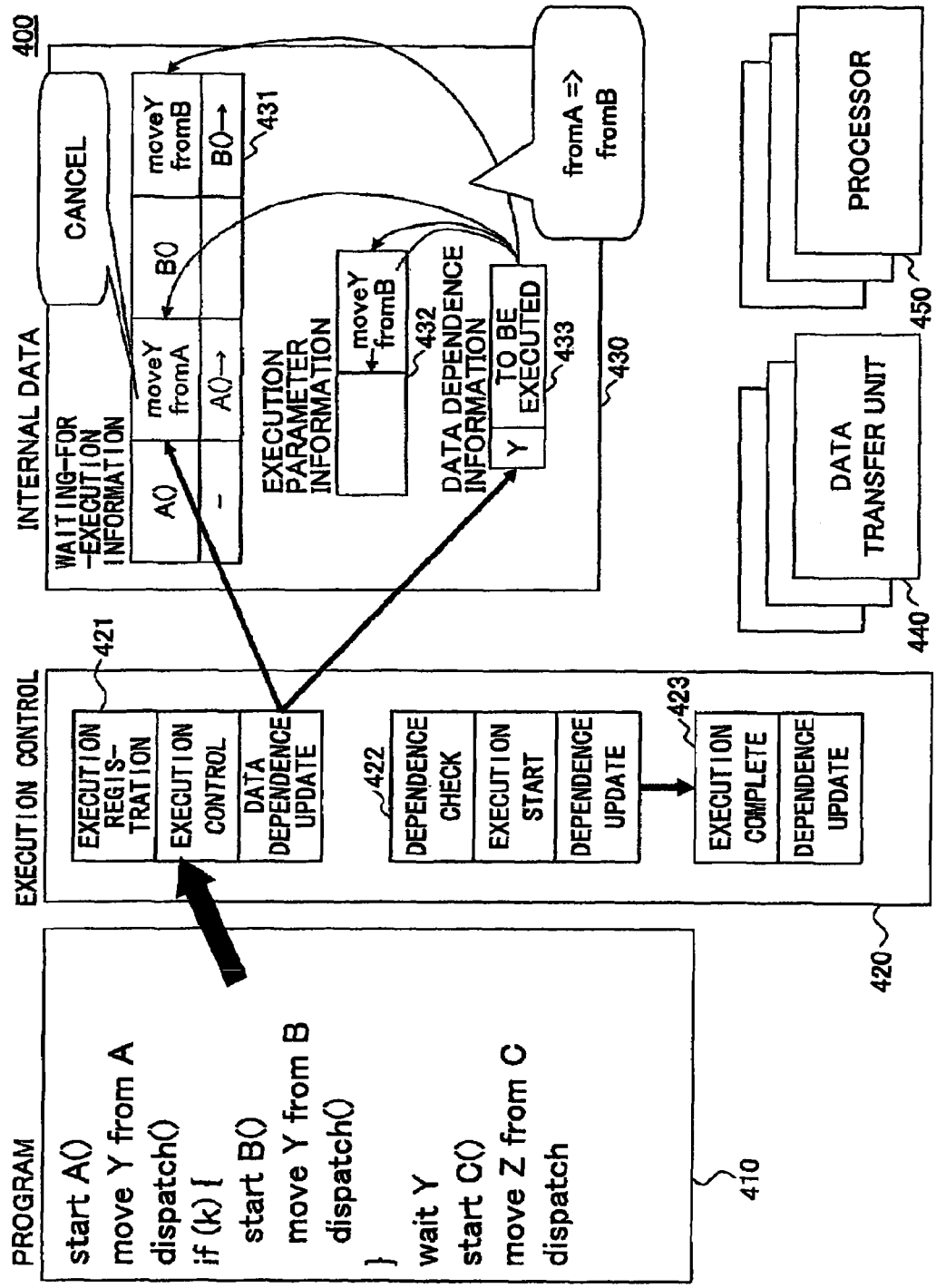

The third exemplary operation is the case in which, before a preceding data transfer is being executed, a following data transfer is registered. The initial state is the similar to that of the first exemplary operation described with respect to FIG. 12A. FIG. 16A illustrates a state in which program steps "start A( ); move Y from A;" of the program 410 are registered for execution, and the data transfer A→C is being executed after the completed execution of A( ) in the third exemplary operation. The data transfer A→C in the waiting-for-execution information 431 has been deleted, and the data dependence information 433 is set to "being executed." The data transfer unit 440 is executing the data transfer A→C.

When the branching condition "k" is met during the execution of the data transfer A→C, the program steps "start B( ) move Y from B;" which is to be executed upon the satisfaction of the branching condition, is registered in the waiting-for-execution information 431 (see FIG. 16B). When the execution registration unit 421 registers the data transfer "move Y from B," the execution registration unit 421 refers to the data dependence information 433 to find the status of the data transfer "being executed." The execution registration unit 421 further refers to the execution (data transfer) parameter information to identify an execution channel (in this case, A→C) and cancels the data transfer (see FIG. 16C). In the figure, arrows connecting the data dependence information 433, the execution parameter information 432 and the data transfer unit 440 indicate the order of data reference by the execution registration unit 421. Then, the execution parameter information 432 deletes the execution parameter information (in this case, "move Y from A"). Then, the execution registration unit 421 sets the execution parameter information 432 for the following data transfer (in this case, "move Y from B"), and sets the execution parameter information 432 to "to be executed" (see FIG. 16C). The pointer "move Y from A" of the data dependence information 433 to the waiting-for-execution information 431 and the execution parameter information 432 are replaced with "move Y from B." The instruction "dispatch ( )" allows program steps whose dependence is satisfied to be executed.

The completed execution of the function B( ) satisfies the dependence of the procedure "move Y from B" registered in the waiting-for-execution information 431. The dependence check/execution start unit 422 determines that the procedure "move Y from B" is executable, followed by the deletion of execution registration (in this case, "move Y from B") and the setting of the data dependence information 433 to "being executed." Then, the dependence check/execution start unit 422 causes the data transfer unit 440 to execute the data transfer "move Y from B" (see FIG. 16E).

When the data transfer unit 440 completes the data transfer "move Y from B," the execution completion unit 423, in response to the notification of the completion of the data transfer, deletes the execution (data transfer) parameter information 432 related to the data transfer "move Y from B" and sets the status of the data dependence information 433 to "execution completed" (not illustrated). Following program steps proceeds similarly.

FIG. 17 illustrates the time sequence of control dependence, data dependence (of data Y), and the operation of each processor and data transfer unit in a concurrent execution control unit. In FIG. 17, time flows downwardly. When the program steps "start A( ); move Y from A" are registered for execution in the control dependence of concurrent execution control, the execution of the function A( ) and the subsequent execution of the data transfer A→C are registered as the control dependence (waiting-for-execution information). The processor 1 executes the procedure A( ) in response to an instruction to start the execution of the function A( ). The Y data dependence indicates that the data transfer A→C is "to be executed." The instruction "dispatch ( )" allows program steps whose dependence is satisfied to be executed. A determination is made that A( ) is executable, and the processor 1 is requested to execute the procedure (function) A( ). The processor 1 executes A( ).

The execution of A( ) is completed by the processor 1 and the dependence information is updated. The concurrent execution control checks dependence to find that the data transfer from A( ) to C( ) is executable and requests the data transfer unit to start the data transfer of data Y from A( ) to C( ). The data transfer unit executes the data transfer A→C in response to the request for the data transfer. The data dependence information of data Y is updated to indicate that the data transfer A→C is being executed.

If the branching condition "k" is firmly satisfied during the data transfer, program steps "start B( ); move Y from B" are registered for execution in the control dependence of the concurrent execution control. At this point of time, the execution control unit checks the Y data dependence to find the status to be "being executed." Hence, the execution control unit cancels the data transfer A→C and updates the Y data dependence to "to be executed." The execution control unit deletes the execution parameter sets transfer parameter from B to C as the execution parameter.

If the function B( ) is executable as a result of checking its dependence, the processor 2 is requested to executed B( ). The execution of B( ) is completed by the processor 2 and the dependence information is then updated. The dependence on "B( )" of the data transfer "move Y from B" is satisfied as a result of checking its dependence, the data transfer B→C is executed by the data transfer unit. At this point of time, the control dependence B→C is deleted, and the Y data dependence indicates that the data transfer B→C is being executed. After the data transfer unit completes the data transfer B→C, when the data transfer to data Y is completed and program steps "start C( ); move Z from C" are registered for execution in accordance with the program step "wait Y," the procedure (function) C( ) is registered as control dependence. The processor 2 executes the function C( ) in response to an instruction to start the execution of the function C( ). It is noted that the program step "move Z from C" is related to data Z. Consequently, the Y data dependence is not affected at all and indicates that the data transfer B→C has been completed.

As described above, in the third exemplary operation, during the execution of the preceding data transfer (move Y from A), the following data transfer (move Y from B) is registered. Consequently, the preceding data transfer (move Y from A) is cancelled, which results in the following data transfer prevented from being delayed.

Figure 18A:
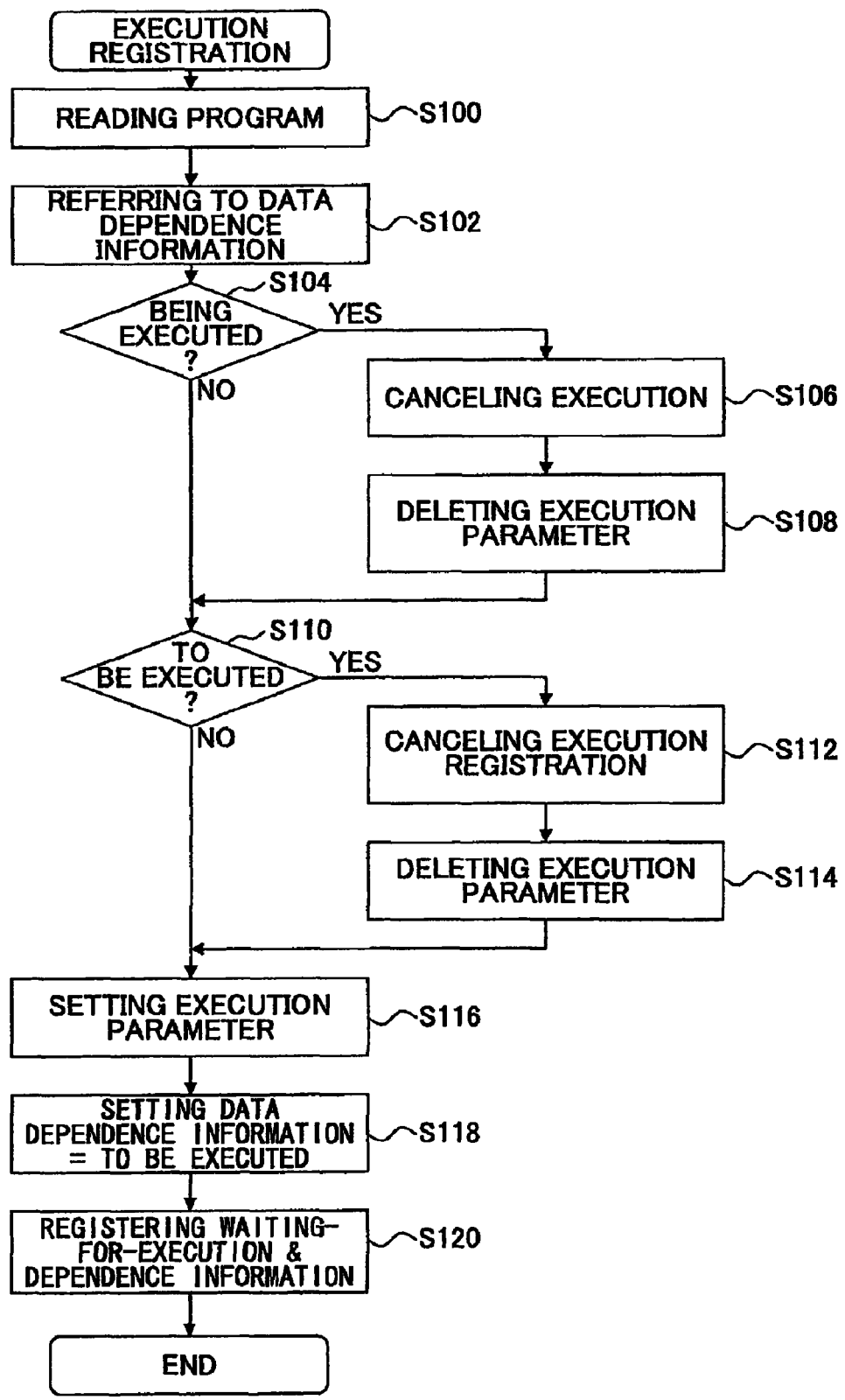
FIGS. 18A-C illustrate the flow of an exemplary operation of the multiprocessor system according to the first embodiment.
Figure 18B:
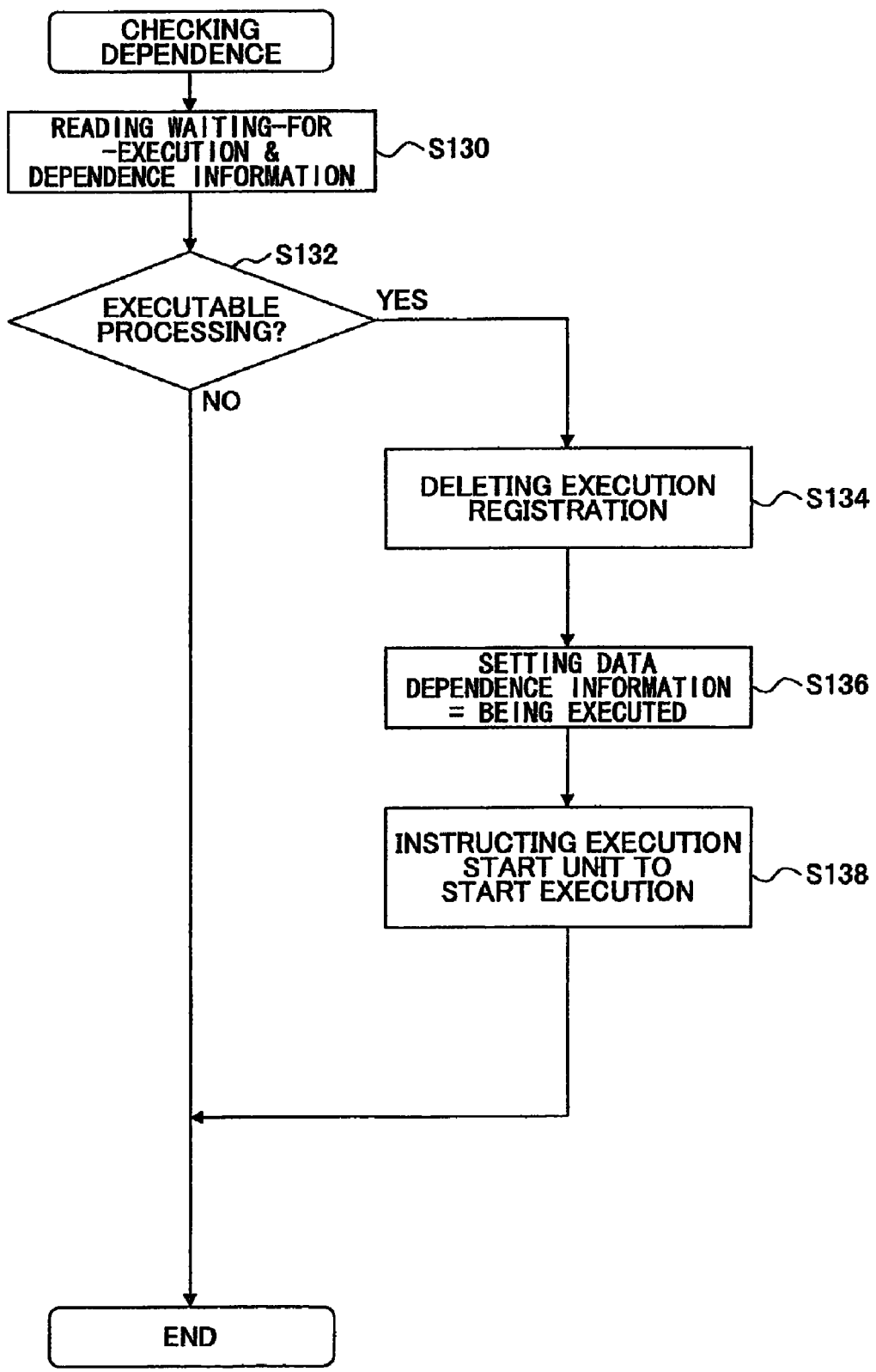
Figure 18C:
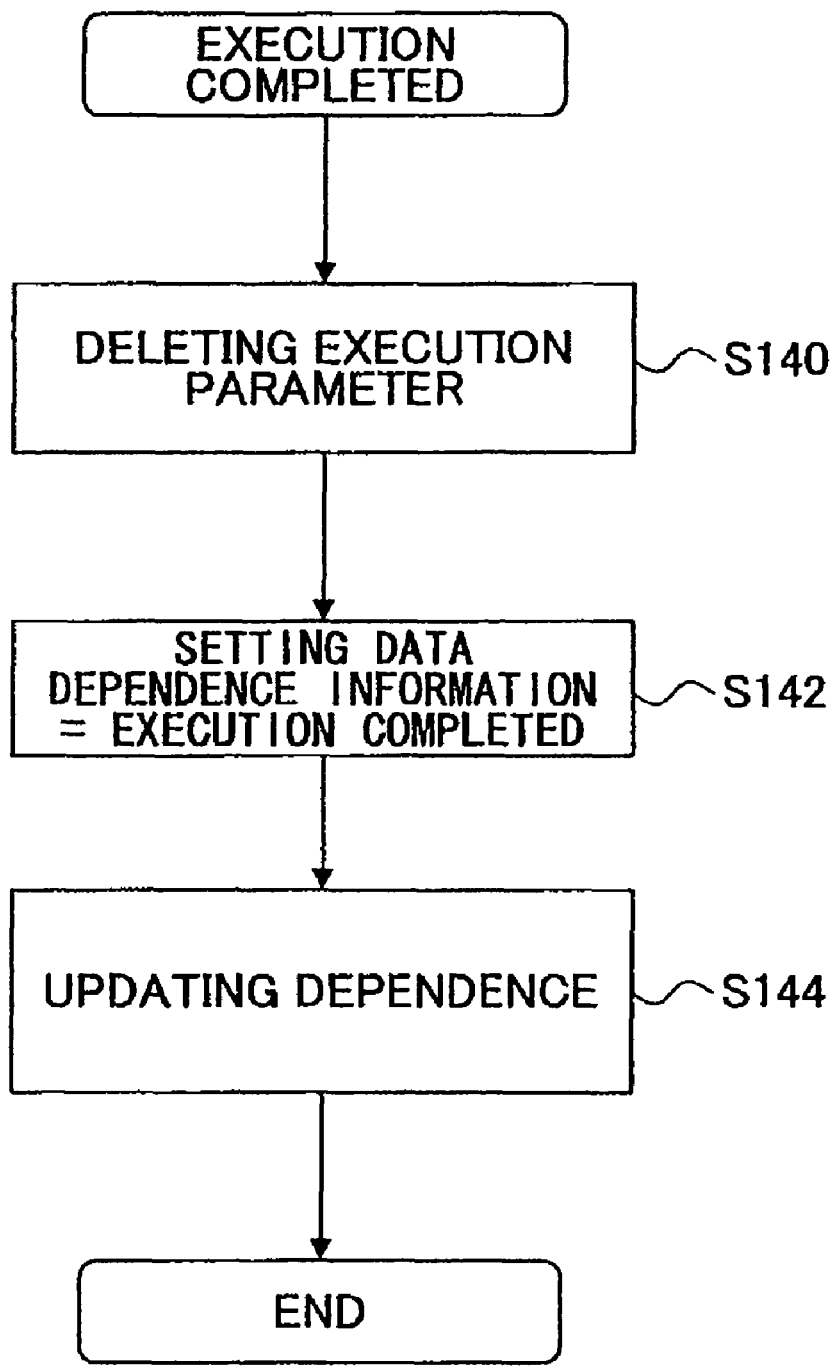

FIGS. 18A-18C illustrate the operational flow of the execution control unit 420 of the multiprocessor system 400 described above. FIG. 18A illustrates the process of registration of program steps to the internal data.

The program is read in step S100. The data dependence information is referred to in step S102.

If a preceding data transfer is being executed in step S104, the execution parameter information is referred to and an execution channel is identified to cancel the data transfer being executed in step S106. Then, in step S108, the execution parameter information of the canceled data transfer is deleted. The process moves to step S110.

If there is no preceding data transfer in step S104, the process moves to step S110 directly.

If the preceding data transfer has not been executed in step S110, step S112 refers to the waiting-for-execution information to cancel the execution registration of the preceding data transfer in step S112. Then, in step S114, the execution parameter information of the preceding data transfer is deleted. The process moves to step S116.

If the preceding data transfer is determined not to be executed in step S110, the process moves to step S116 directly.

In step S116, the execution parameter information of a data transfer to be registered is deleted. Then, the data dependence information is set to "to be executed" in step S118. Finally, in step S120, the waiting-for-execution information and the dependence information therein are registered.

FIG. 18B illustrates a process related to dependence check and the start of execution. An assumption is made that program steps to be processed relates to a data transfer in the following description.

The waiting-for-execution information and dependence are read in step S130. Step S132 determines whether there is executable processing which has no dependence or whose dependence has been satisfied. If there is executable processing, the execution registration of the executable processing is deleted in step S134 and the data dependence information to "being executed" in step S136. A data transfer unit or a processor is requested to start the execution in step S138.

FIG. 18C illustrates processing related to execution completion by the execution control unit 420. In step S140, the execution parameter information of the data transfer that has been completed is deleted. The data dependence information of transferred data is set to "execution completed" in step S142. Then, step S144 updates the dependence of the execution registration information.

Figure 19:
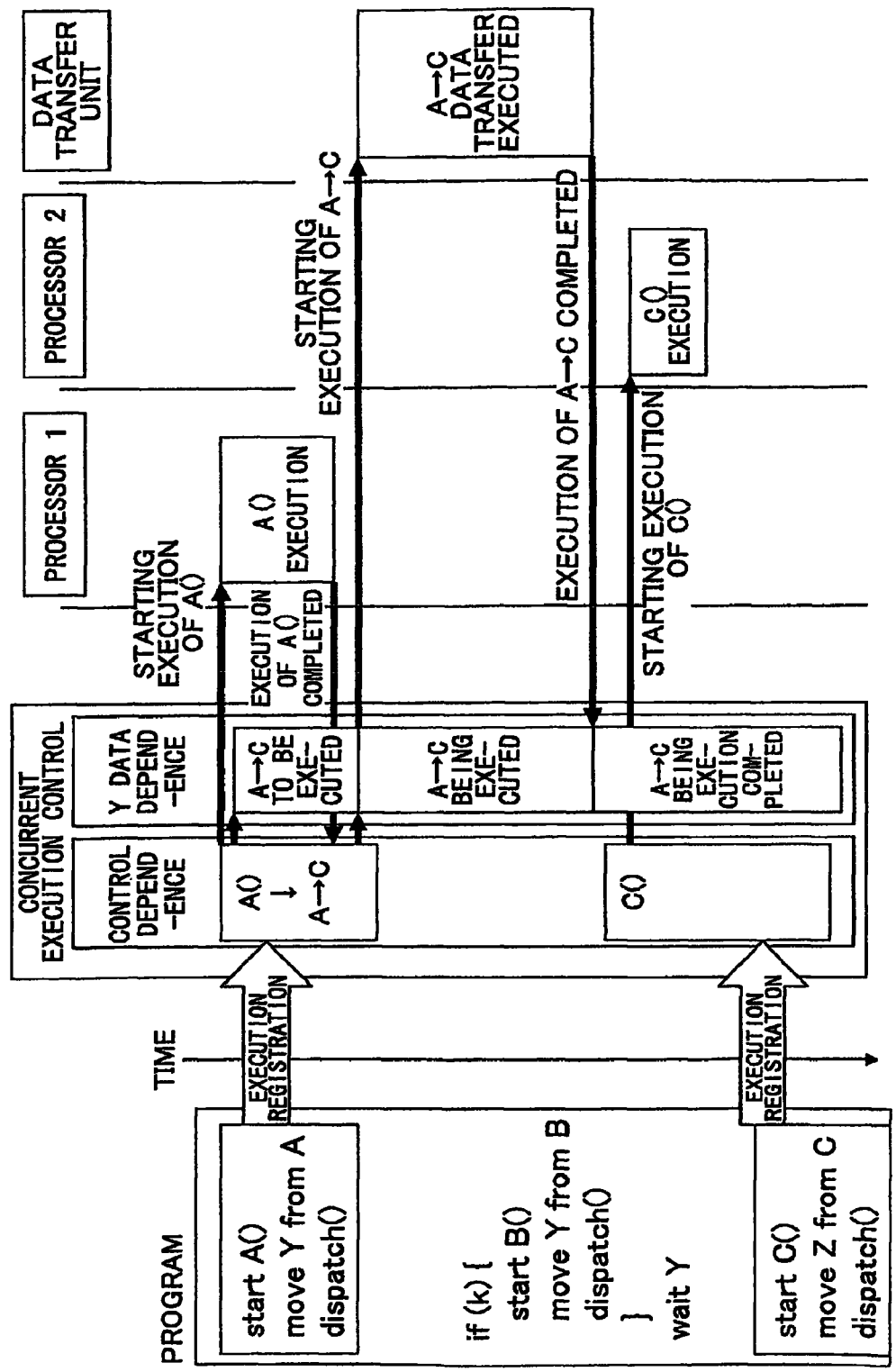
FIG. 19 illustrates the temporal sequence of the exemplary operation of the multiprocessor system according to the first embodiment in the case in which a branching condition is not met.

FIG. 19 illustrates the case in which the branching condition is not satisfied in an exemplary multiprocessor system 400 according to a first embodiment. The control dependence and Y data dependence are registered for execution based on program steps "start A( ); move Y from A" in the program. The processor 1 responds to execute A( ). The Y data dependence indicates that the data transfer A→C is "to be executed." When the execution of A( ) is completed by the processor 1, the data transfer unit executes the data transfer A→C. The Y data dependence indicates that the data transfer A→C is "being executed." The program, which includes a program step "wait Y," waits the completion of the data transfer A→C. When the data transfer unit completes the data transfer A→C, the Y data dependence indicates that the data transfer A→C has been completed. After program steps "start C( ); move Z from C" are registered for execution, the processor 2 executes Co.

In a first embodiment described above, the cancellation of a preceding data transfer is not explicitly specified, but the data dependence information is referred to upon the execution registration to check whether there is a data transfer to the similar destination as the data transfer to be registered. Consequently, the cancellation of the preceding data transfer does not need to be specified, program assets which have been in use may be used without any modification.

Second Embodiment

The second embodiment described below explicitly specifies the cancellation of a preceding data transfer in a program.

The cancellation after the satisfaction of a branching condition is explicitly specified in the program. This makes processing of the execution control unit simple, which results in a reduced cost for system development and maintenance.

The difference from the first embodiment will be focused in the following description.

In the first embodiment, the execution control unit refers to the data dependence upon execution registration to check whether there is another data transfer to the similar destination as the data transfer to be registered. However, the first embodiment does not check whether there is another data transfer to the similar destination as the data transfer to be registered. The first embodiment determines whether there is a data transfer to be canceled each time it registers processing. In the second embodiment, there is no such a determination. When a program step "cancel( )" is requested, the second embodiment refers to the data dependence information to check whether there is a data transfer to the similar destination as the destination to be registered, and cancels the data transfer registered beforehand if necessary. A portion to which an instruction "cancel( )" is to be inserted may be identified without difficulty, which does not increase man-hour required for the program development. The second embodiment advantageously makes the operation of the execution control unit simple.

Figure 20:
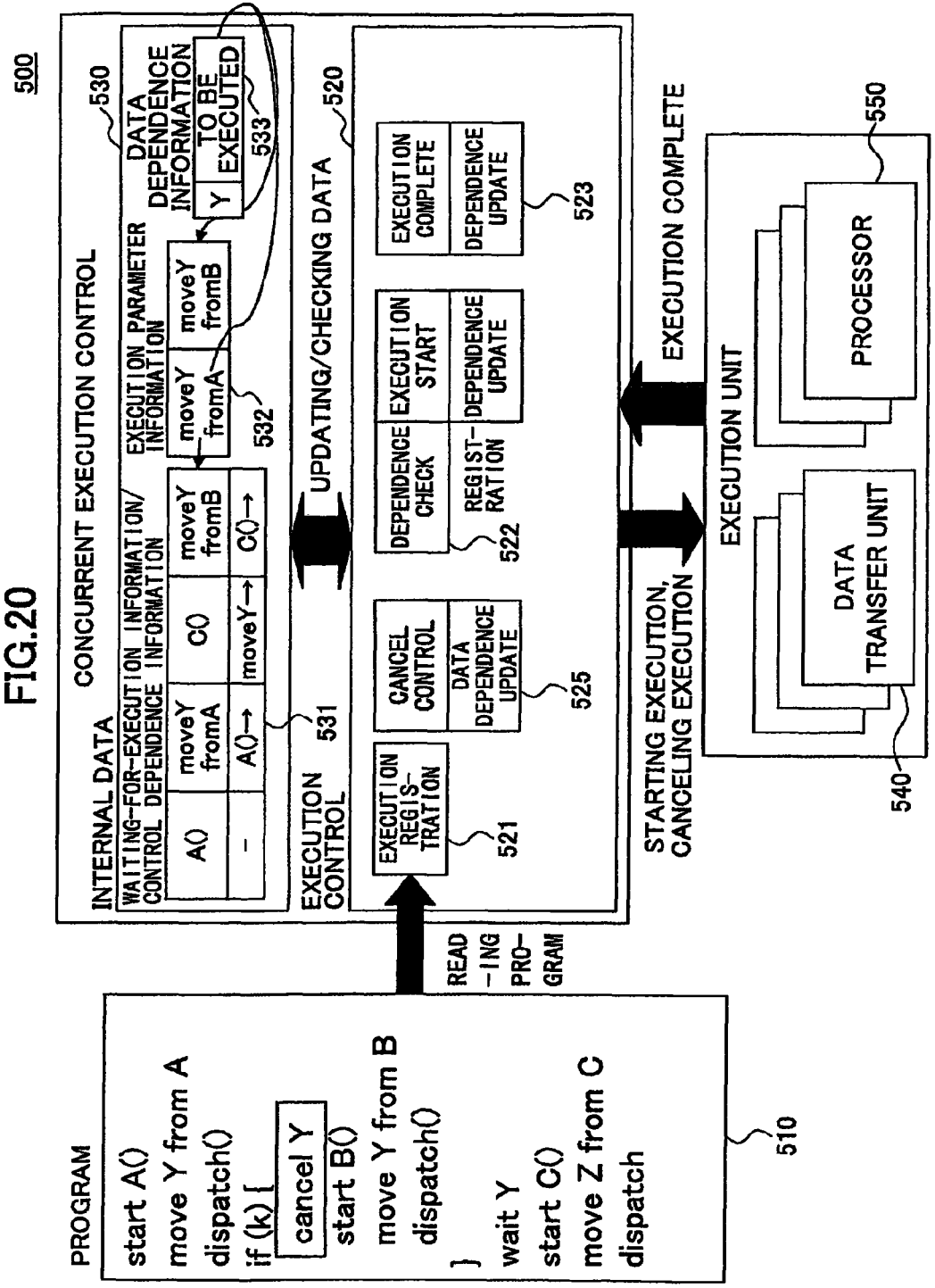
FIG. 20 illustrates the configuration of a multiprocessor system according to a second embodiment.

FIG. 20 illustrates an exemplary multiprocessor system 500 according to a second embodiment. The multiprocessor system 500 includes a memory for storing a program 510, execution control unit 520, internal data 530 (the execution control unit 520 and the internal data 530 are collectively referred to as a concurrent execution control unit), data transfer units 540, and processors 550 (the data transfer units 540 and the processors 550 are collectively referred to as execution units). The execution control unit 520 includes an execution registration unit 521, a dependence check/execution start unit 522 and an execution completion unit 523, and further includes a cancel control unit 525. The internal data 530 includes waiting-for-execution information/control dependence information 531, execution parameter information 532 and data dependence information 533. In the multiprocessor system 500, an instruction "cancel Y" to cancel the data transfer to "Y" is included in the "if(k)" clause in the program 510 as described above.

Figure 21A:
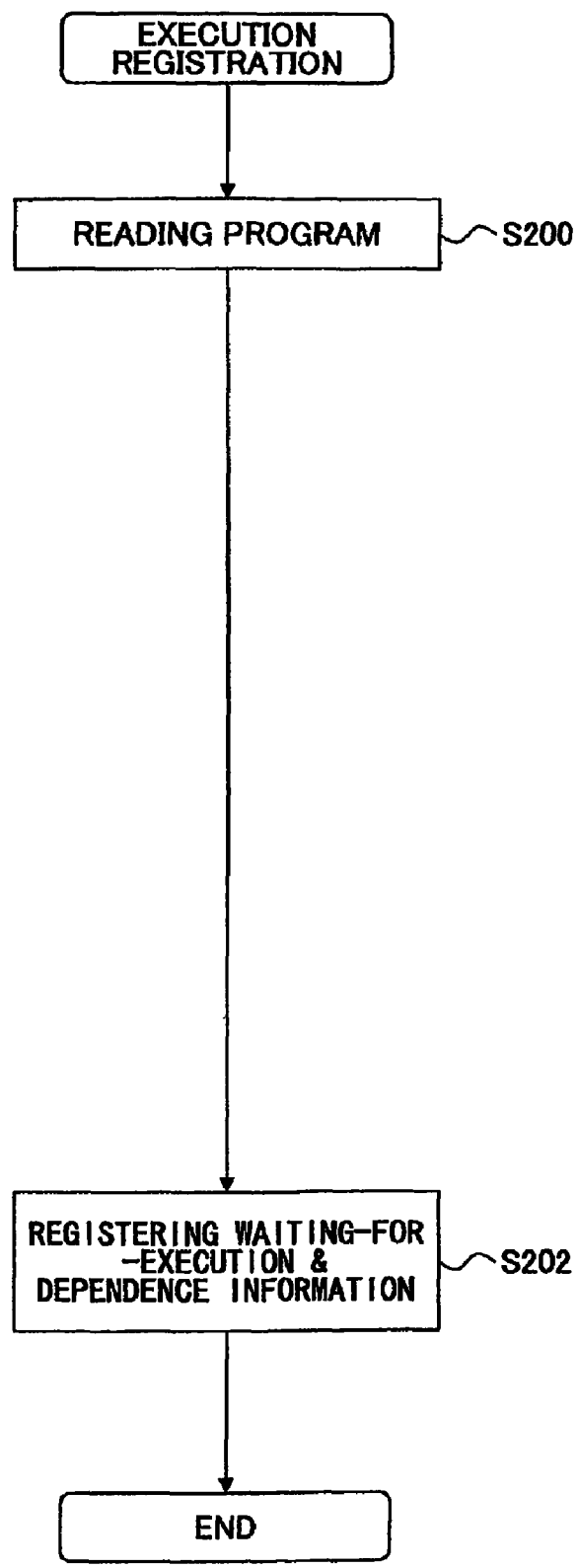
FIGS. 21A-B illustrate the flow of an exemplary operation of the multiprocessor system according to the second embodiment.
Figure 21B:
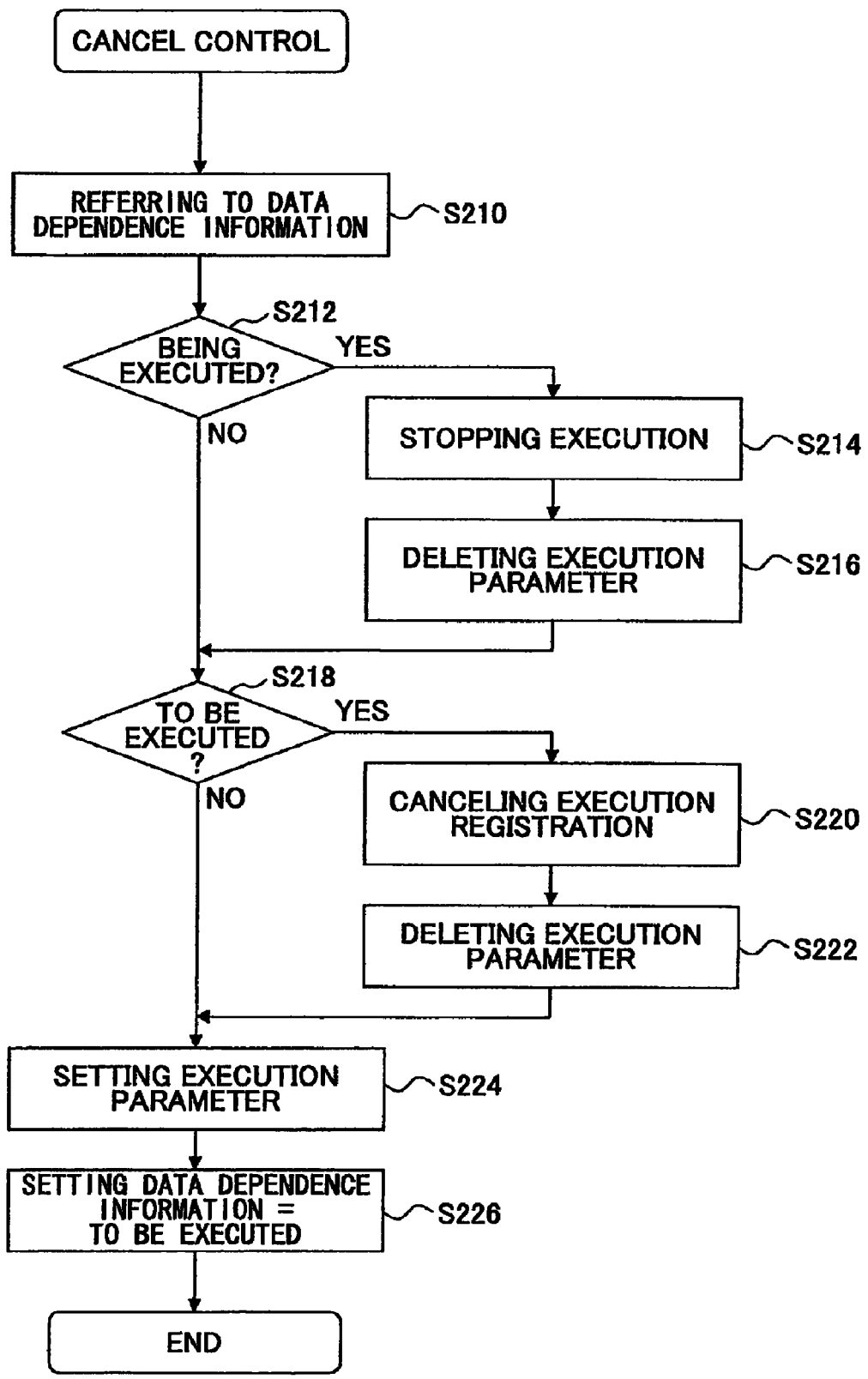

FIGS. 21A and 21B illustrates the operational flow of the execution control unit of the multiprocessor system 500.

FIG. 21A illustrates the process of registration of program steps. The program is read in step S200. Then, in step S202, the waiting-for-execution information and the dependence information therein are registered to terminate the process.

FIG. 21B illustrates the process of cancel control. The data dependence information is referred to in step S210.

If a preceding data transfer is being executed in step S212, the execution parameter information is referred to and an execution channel is identified to cancel the data transfer being executed in step S214. Then, in step S216, the execution parameter information of the canceled data transfer is deleted. The process moves to step S218.

If there is no preceding data transfer in step S212, the process moves to step S218 directly.

If the preceding data transfer has not been executed in step S218, step S220 refers to the waiting-for-execution (data transfer) information to cancel the execution (data transfer) registration of the preceding data transfer in step S112. Then, in step S222, the execution parameter information of the preceding data transfer is deleted. The process moves to step S224.

If the preceding data transfer is determined not to be executed in step S218, the process moves to step S224 directly.

In step S224, the execution (data transfer) parameter information of a data transfer to be registered is deleted. Then, the data dependence information is set to "to be executed" in step S226.

Following process from checking the dependence to the completed execution are the similar to steps S130-S138 illustrated in FIG. 18B and steps S140-144 illustrated in FIG. 18C, and their description is omitted.

As described above, in the operational flow of the execution control unit 520 of the multiprocessor system 500 according to the second embodiment, steps S102-S118 for execution registration illustrated in FIG. 18 are separated as the cancel control process.

Figure 22:
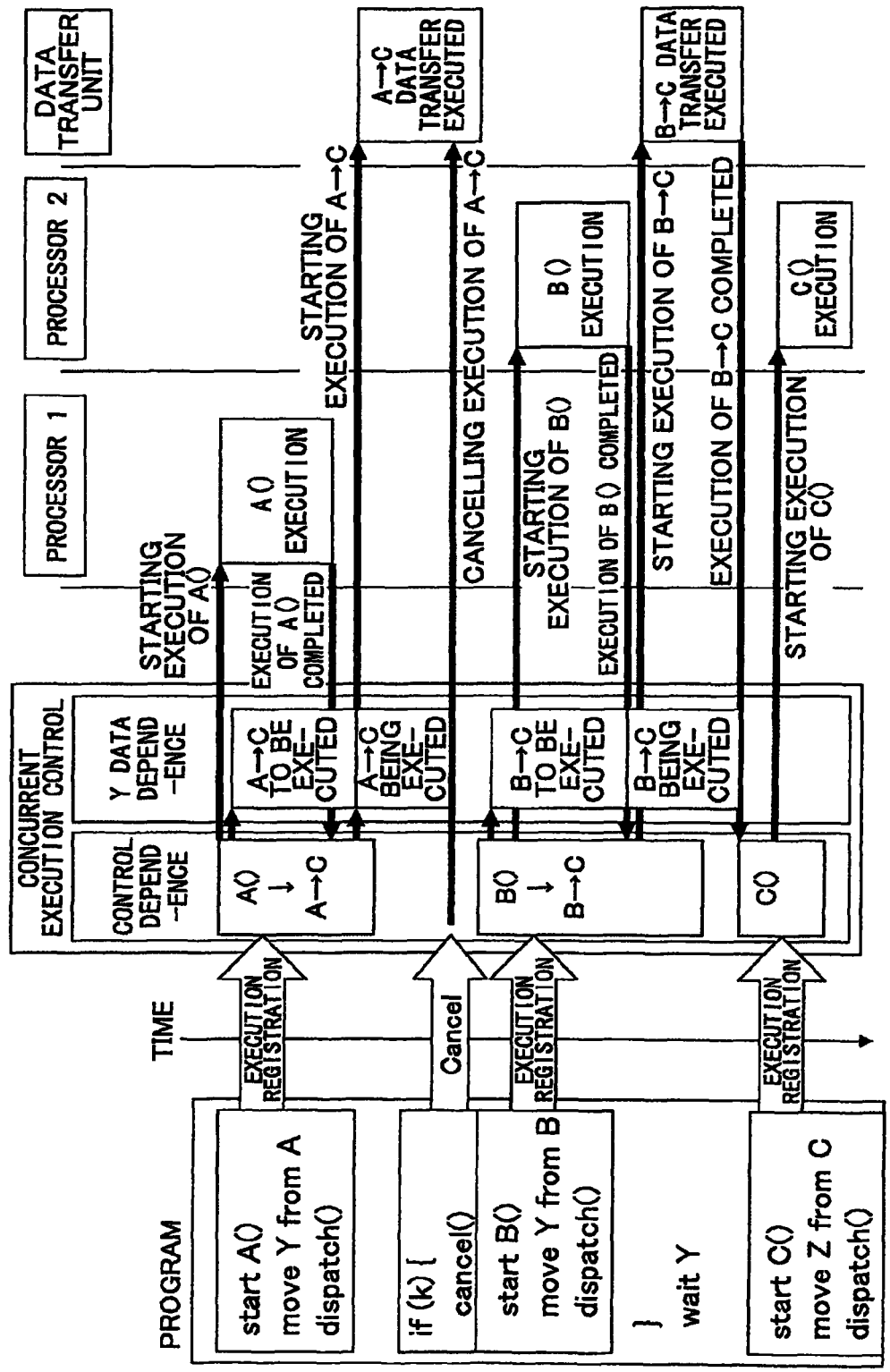
FIG. 22 illustrates the temporal sequence of the exemplary operation of the multiprocessor system according to the second embodiment.

FIG. 22 illustrates the time sequence of control dependence, data dependence (of data Y), and the operation of each processor and data transfer unit in a concurrent execution control unit in the case in which the branching condition "k" is satisfied. In FIG. 22, time flows downwardly.

When the program steps "start A( ); move Y from A" are registered for execution, the execution of the procedure (function) A( ) and the subsequent execution of the data transfer A→C are registered as the control dependence. The processor 1 executes the procedure A( ) in response to an instruction to start the execution of the procedure A( ). The Y data dependence indicates that the data transfer A→C is "to be executed." The instruction "dispatch ( )" allows program steps whose dependence is satisfied to be executed.

If the function A( ) is determined to be executable as a result of checking its dependence, the processor 1 is requested to execute A( ). The processor 1 starts the execution of the function A( ).

The execution of A( ) is completed by the processor 1 and the dependence information is then updated. The dependence is checked to find that the data transfer from A( ) to C( ) is executable, and the data transfer unit starts the data transfer from "A" to "C" in response to the request to start the data transfer A→C. The data dependence information of data Y is updated during the data transfer A→C.

If the branching condition "k" is satisfied during the data transfer, the execution of B( ) and the data transfer of data Y from B( ) to C( ) are registered as a control dependence in the concurrent execution control. Then, a program step "cancel ( )" is read out. A reference to the data dependence information of data Y related to the preceding data transfer A→C is made (see step S210 in FIG. 21B) to find that the data transfer is being executed (see step S212), and consequently, the data transfer A→C by the data transfer unit is cancelled (see step S214). Then, the execution parameter related to the data transfer A→C is deleted (see step S216). The execution parameter related to the new data transfer B→C is set (see step S224), and the Y data dependence information is set to "to be executed" (see step S226).

If the function B( ) is determined to be executable as a result of checking its dependence, the processor 2 is requested to execute B( ). The processor 2 starts the execution of the function B( ).

The execution of B( ) is completed by the processor 2 and the dependence information is then updated. The dependence on "B( )" of the data transfer "move Y from B" is satisfied as a result of checking its dependence, the data transfer B→C is executed by the data transfer unit. At this point of time, the control dependence B→C is deleted, and the Y data dependence is updated to indicate that the data transfer B→C is being executed. After the data transfer unit completes the data transfer B→C, when the data transfer to data Y is completed and program steps "start C( ); move Z from C" are registered for execution in accordance with the program step "wait Y," the function C( ) is registered as control dependence. The processor 2 executes the function C( ) in response to an instruction to start the execution of the function C( ). It is noted that the program step "move Z from C" is related to data Z. Consequently, the Y data dependence is not affected at all and indicates that the data transfer B→C has been completed.

Third Embodiment

In this embodiment, if the branching condition "k" is satisfied and it is known that a preceding data transfer is being executed but data transferred are to be overwritten, a following data transfer is hold off until the preceding data transfer is completed.

The cancellation of the preceding data transfer that is being executed requires parameters related to the data transfer being maintained until the data transfer is completed, which consumes storage capacity and makes execution control complicated. Hence, although a data transfer which is executed is not canceled, a data transfer which has not been executed (that is, to be executed) is canceled, which still substantially reduces time required for the data transfer. The present embodiment cancels the data transfer that has not been executed.

The third embodiment is described in comparison with the first embodiment. A concurrent execution control unit and data structure are basically the similar to those of the first embodiment, but the operational flow of the execution control unit is different.

Figure 23:
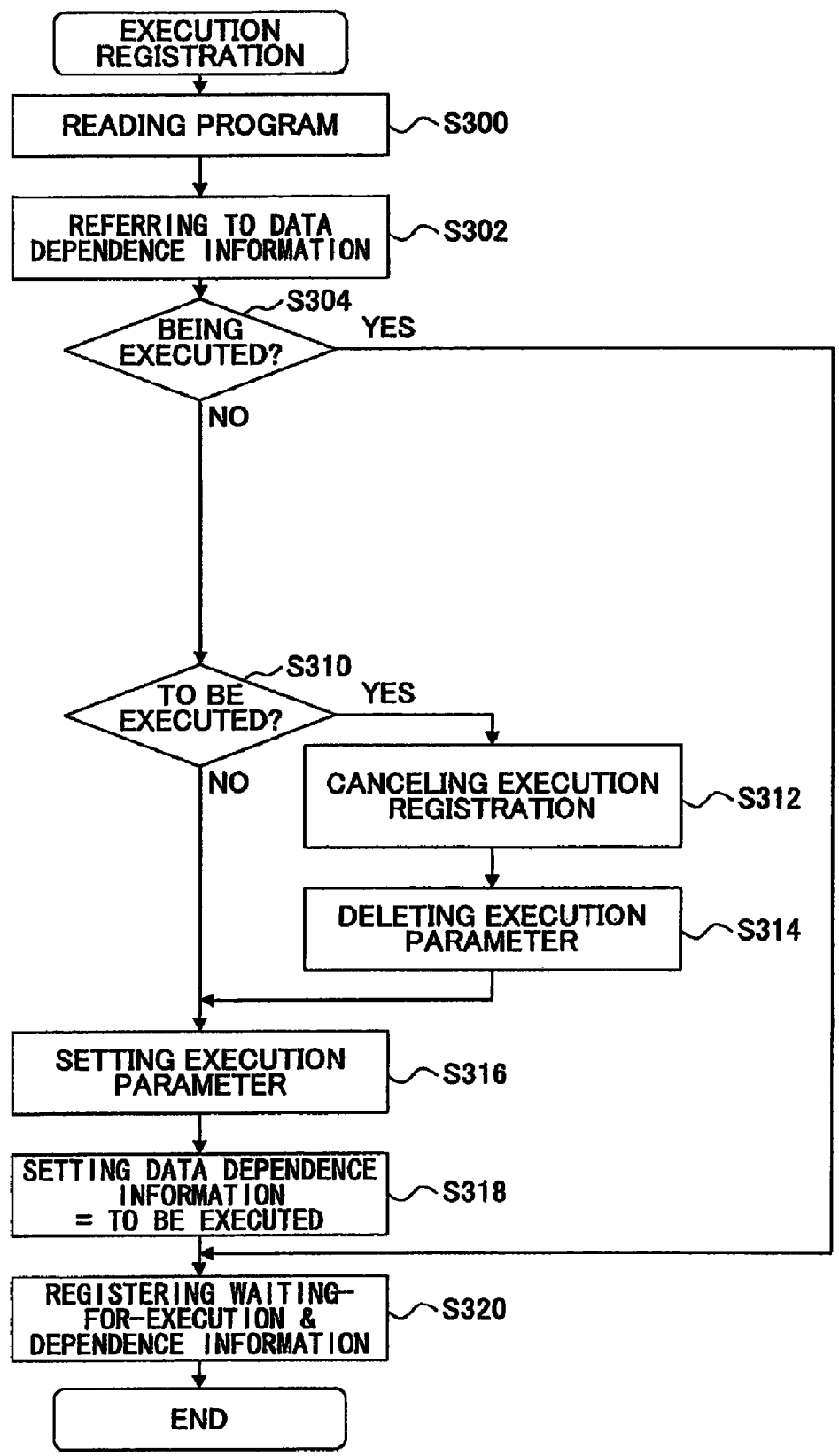
FIG. 23 illustrates the flow of an exemplary operation of a multiprocessor system according to a third embodiment.

FIG. 23 illustrates the operational flow of the execution control unit according to the present embodiment.

The program is read in step S300. The data dependence information is referred to in step S302.

If the preceding data transfer is being executed in step S304, the process moves to step S320, in which the waiting-for-execution information and the dependence information therein are registered in step S320, and then terminates.

If the preceding data transfer is not being executed in step S304, the process moves to step S310, where a determination is made whether the preceding data transfer has not been executed yet (that is, to be executed). If the preceding data transfer has not been executed, step S312 refers to the waiting-for-execution information to cancel the execution registration of the preceding data transfer. Then, in step S314, the execution parameter information of the preceding data transfer is deleted. The process moves to step S316.

If the preceding data transfer is determined not to be executed in step S310, the process moves to step S316 directly.

In step S316, the execution parameter information of a data transfer to be registered is deleted. Then, the data dependence information is set to "to be executed" in step S318. Finally, in step S320, the waiting-for-execution information and the dependence information therein are registered, and the process terminates.

The remaining operational flow is the similar to that of the first embodiment described with respect to FIGS. 18B and 18C.

Figure 24:
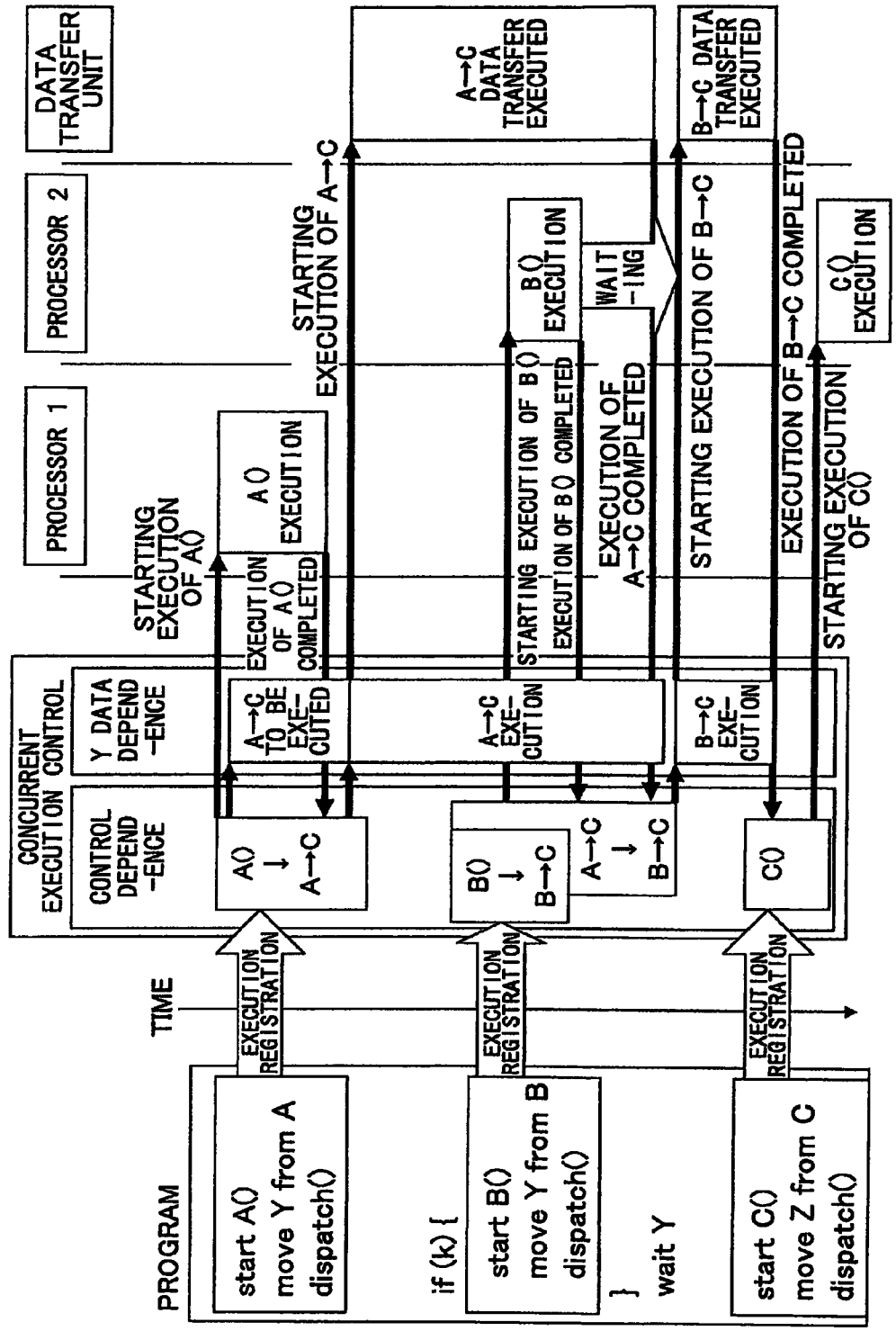
FIG. 24 illustrates the temporal sequence of the exemplary operation of the multiprocessor system according to the third embodiment.

FIG. 24 illustrates processing in the case in which the branching condition is satisfied.

Program steps "start A( ); move Y from A; dispatch ( )" register the function A( ) and the data transfer of data Y from A( ) to C( ) are registered in the control dependence of the concurrent execution control. The status of data transfer of data Y is set to "to be executed" in the data dependence information for data Y. If the function A( ) is determined to be executable as a result of checking its dependence, the processor 1 is requested to execute A( ). The processor 1 executes the function A( ).

The execution of A( ) is completed by the processor 1 and the dependence information is updated. If a determination is made that the data transfer from A( ) to C( ) is executable as a result of checking its dependence, the data transfer unit is requested to perform the data transfer. The data dependence information of data Y is set to indicate that the data transfer A→C is being executed.

If the branching condition "k" is satisfied before the completion of the data transfer from A( ) to C( ), the function B( ) and the data transfer of data Y from B( ) to C( ) is registered in the control dependence of the concurrent execution control. At this point of time, the execution control unit checks the dependence of Y data, and if it is "to be executed," then deletes the execution registration of the data transfer from A( ) to C( ). If the data transfer is "being executed," the execution control unit allows the data transfer to continue.

If the function B( ) is determined to be executable as a result of checking its control dependence, the processor 2 is requested to execute the function B( ). The processor 2 executes B( ).

The execution of B( ) is completed by the processor 2 and the dependence information is then updated. If the data transfer from A( ) to C( ) has been completed, the data transfer from B( ) to C( ) is determined to be executable as a result of checking its dependence. The data transfer unit is requested to start the data transfer of data Y from B( ) to C( ). If the data transfer from A( ) to C( ) has not yet completed, the data transfer from B( ) to C( ) is held off until the data transfer from A( ) to C( ) is completed (for this purpose, the completion of the data transfer A→C may be registered as the dependence of the data transfer B→C).

The dependence information is updated after the data transfer of data Y from B( ) to C( ), and the function C( ) is executed after checking its dependence.

Fourth Embodiment

Figure 25:
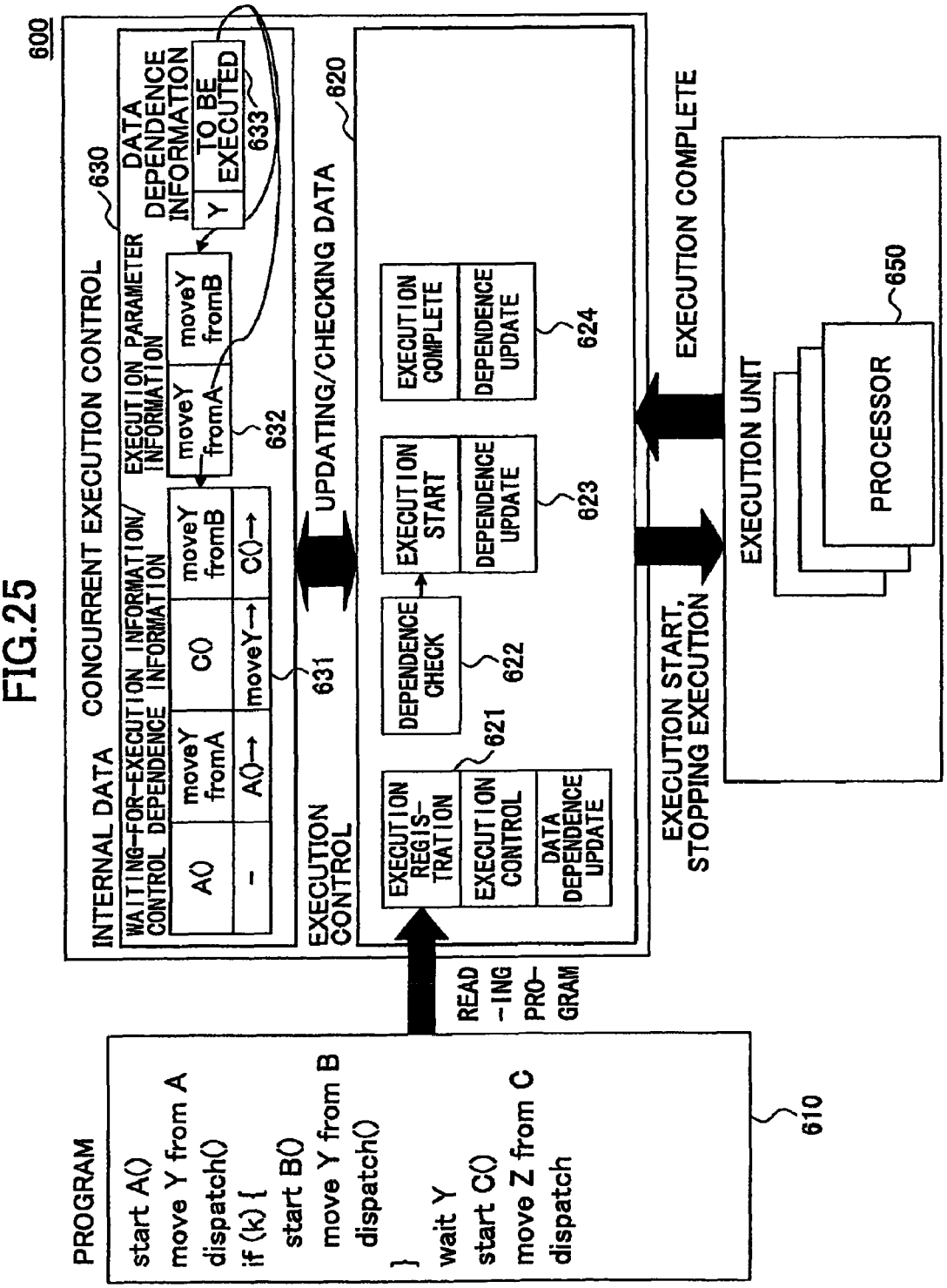
FIG. 25 illustrates the configuration of a multiprocessor system according to a fourth embodiment.

FIG. 25 illustrates an exemplary multiprocessor system 600 according to a fourth embodiment. The multiprocessor system 600 according to the present embodiment has processors 650 in the execution unit. The multiprocessor system 600 is different from the other embodiments in that the multiprocessor system 600 has no data transfer unit dedicated for data transfers. Data transfers are performed by the processors 650.

The embodiment may be applied to a hardware as illustrated, which has no dedicated data transfer unit. The operational flow and processing of the multiprocessor system 600 are the similar to those described for the first through third embodiments.

Fifth Embodiment

Figure 26:
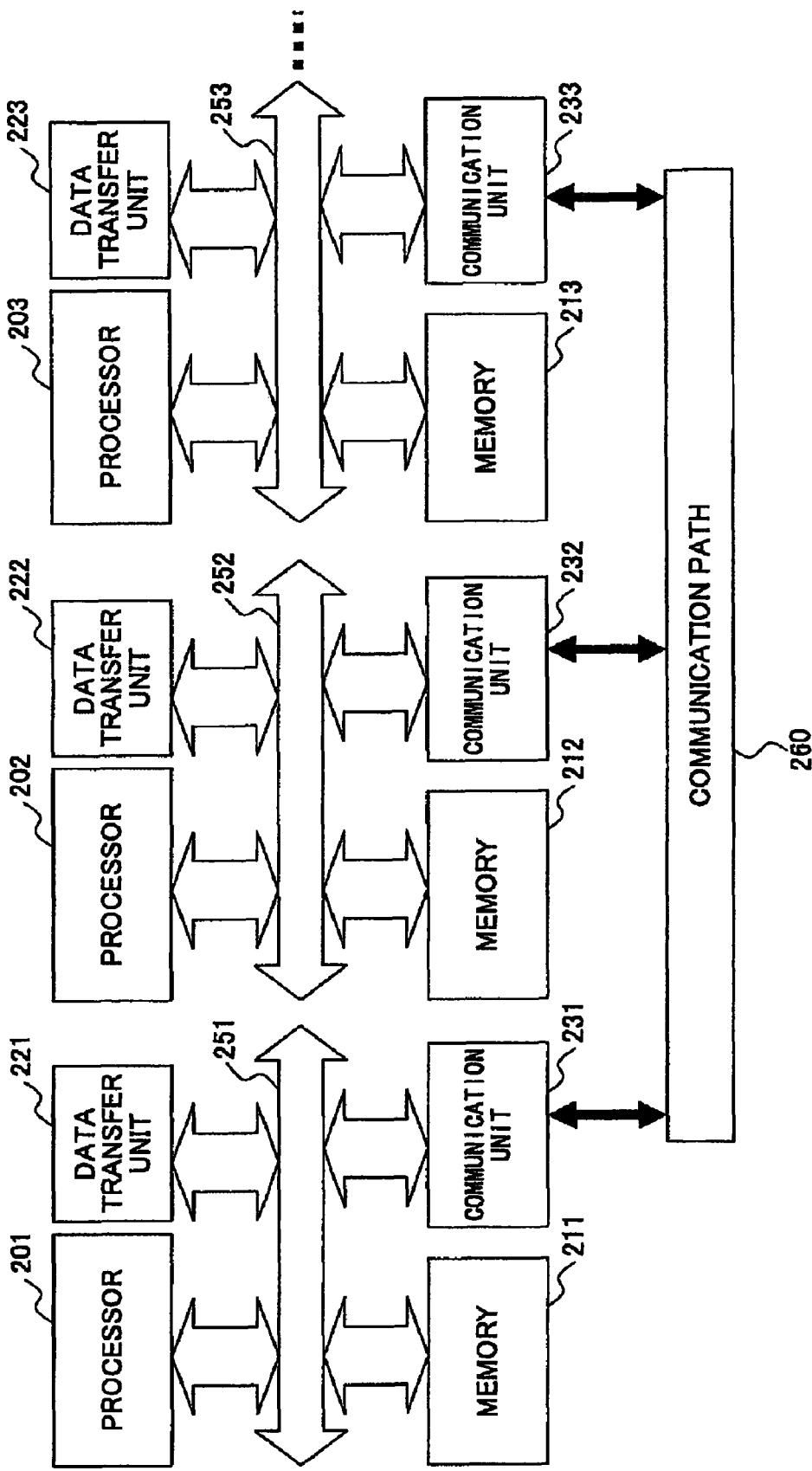
FIG. 26 illustrates an exemplary distributed multiprocessor system according to another embodiment.

FIG. 26 is a block diagram illustrating a distributed-type multiprocessor system which is the hardware of a concurrent program execution apparatus according to an embodiment. The distributed-type multiprocessor system 200 illustrated in FIG. 26 includes multiple processors 201, 202, 203, . . . , memories 211, 2212, 213, . . . , data transfer units 221, 222, 223, . . . , and communication units 231, 232, 233, . . . . These components are arranged to exchange instructions, address information, and data via respective common system bus 251, 252, 253, . . . . The processor 201, memory 211, data transfer unit 221 and communication unit 231 are arranged to exchange instructions, address information, and data via the system bus 251, and form a subsystem. The processor 202, memory 212, data transfer unit 222 and communication unit 232 are arranged to exchange instructions, address information, and data via the system bus 252, and form a subsystem. Furthermore, the processor 203, memory 213, data transfer unit 223 and communication unit 233 are arranged to exchange instructions, address information, and data via the system bus 253, and form a subsystem. These subsystems may communicate each other via a common communication path 260.

For example, in the subsystem including the processor 201, the processor 201 may execute a given computer program to process data retrieved from the memory 211 and store the result of processing to the memory 211. The memory 211 stores the computer program to be executed by the processor 201 and data to be processed by the processor 201. The data transfer unit 221 may control data transfer between the memory 211 and an external device outside of the distributed-type multiprocessor system 200. The communication unit 231 may control communication with other subsystems including the processors 202 and 203, for example, via the communication path 260. The similar is true for the other subsystems. These components are well known by one skilled in the art, except for the portion related to the operation of the concurrent program execution apparatus according to the embodiment, and hence further description may be not necessary.

It would be appreciated that the concurrent program execution apparatus according to the embodiment may be embodied with the distributed-type multiprocessor system 200 which is arranged such that subsystems each including a processor, a data transfer unit, and a memory communicate to each other through a communication unit via a common communication path.

According to any one of the embodiments, even if a computer program includes a conditional branch, waiting time related to a data transfer may be reduced and time required for executing a computer program may be shorten.

Although the embodiments are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment has been described in detail, it should be understood that the various changes, substitutions, and alterations could be made hereto without departing from the spirit and scope of the invention.

What is claimed is:

1. A multiprocessor system, comprising:
a plurality of processors;
an execution control unit to control processing by the plurality of processors and a data transfer between the plurality of processors; and
an internal data storage unit to store data dependence information indicating status of the data transfer,
wherein if control flow of processing by a processor is fixed after a preceding data transfer is registered for execution and another data transfer to a similar destination as the preceding data transfer is necessary, the execution control unit cancels the preceding data transfer based on the data dependence information.

2. The multiprocessor system as claimed in claim 1, wherein when the preceding data transfer is executable, the execution control unit starts the preceding data transfer even before the control flow of processing by the processor is fixed.

3. The multiprocessor system as claimed in claim 1, wherein if the preceding data transfer has not been executed when the control flow of processing by the processor is fixed, the execution control unit deletes registration for execution of the preceding data transfer.

4. The multiprocessor system as claimed in claim 1, wherein if the preceding data transfer is being executed when the control flow of processing by the processor is fixed, the execution control unit cancels execution of the preceding data transfer.

5. The multiprocessor system as claimed in claim 1, wherein the data dependence information indicates for each data of the destination, that the status of the data transfer is "not registered yet," "to be executed," "being executed," or "execution completed."

6. The multiprocessor system as claimed in claim 1, wherein the internal data storage unit further includes waiting-for-execution information in which a data transfer to be executed is registered and execution parameter information in which an execution parameter related to the data transfer to be executed is registered.

7. The multiprocessor system as claimed in claim 6, wherein the execution control unit registers processing to be executed by the plurality of processors and a data transfer between the plurality of processors and further registers dependence of the processing and the data transfer in the waiting-for-execution information.

8. The multiprocessor system as claimed in claim 6, wherein the execution control unit checks the dependence registered in the waiting-for-execution information and allows executable processing and/or data transfer.

9. The multiprocessor system as claimed in claim 1, wherein when the execution control unit registers the other data transfer for execution, the execution control unit checks data dependence information of data to be transferred and cancels the preceding data transfer.

10. The multiprocessor system as claimed in claim 1, wherein when the execution control unit executes the other data transfer, the execution control unit checks data dependence information of data to be transferred and cancels the preceding data transfer.

11. The multiprocessor system as claimed in claim 1, wherein when the control flow is fixed, the preceding data transfer is continued.

12. The multiprocessor system as claimed in claim 1, further comprising at least one data transfer unit to execute data transfer between the plurality of processors.

13. The multiprocessor system as claimed in claim 1, the execution control unit is one of the plurality of processors.

14. The multiprocessor system as claimed in claim 1, wherein if the preceding data transfer has not been executed when the control flow is fixed, the execution control unit cancels the preceding data transfer, and if the preceding data transfer is being executed, the execution control unit continues the preceding data transfer.

15. The multiprocessor system as claimed in claim 6, wherein the data dependence information of the internal data storage unit includes pointers to the waiting-for-execution information and the execution parameter information.

16. The multiprocessor system as claimed in claim 1, wherein the status in the data dependence information is set to "to be executed" when the preceding data transfer is registered for execution, to "being executed" when execution of the preceding data transfer is started, and to "execution completed" when the execution of the preceding data transfer is completed.

17. The multiprocessor system as claimed in claim 12, wherein the at least one data transfer unit is a DMA controller.

18. The multiprocessor system as claimed in claim 1, wherein the multiprocessor system is a distributed-type processor in which a plurality of subsystems communicate with each other via a communication path.

19. A method of controlling a multiprocessor system comprising a plurality of processors and an internal data storage unit including data dependence information indicating status of a data transfer between the plurality of processors, the method comprising:
  registering a preceding data transfer for execution;
  determining whether control flow of processing by the plurality of processors is fixed; and
  when the control flow is fixed and if another data transfer to a similar destination as that of the preceding data transfer is necessary, canceling the preceding data transfer based on the data dependence information.

20. A non-transitory computer-readable recording medium storing a program to be executed by a computer, the program comprising:
  controlling a multiprocessor system comprising a plurality of processors and an internal data storage unit including data dependence information indicating status of a data transfer between the plurality of processors;
  registering a preceding data transfer for execution;
  determining whether control flow of processing by the plurality of processors is fixed; and
  when the control flow is fixed and if another data transfer to a similar destination as that of the preceding data transfer is necessary, canceling the preceding data transfer based on the data dependence information.

* * * * *